United States Patent [19]
Fitzgibbon et al.

[11] Patent Number: 6,133,703
[45] Date of Patent: Oct. 17, 2000

[54] BI-DIRECTIONAL PASS-POINT SYSTEM FOR CONTROLLING THE OPERATION OF MOVABLE BARRIERS

[75] Inventors: James Fitzgibbon, Batavia; Christopher M. Valente, Elmhurst; Colin B. Willmott, Buffalo Grove; Mark Siegler, Brookfield; Martin Rathgeber; Ramon Tam, both of Chicago; Dan Lobbes, Batavia, all of Ill.

[73] Assignee: The Chamberlain Group, Inc., Elmhurst, Ill.

[21] Appl. No.: 09/251,793

[22] Filed: Feb. 17, 1999

Related U.S. Application Data

[63] Continuation-in-part of application No. 09/041,351, Mar. 12, 1998, Pat. No. 6,051,947.

[51] Int. Cl.⁷ .................................................. G05B 5/00
[52] U.S. Cl. ..................... 318/445; 318/480; 318/450; 318/460; 318/467; 340/555; 340/356
[58] Field of Search ................................... 318/480, 450, 318/460, 467, 445; 340/555, 356

[56]                References Cited

U.S. PATENT DOCUMENTS

| | | | |
|---|---|---|---|
| 2,268,133 | 12/1941 | Carlson | 161/1 |
| 3,147,001 | 9/1964 | Purdy | 268/59 |
| 3,262,105 | 7/1966 | Bell | 340/203 |
| 3,654,480 | 4/1972 | Stephenson | 250/231 R |
| 4,467,251 | 8/1984 | Jonsson | 318/480 |
| 4,565,029 | 1/1986 | Kornbrekke, et al. | 49/25 |
| 4,888,531 | 12/1989 | Hormann | 318/282 |
| 4,922,168 | 5/1990 | Waggamon, et al. | 318/286 |
| 5,233,185 | 8/1993 | Whitaker | 250/222.1 |
| 5,235,494 | 8/1993 | Chang, et at. | 361/736 |
| 5,384,495 | 1/1995 | Waggamon, et al. | 307/326 |

FOREIGN PATENT DOCUMENTS

| | | | |
|---|---|---|---|
| 0 280 854 A1 | 9/1988 | European Pat. Off. | E05F 15/16 |
| 0 544 262 A2 | 6/1993 | European Pat. Off. | E05F 15/00 |
| 0 767 288 A1 | 4/1997 | European Pat. Off. | E05F 15/20 |
| 0 771 923 A2 | 5/1997 | European Pat. Off. | E05F 15/00 |
| 0 786 848 A1 | 7/1997 | European Pat. Off. | H02H 7/085 |
| 297 06 251 | 10/1997 | Germany | G08C 17/00 |
| WO 91/10776 | 9/1990 | WIPO | E05F 15/20 |

*Primary Examiner*—Karen Masih
*Attorney, Agent, or Firm*—Fitch, Even, Tabin & Flannery

[57]                ABSTRACT

An operator for opening and closing movable barriers such as garage doors comprising a pass-point limit system which is a component of an operating head. An operator for a rolling shutter or gate can be installed on either side of the opening. A dual pass-point system provides a unique pass-point regardless of direction of mounting the operator, regardless of the direction of travel for opening the barrier, and regardless of installation configuration, eliminating the need for the installer to know which direction the motor is rotating or the barrier is travelling. The operator automatically learns both the open and close limits, regardless of direction of travel and without having to press a learn switch to set the open and close limits.

20 Claims, 41 Drawing Sheets

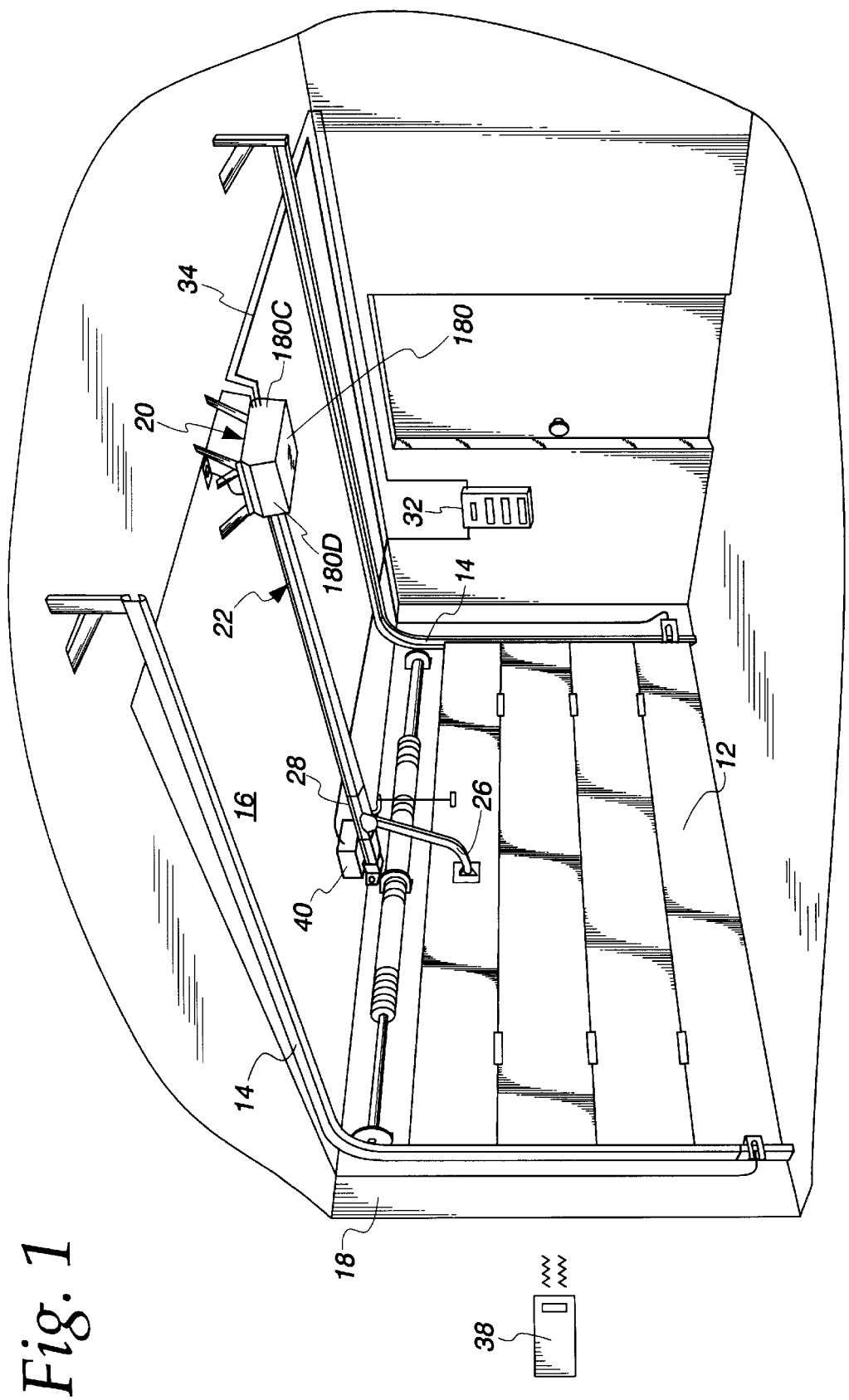

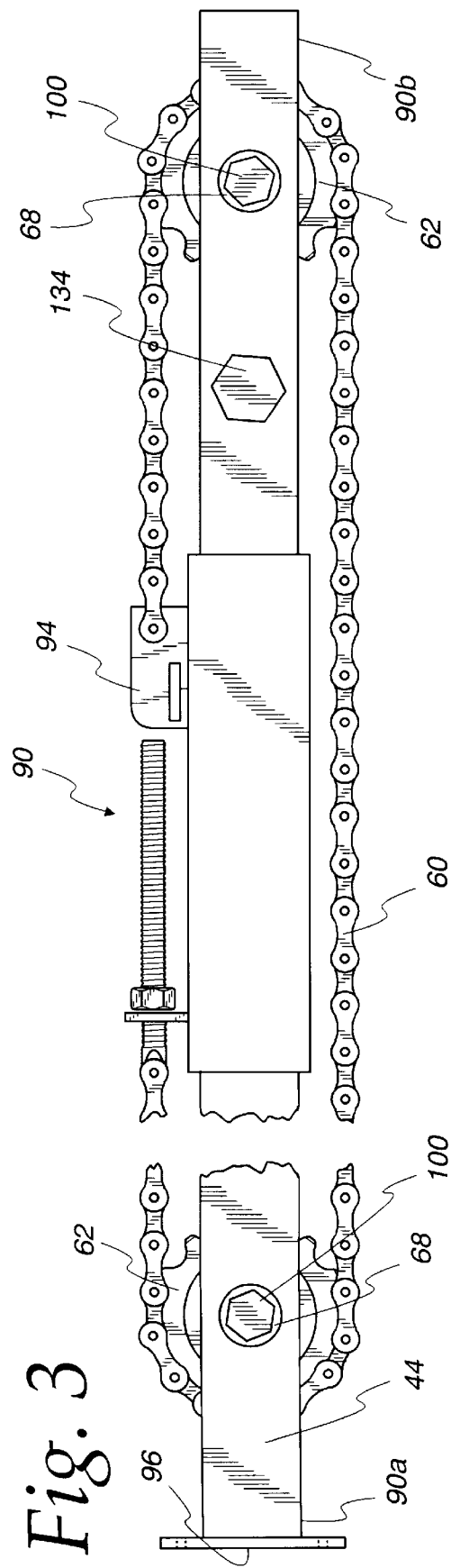
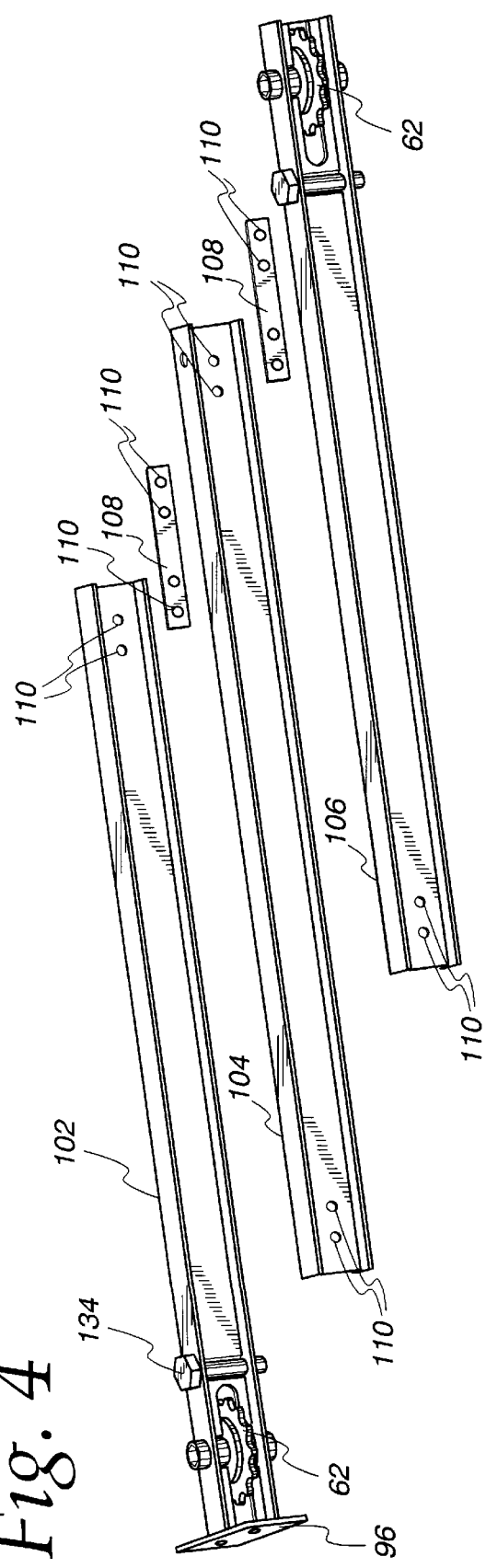

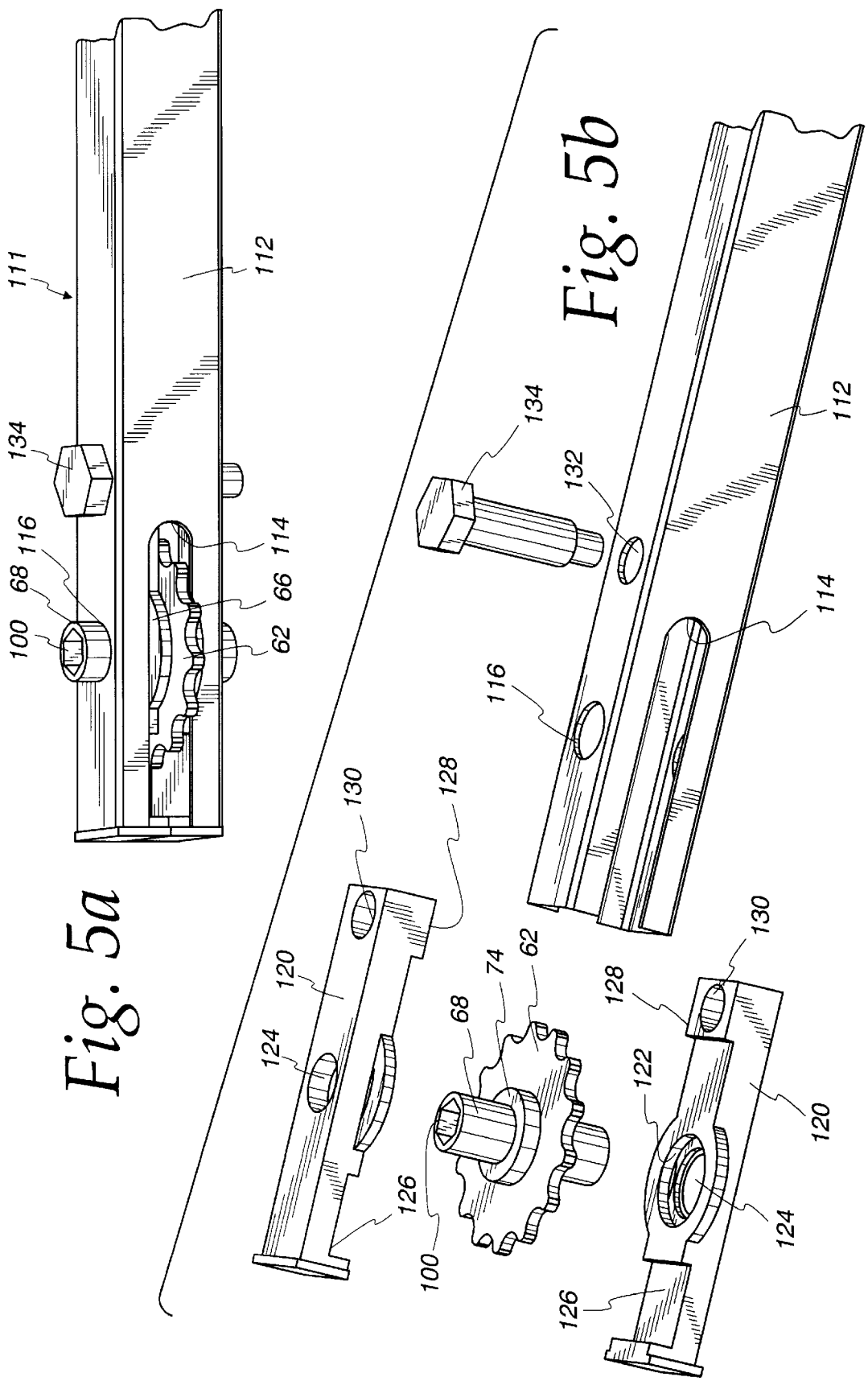

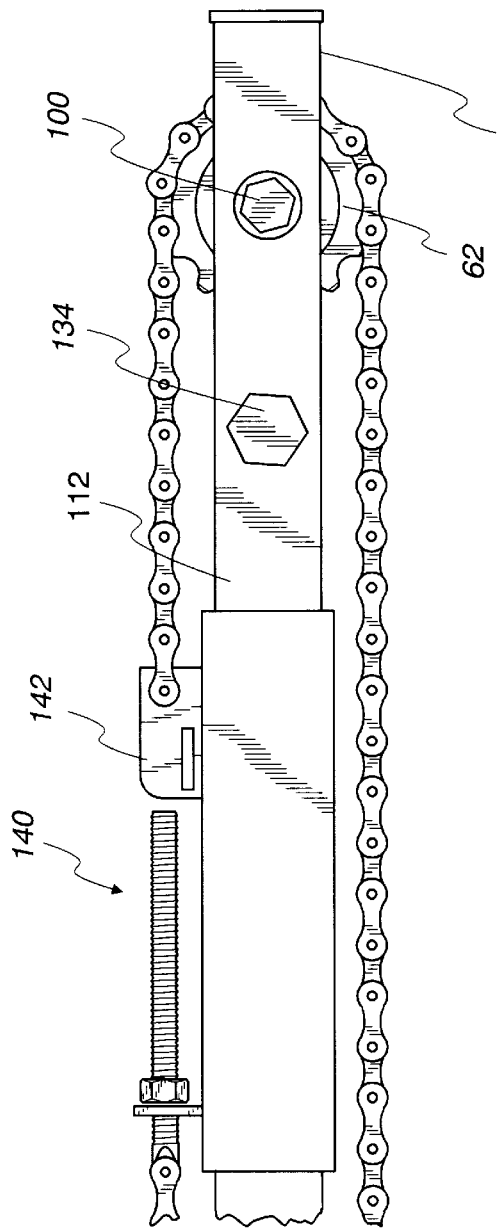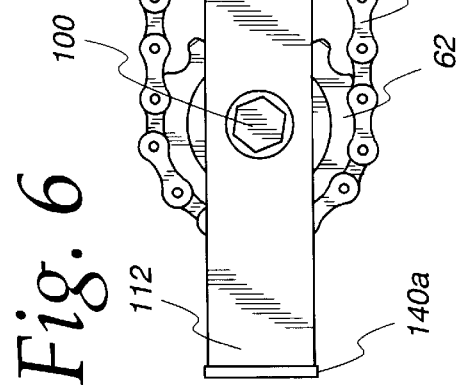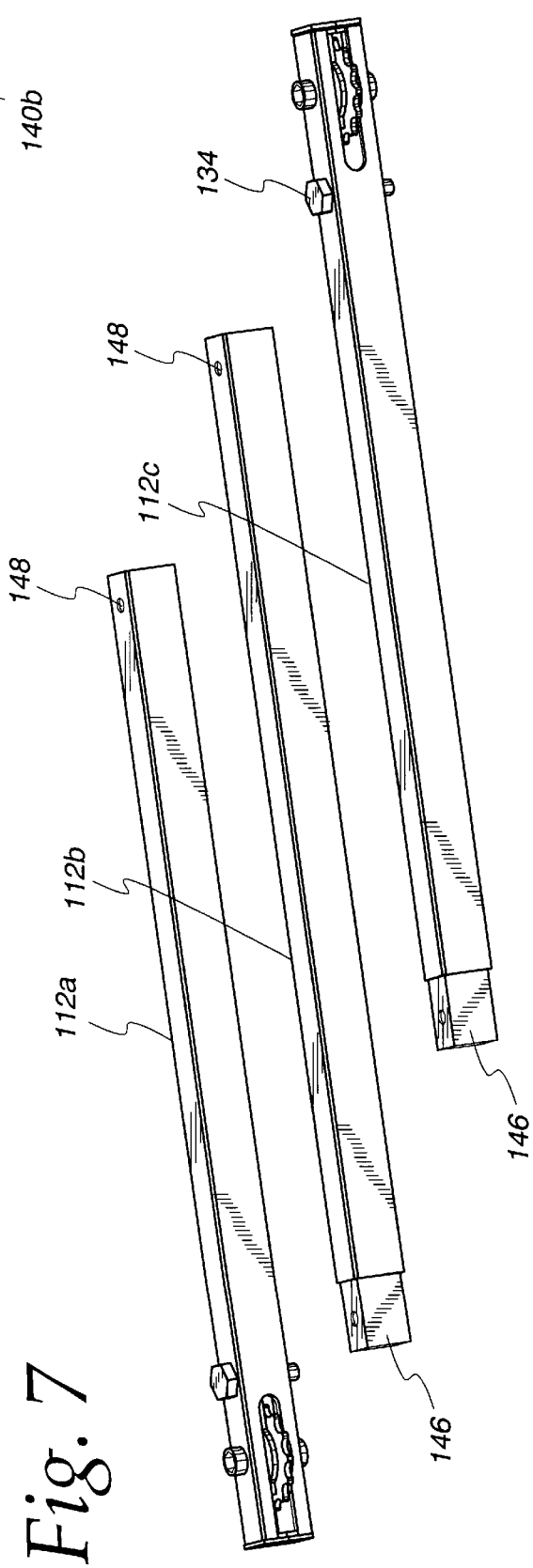

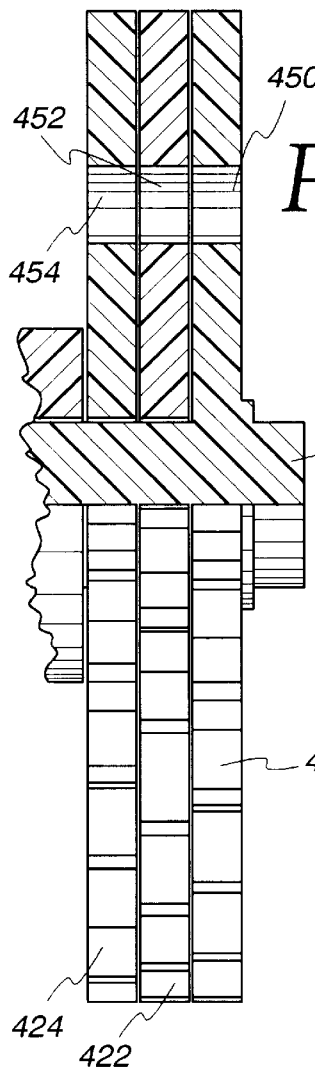
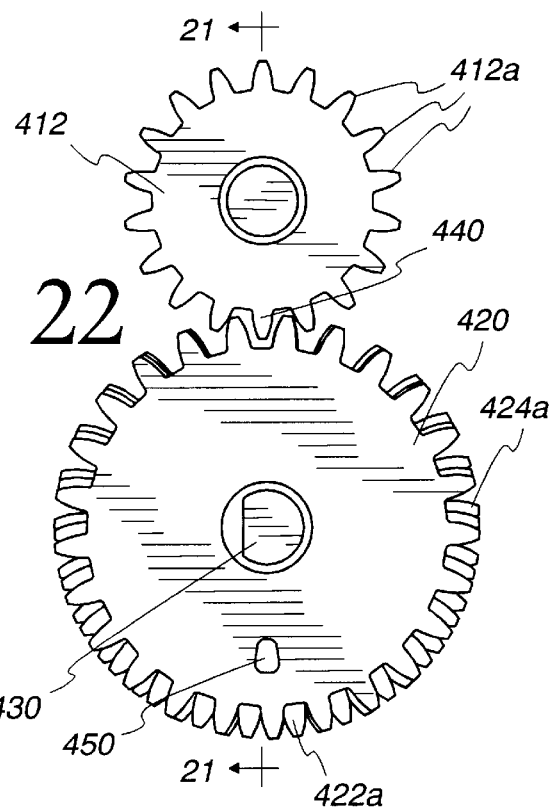
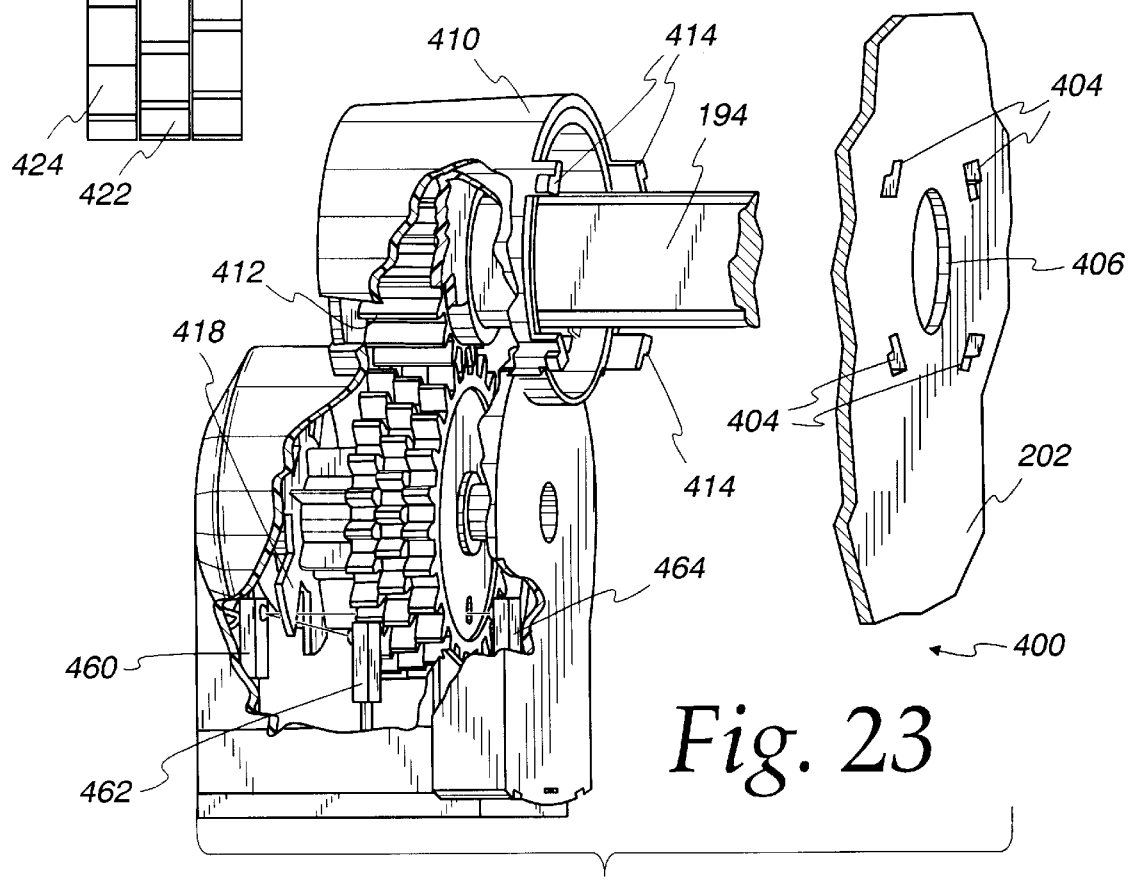
Fig. 21
Fig. 22
Fig. 23

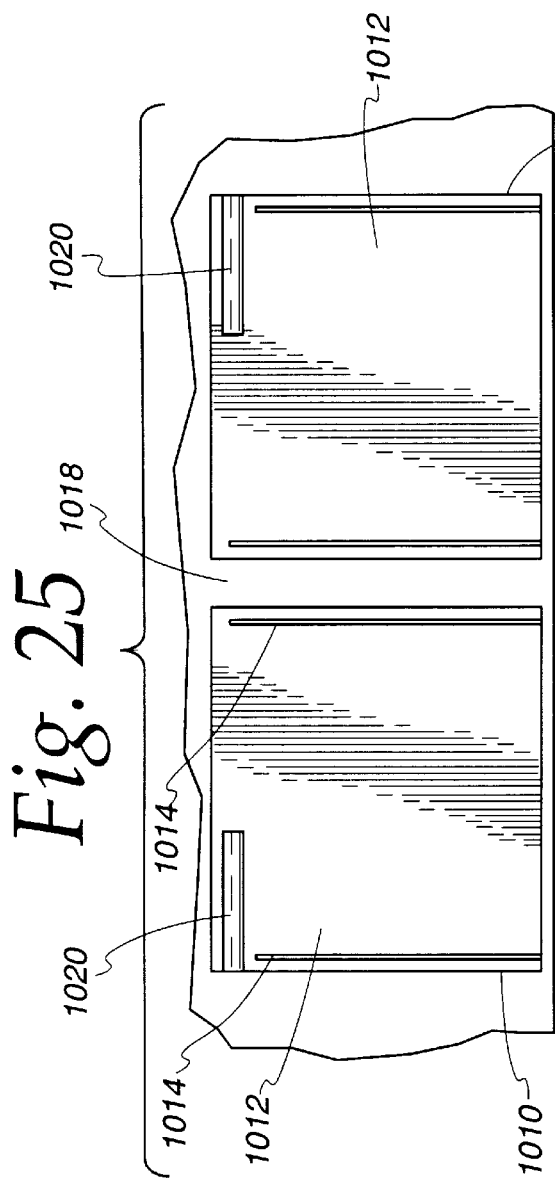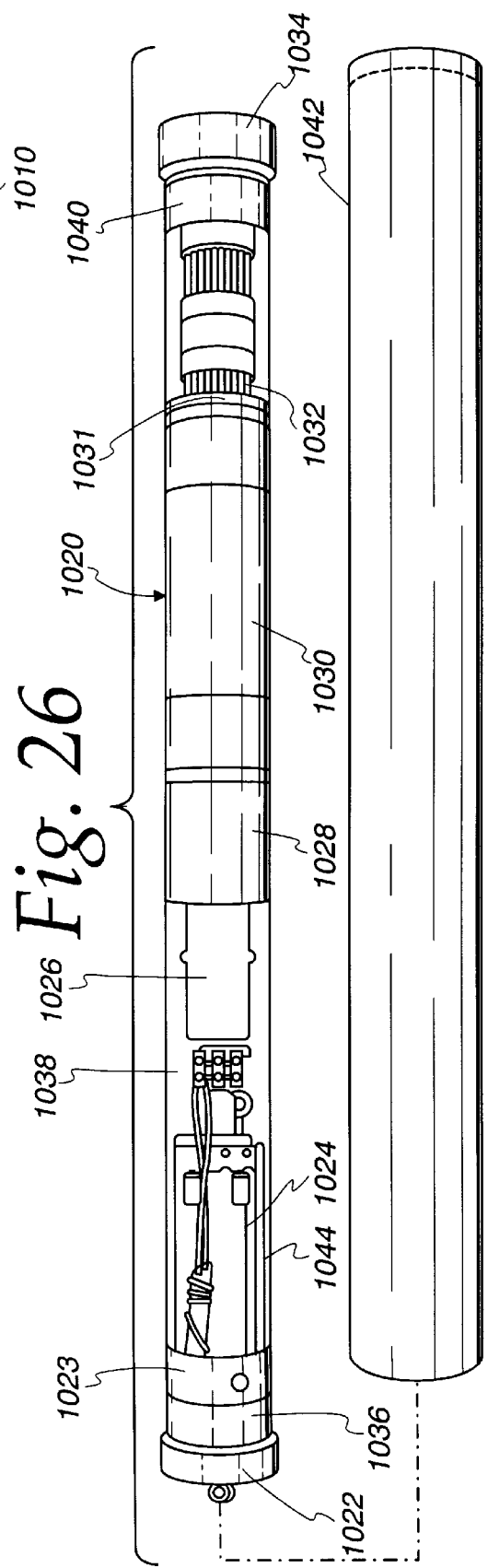

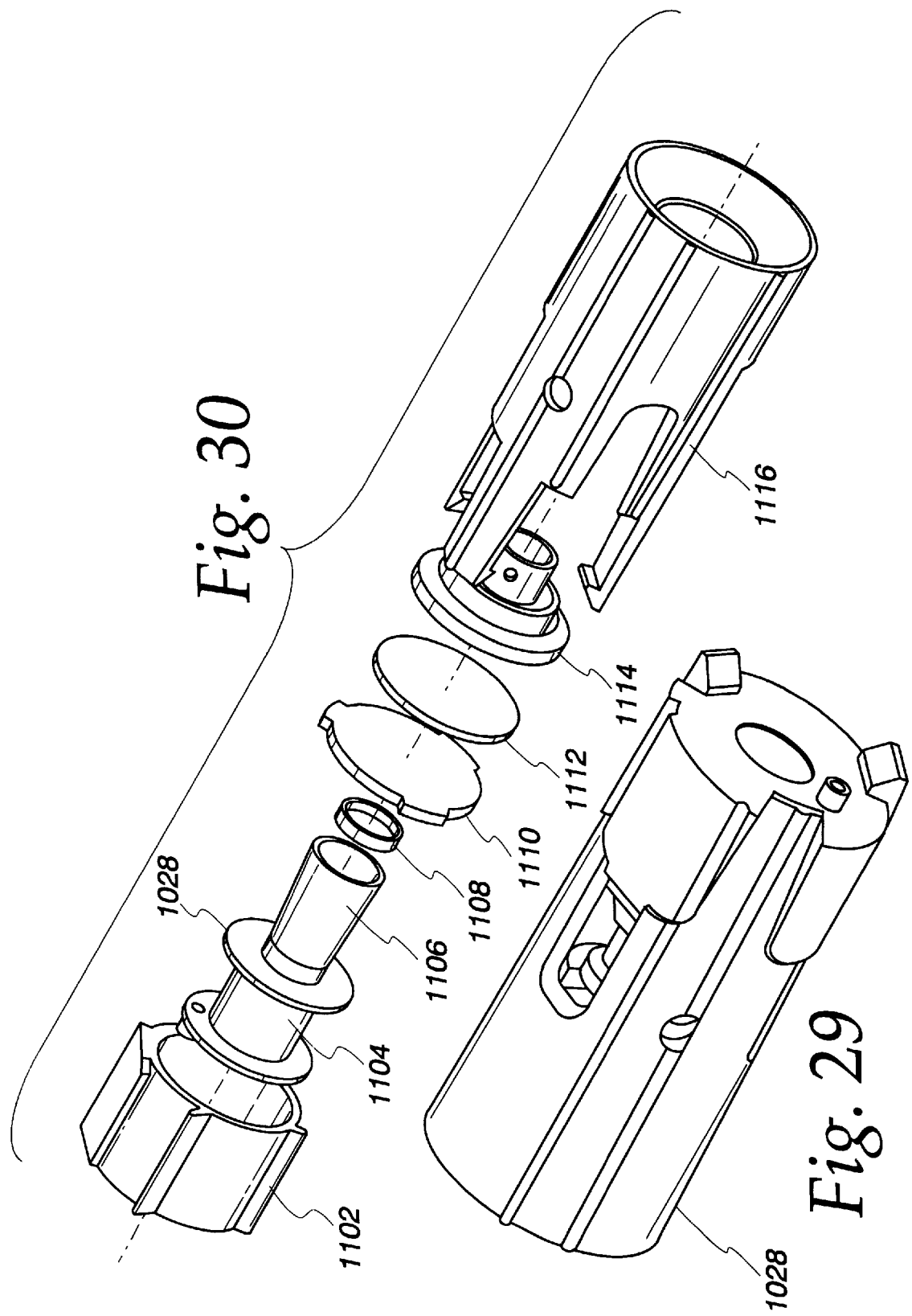

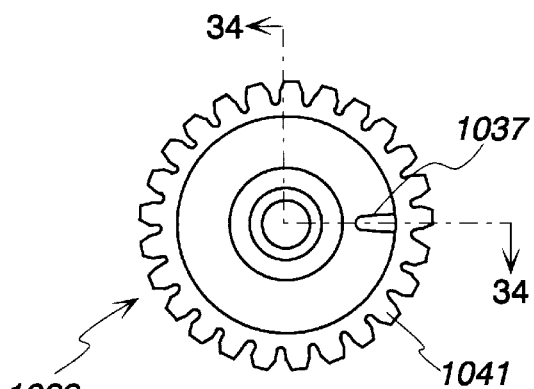
Fig. 31  Fig. 32
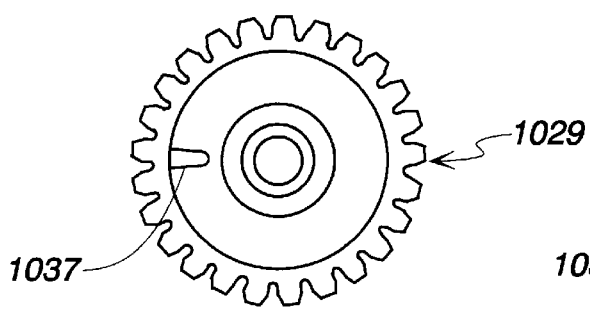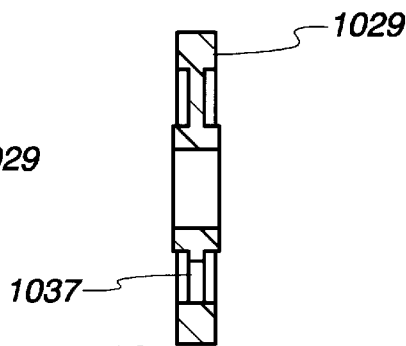
Fig. 33  Fig. 34
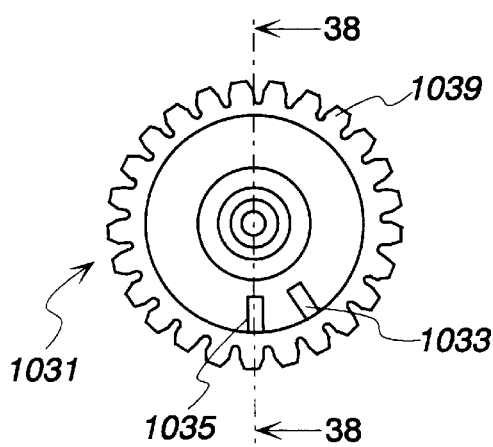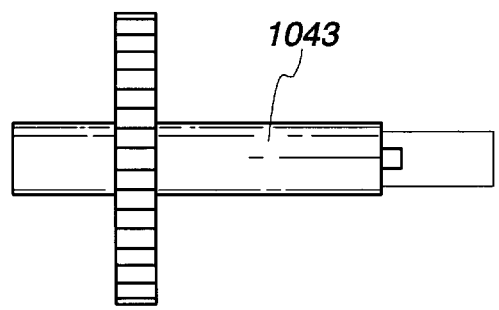
Fig. 35  Fig. 36

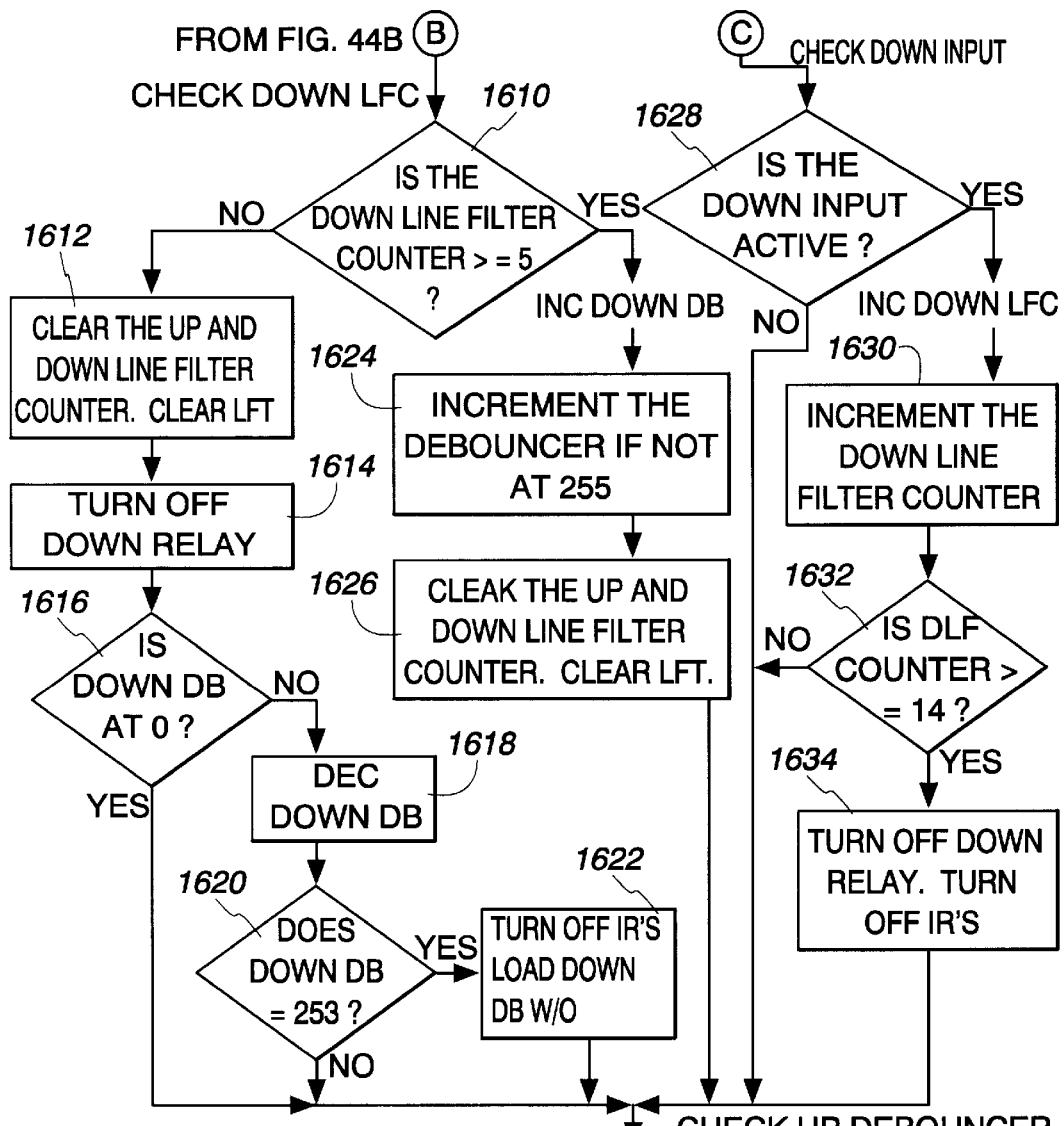
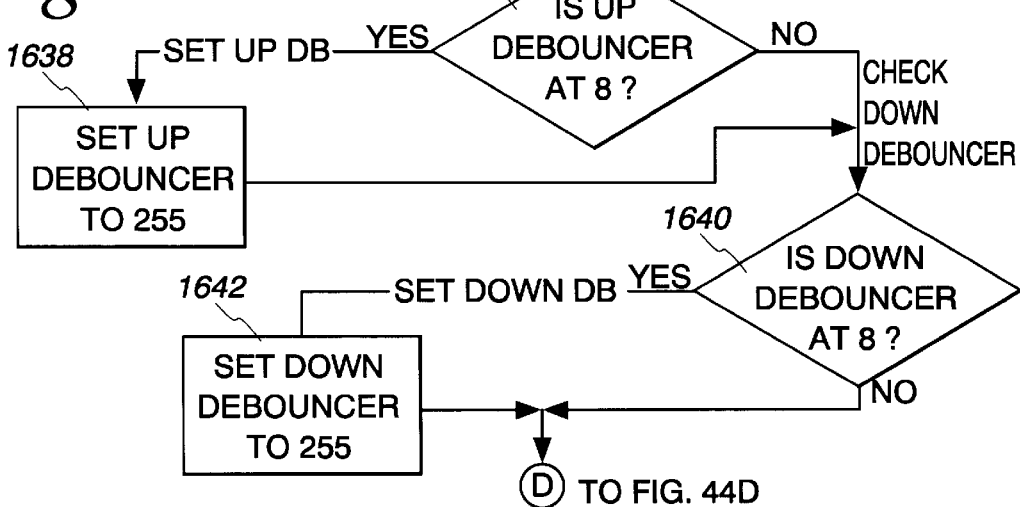
Fig. 44c

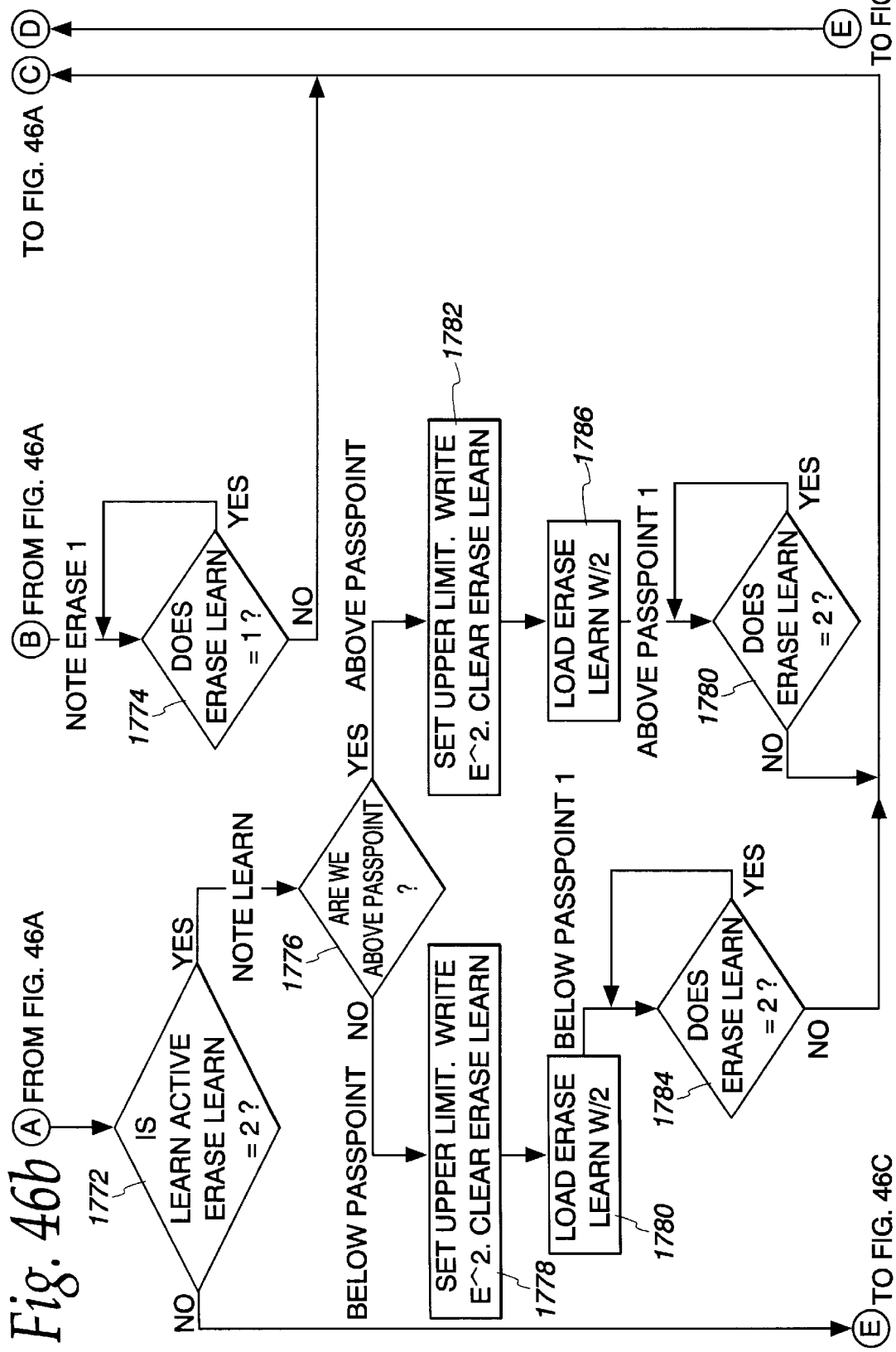

BI-DIRECTIONAL PASS-POINT SYSTEM FOR CONTROLLING THE OPERATION OF MOVABLE BARRIERS

CROSS REFERENCE TO RELATED APPLICATION

This is a continuation-in-part of application Ser. No. 09/041,351, filed Mar. 12, 1998 now U.S. Pat. No. 6,051,947 for "Pass-point System for Controlling the Operation of Movable Barriers"

BACKGROUND OF THE INVENTION

1. Field of the Invention

The invention relates to operators for movable barriers, such as rolling shutters, gates and the like, and more particularly to operators which can be mounted on either side of an opening and which are automatically configurable for direction of opening and closing travel and end travel limits.

2. Description of Related Art

One of the problems which must be addressed in designing and engineering operators for movable barriers is the provision of automatic, safe and reliable stopping of the barrier at its open and closed positions. Most movable barrier operators include a head unit containing a motor and a transmission. The transmission may comprise a chain drive or a screw drive to be coupled to a barrier, such as a garage door, for opening and closing the garage door. As discussed in co-pending U.S. application Ser. No. 09/023,940, filed Feb. 13, 1998, which is incorporated herein by reference, such garage door openers also have included optical detection systems located near the bottom of the travel of the door to prevent the door from closing on objects or on persons that may be in the path of the door.

Such garage door operators typically include a wall control which is connected via one or more wires to an operator or head unit to send operation signals to the head unit from a remote location to cause the head unit to open and close the garage door, and to light a worklight. Such prior art garage door operators also include a receiver for receiving radio frequency transmissions from a hand-held code transmitter or from a keypad transmitter which may be affixed to the outside of the garage or other structure.

These garage door operators typically include adjustable limit switches which cause the garage door to reverse direction or which halt the motor when the travel of the door causes the limit switch to change state, either in the open position or in the closed position. In the prior art, internal limit switches have been provided within the head unit, and external limit switches have been provided at various locations outside of the head unit. It may be appreciated that the limits of travel typically must be custom set during or after installation of the unit within the garage. In the past, such units have had mechanically adjustable limit switches which are typically set by an installer. The installer may need to inspect the door, the wall switch and the head unit in order to make adjustments in order to set the limit switches properly. This, of course, is time consuming and results in the installer being required to spend more time than is desirable to install the garage door operator.

Requirements from Underwriters Laboratories, the Consumer Product Safety Commission, and/or other organizations require that garage door operators sold in the United States must, when operating in a closing mode and contacting an obstruction having a height of more than one inch, reverse and open the door. Prior art garage door operators also include systems whereby the force which the electric motor applied to the garage door through the transmission might be adjusted. Typically, this force is adjusted by a licensed repair technician or installer who obtains access to the inside of the head unit and adjusts a pair of potentiometers, one of which sets the maximum force to be applied during the closing portion of door operation, the other of which establishes the maximum force to be applied during the opening portion of door operation.

A garage door operator is exemplified by an operator taught in U.S. Pat. No. 4,638,443 to Schindler. However, such door operators are relatively inconvenient to install and invite misuse. If during operation the garage door operator begins to bind or jam in the tracks, the homeowner may obtain access to the head unit and increase the force limit. Increasing the maximum force may allow the door to move past a binding point, but also may undesirably apply increased force at the bottom of its travel.

Electrical limit switches are operated by physical contact between actuators and stops. However, the mechanical features of the switches and their electrical contacts are subject to strain, degradation caused by exposure to the surrounding environment, and other factors. As a results the limit switch set points may drift from their proper settings, and, under automatic operation, the door may not close or open as desired.

One particular problem can arise from drifting limit switch points when a homeowner, using a remote control unit, transmits a "close" command while driving away from a garage, but the garage door erroneously reverses automatically as it reaches the closed position. In this situation, the garage door may be left open for an extended time, unknown to the homeowner, permitting access to the garage and possibly an attached residence as well.

Drifting limit switch points frequently require the user or installer to readjust them. In order to readjust limit switch set points in prior art systems having internal limit switches, a user may be required to inspect the actuators from the vantage point of a ladder and, after determining the direction and amount of adjustment required, physically change their positions.

Commonly assigned U.S. patent application Ser. No. 09/023,940 discloses an improved control arrangement for garage door operators and the like which addresses several of the above problems. In particular, U.S. application Ser. No. 09/023,940 discloses a pass-point or position normalizing system consisting of a ring-like light interrupter attached to the garage door. As the door moves the interrupter crosses the light path of an optical obstacle detector signalling instantaneously the position of the door. The door continues until it closes, whereupon force sensing in the door causes an auto-reverse to take place which then raises the door to the up position. This completes the learn mode and sets the door travel limits. The pass-point system is also used to normalize the position of the position detector so that, over time, the end limits do not creep causing the door to crash into the floor or beyond the up limit. However, there is a continuing need for further improvement, particularly with respect to facilitating installation of a commercially practical apparatus addressing these problems.

Certain types of operators for commercial doors, gates and rolling shutters are designed be mounted on either side of the opening. For example, the operator for a rolling shutter can be mounted on the upper right hand side of a window or opening or the upper left hand side of the window or opening. The only difference in operation is the direction of rotation of the motor (or direction of travel) for opening and closing the shutters. For example, if the motor assembly is mounted on one side, the direction of rotation for opening is clockwise (CW); if mounted on the other side, the direction of rotation for opening is counter-clockwise (CCW).

An operator which has two possible installation configurations requires the installer to configure the unit at installation to travel in the correct direction. Such configuration may require setting switches or special programming, all of which is time consuming to the installer. Further, configuring the direction of travel impacts the location of the pass-point. The location of the pass-point is preferably set near the close position. Installing the operator in the opposite location would place the pass-point near the open position. Thus, there is a need for a movable barrier operator which automatically detects the direction of travel for open and close and always provides a pass-point in the preferred location.

The labor cost for installing a movable barrier operator is an important consideration both to installers and to users. Any step that can be automated translates into reduced costs. Programming the open and close limits in a movable barrier operator can sometimes take several steps. Many movable barrier operators are manually setable, such as by physically locating or adjusting the frame-mounted limit switches as described above. Other operators may require the user press the learn switch when the door is at a limit in the learn mode to program in the open and close limits. Not all users or installers may be able to accurately select the open and close limits by pressing the learn switch at just the right time or to select them on the first try. There is a need for a movable barrier operator which automatically learns the open and close barrier travel limits without actuation of a learn switch by the user.

SUMMARY OF THE INVENTION

An embodiment of the present invention provides an improved operator for opening and closing overhead doors, gate, rolling shutters and like barriers which enables one or both of the barrier travel end points to be set and/or adjusted from a wall-mounted keypad or other easily accessible location remote from the head unit. Barrier travel is measured indirectly by a component of the head, so that installation of limit switches along the path of the barrier travel may be eliminated, thereby facilitating installation of the barrier operator. Indirect measurement of barrier travel may be provided by a compact, internal pass-point system driven directly by the motor shaft.

In the preferred embodiment described in more detail below, an optical pass-point system is mounted on one end of the motor, opposite the transmission. The optical pass-point system employs a plurality of spur gears disposed side by side on a common shaft. Each spur gear has a single aperture for transmission of an optical signal. The spur gears have varying numbers of teeth, and are driven by a common pinion at slightly different speeds to provide a precise, reliable pass-point signal. The pass-point is detected when all of the apertures align. The pass-point indication may be used as a reference point for measure of barrier travel or for other automatic control parameters.

The preferred embodiment of the invention incorporates features which substantially eliminate or reduce drift of barrier travel set points to address the problem of inadvertent automatic reversal of the barrier.

In another preferred embodiment of the invention described below, an optical pass-point system is mounted on one end of the motor, opposite the transmission. The optical pass-point system employs a plurality of spur gears disposed side by side on a common shaft. One spur gear has a single aperture for transmission of an optical signal. A second spur gear has two apertures, separated by an offset in degrees. The spur gears have varying number of teeth, and are driven by a common pinion at slightly different speeds to provide a precise, reliable pass-point indication which is detected when the aperture in the first spur gear aligns with one of the apertures in the second spur gear. This alignment may be used as a reference point for measure of barrier travel or for other automatic control parameters.

When the operator is mounted with respect to the barrier frame so that opening the barrier occurs when the motor rotates in a first direction, the first aperture on the second spur gear lines up with the single aperture on the first spur gear. When the operator is mounted with respect to the barrier frame so that opening the barrier occurs when the motor rotates in a second direction, the second aperture lines up with the single aperture on the first spur gear. Thus, a unique pass-point is provided regardless of direction of mounting the operator or of installation configuration. This eliminates the need for the installer to know which direction the motor is rotating or the barrier is traveling.

Preferably, the movable barrier operator includes an RPM sensor for detecting the rotational speed of the motor. An RPM sensor includes a wheel having a plurality of slits or openings spaced about the gear. The RPM sensor is positioned between an optical emitter and an optical detector. Rotation of the motor causes rotation of the wheel such that an optical beam from the optical emitter is alternately blocked by the solid portions of the wheel or passes through each of the slits for detection by an optical detector. The optical detector generates an RPM signal, which comprises a series of pulses, each with a rising and a falling edge. The size and spacing of the slits are known so that the duration between rising and/or falling edges defining the pulses can be used as a measure of the rotational speed of the motor.

The preferred embodiment of the invention automatically learns both the open and close limits, regardless of direction of travel and without having to press a learn switch to set the open and close limits. When in the learn mode, the controller measures the distance the barrier travels in either direction until a pass-point is reached. Upon reaching the pass-point, the controller stores the measured count of the distance as the limit opposite that of travel. This eliminates the user having to press the learn switch to learn the open and close end limits. Preferably, the controller uses RPM pulses to measure the distance traveled.

Additional advantages and features of the invention may be appreciated from the written description set forth below and accompanying drawings.

BRIEF DESCRIPTION OF THE DRAWINGS

FIG. 1 is a perspective view of a garage door operating system in accordance with an embodiment of the invention;

FIG. 3 is a fragmentary top elevational view thereof;

FIG. 4 is an exploded perspective view of a rail drive assembly in accordance with a second embodiment of the invention;

FIG. 5a is a perspective view of one end of an integrated drive rail in accordance with another embodiment of the invention;

FIG. 5b is a fragmentary exploded view thereof;

FIG. 6 is a foreshortened top elevational view thereof;

FIG. 7 is an exploded perspective view of an alternative rail drive assembly in accordance with another embodiment of the invention;

FIG. 21 is a fragmentary top plan view of the timing gears;

FIG. 22 is an end elevational view of the arrangement of FIG. 18;

FIG. 23 is a perspective view shown partly broken away of another pass-point mechanism;

FIG. 25 is a perspective view of a rolling shutter operating system in accordance with an alternative embodiment of the invention;

FIG. 26 is a perspective view of the tubular motor assembly of FIG. 25;

FIG. 29 is a perspective view of the brake assembly of FIG. 26;

FIG. 30 is an exploded perspective view of the brake assembly of FIG. 29;

FIGS. 31–38 are views of various elements of the pass-point assembly of FIG. 27 and FIG. 28;

FIGS. 44a–44f is a flow chart of the learn routine executed in the microcontroller shown in FIG. 39;

FIGS. 46a–46d is a flow chart of the erase routine executed in the microcontroller shown in FIG. 39;

DETAILED DESCRIPTION OF THE PREFERRED EMBODIMENTS

Figure 2A:
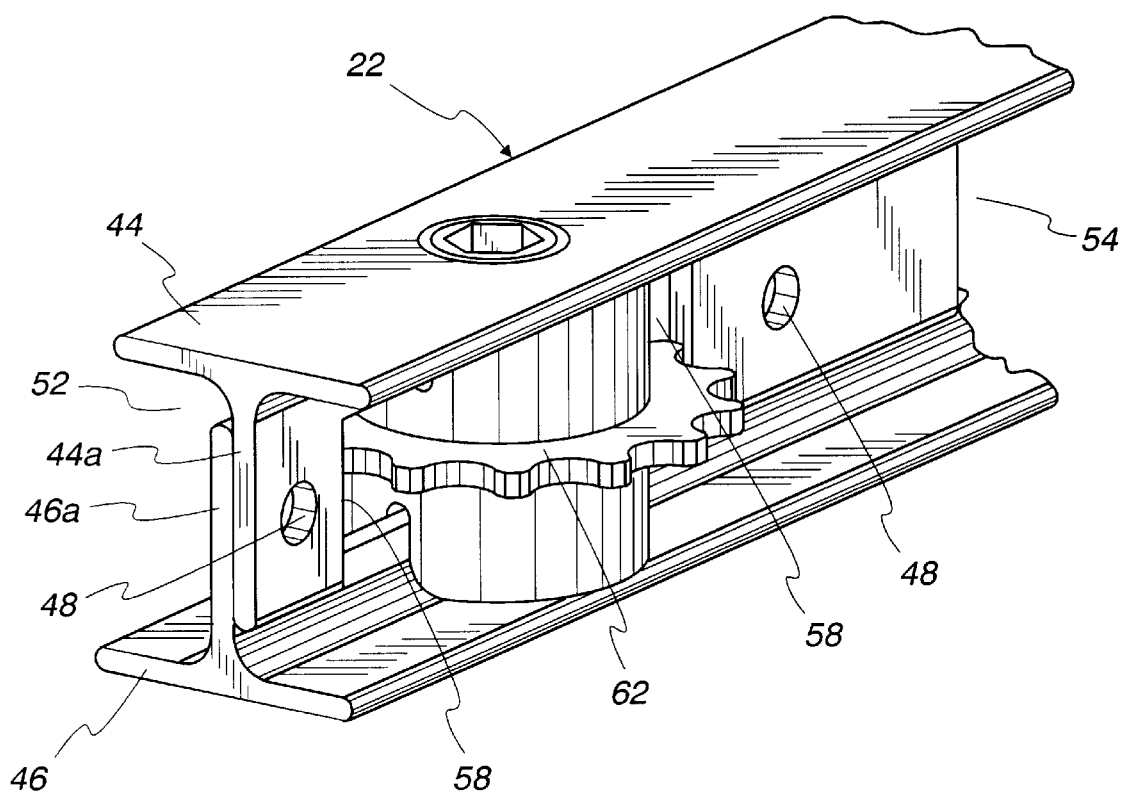
FIG. 2a is a fragmentary perspective view of an integrated drive rail of the system of FIG. 1.

Referring now to the drawings, and especially to FIG. 1, a movable barrier operator embodying the present invention is generally shown therein and identified by reference numeral 10. The movable barrier operator 10 is employed for controlling the opening and closing of a conventional overhead garage door 12 of a garage 13. The garage door 12 is mounted on guide rails 14 for movement between the closed position illustrated in FIG. 1 and an open or raised position. The garage 13 includes a ceiling 16 and a wall 18 defining an opening blocked by garage door 12. As shown, guide rails 14 are mounted to wall 18 and ceiling 16 of the garage 13 in a conventional manner.

A power drive unit or head, generally indicated at 20, is mounted to the ceiling 16 in a conventional manner. An integrated drive rail 22 extends between the power drive unit 20 and the garage wall 18. As can be seen in FIG. 1, one end of integrated drive rail 22 is mounted to a portion of the garage wall 18 located above the garage door 12. An operator arm 26 is connected at one end to the garage door 12 and at the other end to a trolley 94 mounted for movement back and forth, along the integrated drive rail 22. As will be seen herein, a motor in the power drive unit 20 propels the trolley 28 in a desired manner to raise and lower garage door 12 via the coupling of the trolley 28 and the operator arm 26 to the garage door 12.

A push button control unit 32, which includes an electronic controller and a keypad, is coupled by electrical conductors 34 to the power drive unit 20 and sends signals to the power drive unit, controlling operation of the drive motor therein. Preferably, the power drive unit 20 also includes a conventional radio receiver (not shown) for receiving radio signals from a remote control transmitter 38. An optional auxiliary power drive unit 40 is shown coupled to one end of integrated drive rail 22, being mounted on wall 18, atop door 12. If desired, operational flexibility of the integrated drive rail assembly may allow relocation of the main drive unit to a point adjacent the door.

Pass-Point System

Systems for controlling drive operators for movable barriers (such as gates, fences and doors operated with a jack shaft mechanism) will now be described with reference to one type of movable barrier, the overhead garage door 12 shown in FIGS. 1 and 3. In FIG. 1 a closed loop drive member preferably comprising a drive chain 60 is carried on the integrated drive rail 22 and is powered by the drive unit 20. As the drive chain 60 is moved back and forth along integrated drive rail 22, the trolley 28 attached to the drive chain 60 is moved back and forth along the drive rail carrying arm 26 which is coupled to the trolley 28. The garage door 12 is then pulled or pushed by the arm 26, while supported for travel along a defined path by guide rails 14.

As will be seen herein, a motor in the power drive unit 20 propels the trolley 28 in a desired manner to raise and lower the garage door 12 via the coupling of the trolley 28 and the arm 26 to the garage door 12.

Certain questions relating to control strategies arise when automatic operation of the garage door 12 is considered. For example, for practical automatic control, consideration must be given to the prediction and/or recognition of fully opened and fully closed positions of garage door 12. Direct detection of door open and closed positions can be employed but generally are not preferred due to the additional costs for installation of external limit switches that wold likely be incurred. Alternatively, arrangements may be provided for indirect detection of the door position.

To a rough approximation, the position of the trolley 28, and hence of the chain 60 driving the trolley 28, is related to the door position. However, due to wear, or due to changes in humidity, temperature or other conditions, the relationship of the chain or trolley position to the door position may vary somewhat. In the past, portions of the trolley or other components of the overhead opener system have been employed to physically contact electrical switches or the like to send signals related to the door position. However, the mechanical operations internal to the electrical switches (which have a direct influence on the electrical performance of the switch contacts) are subject to degradation caused by wear and exposure to the surrounding environment, as well as changes in climatic conditions. As a result, the set points received by the control system in order to predict or otherwise detect the door position may be susceptible to drifting from their proper settings, and under automatic operation, the overhead door would not always close or open as desired. This would require manual adjustment, usually with the aid of a ladder and tools, to manually change the positions of stop members or other components used to trip the electrical switches.

In the preferred embodiment, there is provided a means for detecting a reference recalibration point or pass-point, preferably an objective point associated with an intermediate position of the garage door. With the preferred embodiment of the invention, sensing of the pass-point is repeatable to a high degree of precision so that the pass-point can be useful as a control parameter. By establishing a pass-point at an intermediate door position, travel of the drive element (e.g., drive chain 60 described above) can be broken into two parts, one associated with a door closed position and the other associated with a door open position. The end points of door travel are defined relative to the pass-point. Preferably, the pass-point is sensed each time the door travels between its closed and open positions, with the position of the door relative to the pass-point being continually reset or recalibrated.

With an intermediate pass-point being objectively and reliably sensed, predictions can be made "on the fly" as to when a door closed condition or door open condition is about to be reached. This information can be correlated with instantaneous demands being made on a motor providing mechanical power to the drive element and, if desired, interpretation can then be made as to the operating conditions relating to the door. For example, if a garage door is a fraction of an inch away from being fully closed and an unusual power demand is made on the drive motor, it may be assumed that the operating condition of the door relates to a misalignment of the door guide rails, snow build-up or some other factor unrelated to a mechanical or control malfunction.

Preferably, the pass-point system provides the controller with RPM information as well as sensing the pass-point, so that the controller may begin to decelerate the door as it approaches a desired end point, and may vary the point at which deceleration begins, depending on the speed of the door as reflected by the rotational velocity of the motor drive shaft. RPM information may also be used to locate the position of the door as it travels from limit to limit.

By monitoring drive motor torque and a representative sampling of door opening and door closing operations, a length of travel from pass-point to end point can be determined and stored for future use, along with stored values of end point deviations. Alternatively, a manufacturer can provide a simplified semi-automatic setup in which user intervention is required only for confirmation of a desired end point condition. Such user confirmation can be input, for example, by using a conventional wall mounted switch 32 shown in FIG. 1 or a hand-held transmitter unit 38, also shown in FIG. 1.

Pass-point information may be obtained in several ways. For example, an arm may be attached to the drive chain 60. A switch mounted to a fixed position on the drive rail may be positioned so as to be tripped by the arm, thus providing a signal to the control system that a pass-point has been detected. From that point on, movement of some portion of the drive system can be monitored to determine the position of the door being controlled. The use of an intermediate pass-point may overcome problems of drift encountered in control systems where only the end points of door travel are detected. In essence, in the embodiment described herein, end point drift problems can be substantially eliminated and, as a control measure, a signal developed at the pass-point can be relied upon as a base point to control operations relating to the length of travel to an end point.

Although mechanical sensors can be used to detect the pass-point, as outlined above, in the illustrated embodiment the pass-point is detected optically in order to eliminate problems such as contact deterioration associated with electrical switches or other mechanical detectors. An optical transmitter/receiver unit could be located on the support rail, and could be tripped by an opening in a drive element. Alternatively, the drive chain (or cable or other drive element) could carry a light-blocking or light-reflective "flag" which would interrupt or redirect the signal between the transmitter and receiver units.

However, in the illustrated embodiment, the pass-point system is preferably located within the power drive unit 20. This eliminates the need for separate installation of pass-point system components, and also protects components such as optical sensors from inadvertent contact and environmental contamination.

The optical pass-point herein is detected by monitoring rotation of a drive element, such as a gear or shaft, within the power head 20, and it is preferred that the motor drive shaft be directly monitored. Monitoring of rotation of a drive element also provides RPM information which can be translated into position of the door. RPM information (i.e., the length of the pulse at any instant in time), in the preferred embodiments may also be used to detect force obstructions on the door.

Figure 9:
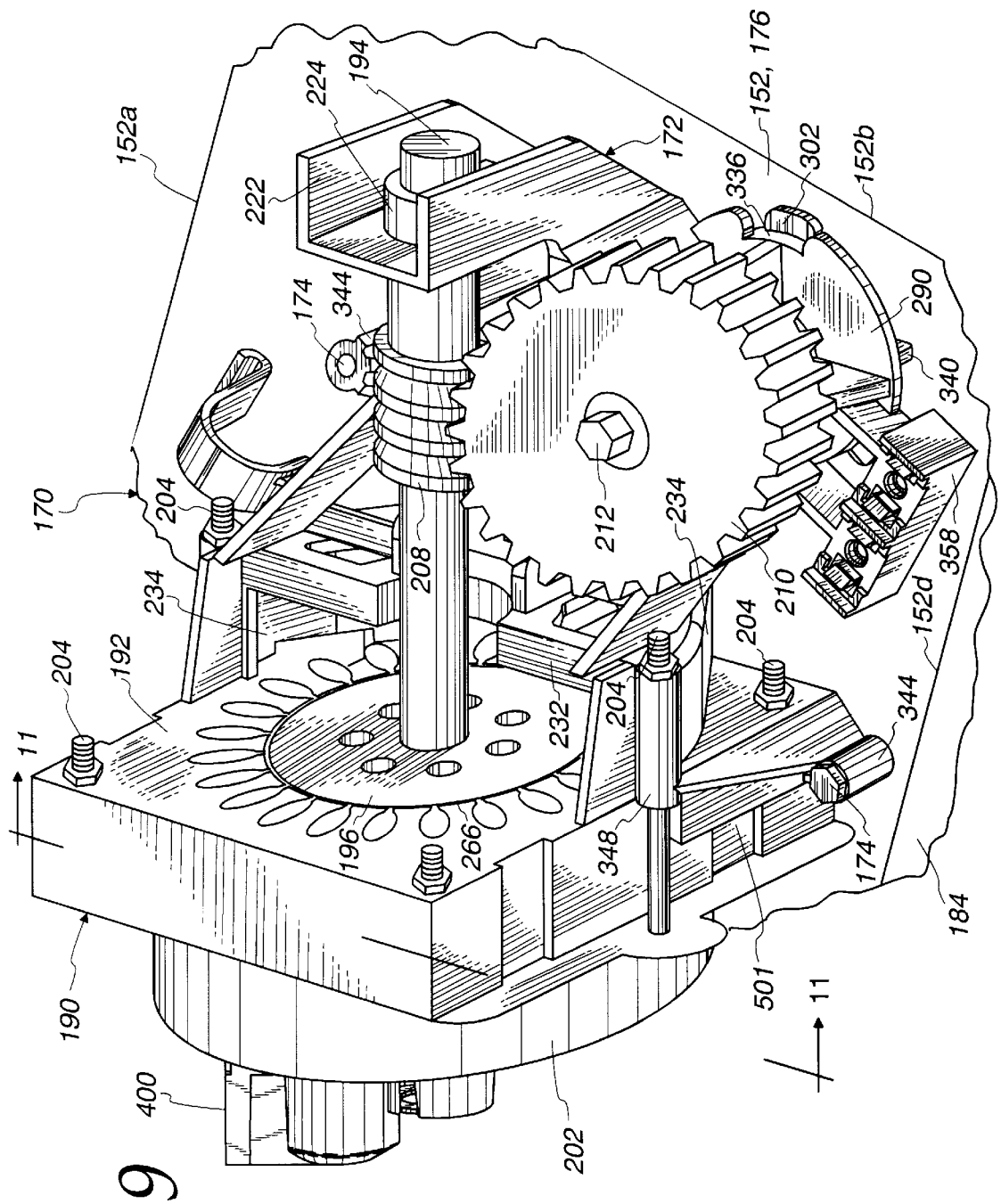
FIG. 9 is a perspective view of components internal to the power drive unit of FIG. 8.
Figure 10:
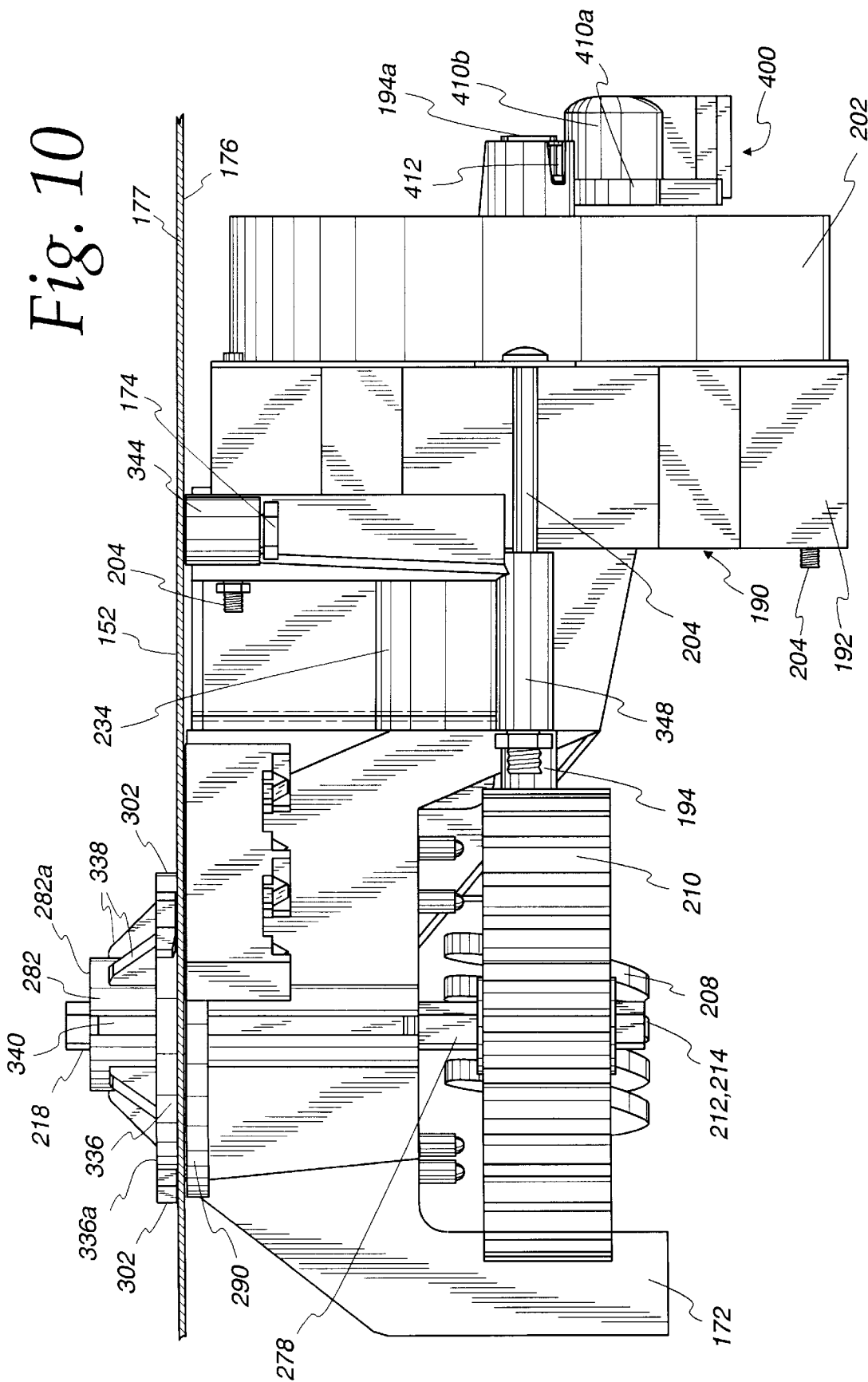
FIG. 10 is a side elevational view thereof.

Referring now to FIGS. 9, 10, and 17–24, a pass-point detector system generally indicated at 400 is provided adjacent an end bell of the motor. Referring to FIG. 10, the pass-point detector system 400 is preferably mounted on an end bell 202 so as to receive a motor shaft 194. In the preferred embodiment, slots 404 are formed in the end bell 202 along with an aperture 406 through which the motor drive shaft 194 passes. A pass-point assembly housing 410 provides rotatable mounting for a pinion or drive gear 412 which is keyed or otherwise coupled to the motor drive shaft 194 for non-slip rotation therewith. A housing 410 includes a bayonet mounting arrangement with a plurality of locking ears 414 which are received in the slots 404 of the motor end bell 202 so as to lock the housing 410 thereto.

Figure 18:
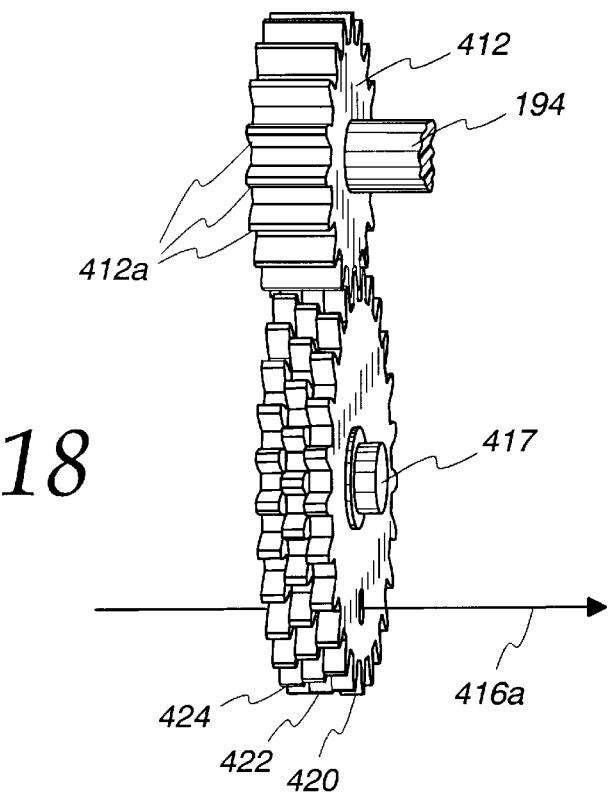
FIG. 18 is a fragmentary perspective view of the gear system portion of the pass-point mechanism of FIG. 17.
Figure 24:
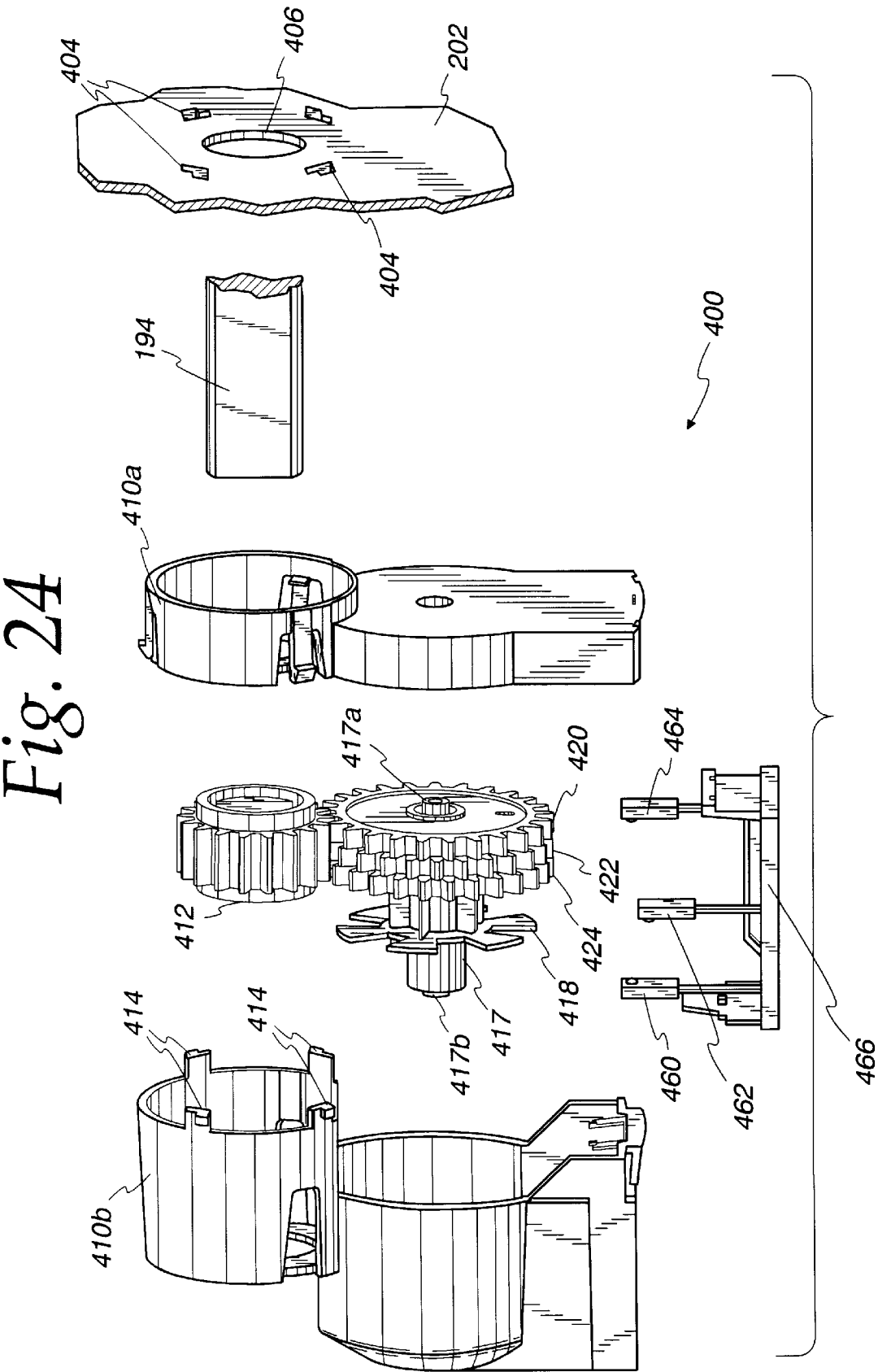
FIG. 24 is an exploded perspective view thereof.
Figure 27:
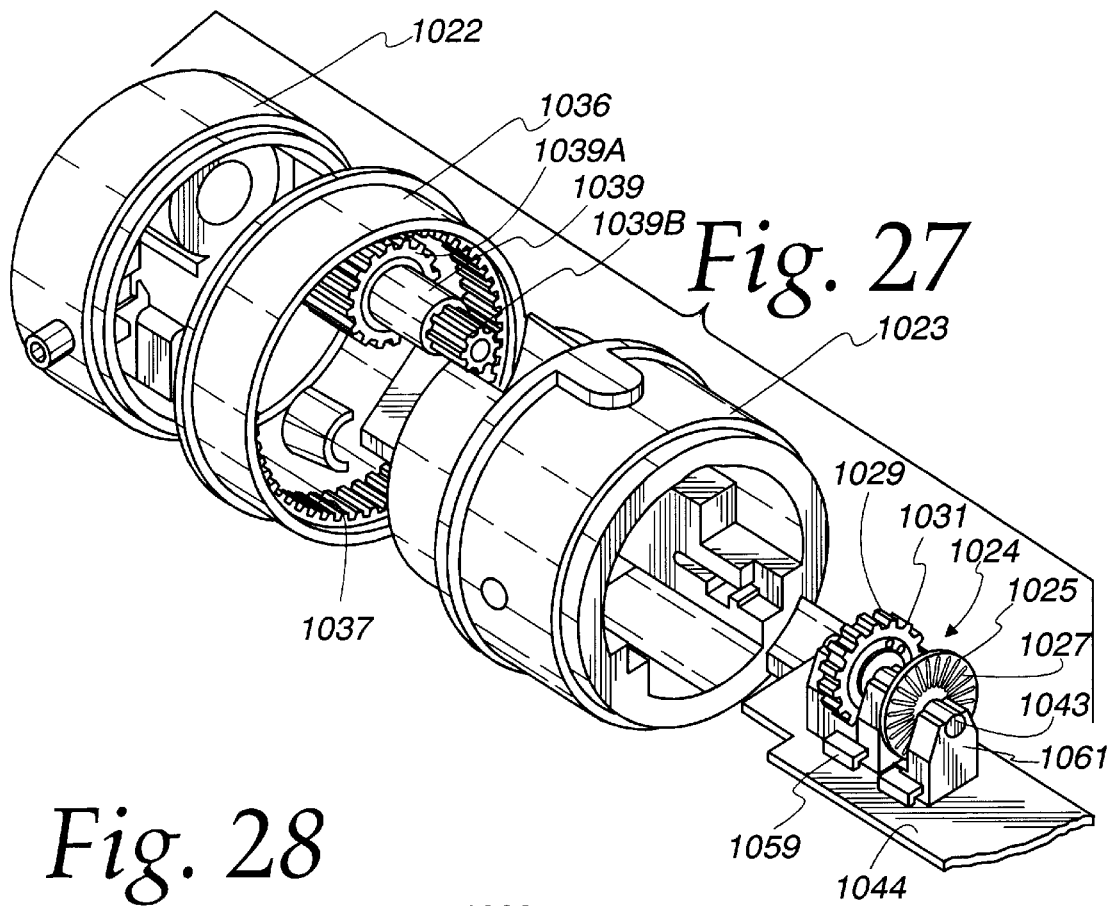
FIGS. 27 and 28 are two exploded perspective views of the pass-point assembly of the assembly of FIG. 26.
Figure 28:
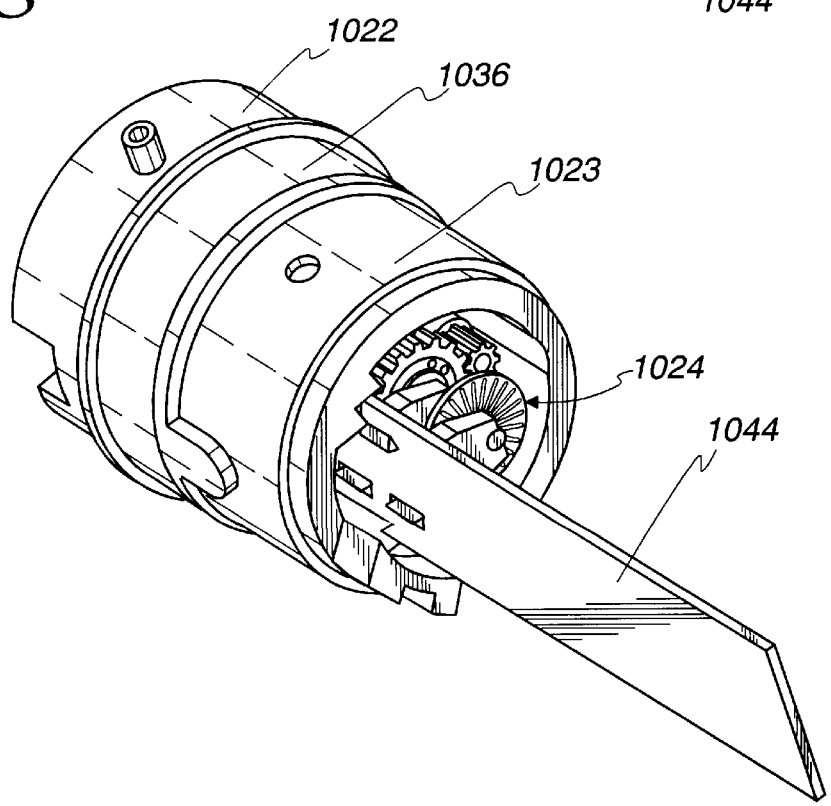
Figure 37:
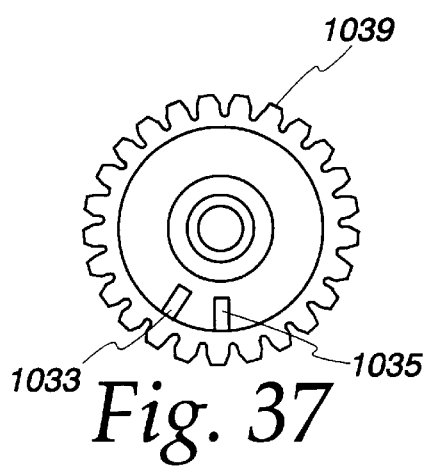
Figure 38:
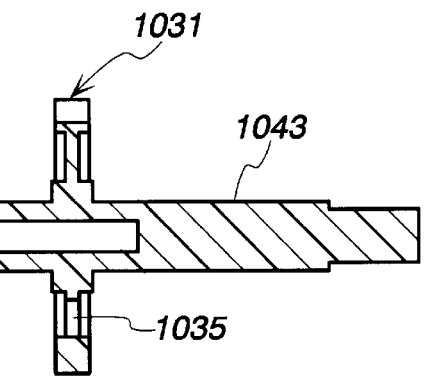

With reference to FIGS. 18, 22 and 24, the housing 410 is preferably comprised of two portions, 410a and 410b. A shaft 417 has a first end 417a rotatably supported in the housing portion 410a and a second end 417b rotatably supported in the housing portion 410b. A segmented or chopper disc 418 and spur or timing gears 420–424 are mounted on the shaft 417. Timing gear 420 and chopper disc 418 are fixed to the shaft 417 for non-slip rotation therewith, whereas the timing gears 422 and 424 are free to rotate about the shaft 417.

Figure 20:
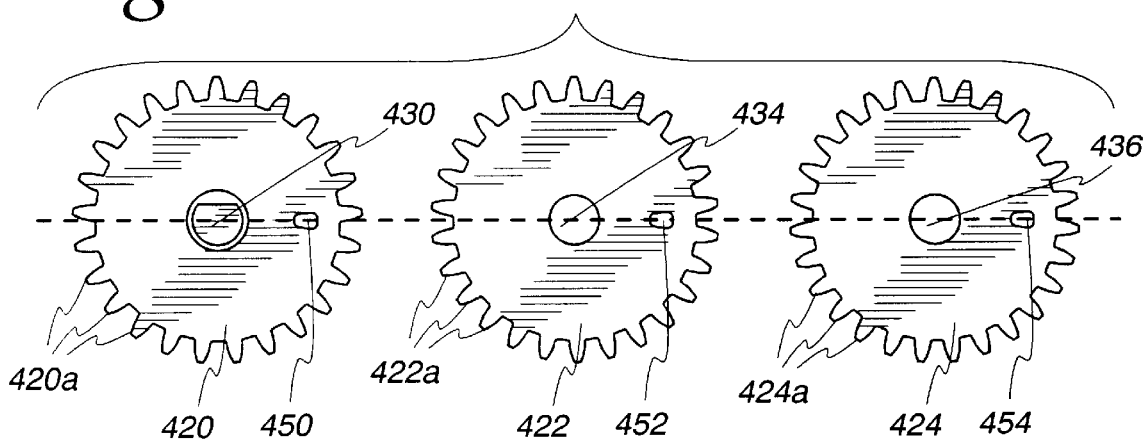
FIG. 20 is an elevational view of the timing gears thereof.

The timing gears 420–424 are illustrated in FIG. 20. Timing gear 420 has a central bore 430 which is keyed for non-slip rotation with the mounting shaft 417. Timing gears 422 and 424 have smooth central bores 434 and 436, respectively, so as to freely rotate with respect to and about shaft 417. Timing gears 420–424 have slightly different numbers of teeth 420a–424a, respectively. For example, in one particular embodiment, the timing gear 420 has 27 teeth whereas the timing gears 422 and 424 have 26 and 25 teeth, respectively. As indicated in FIGS. 18 and 22, for example, the teeth of the timing gears 420–424 engage the drive teeth 412a of a common pinion or drive gear 412.

Figure 19:
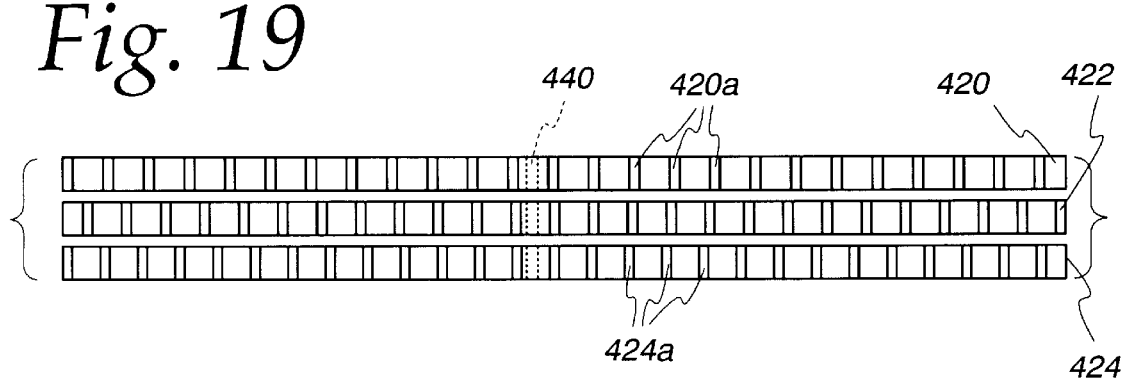
FIG. 19 is a schematic view of the timing gears thereof.

As shown in FIG. 22, the timing gears 420–424 have the same outer diameter for simultaneous intermeshing with the drive gear 412. The lowermost teeth 440 of the common drive gear 412 simultaneously engage adjacent uppermost teeth of the timing gears 420–424. Accordingly, the teeth of the timing gears are substantially aligned with one another at the point of contact with the driving gear 412. This alignment is schematically shown in FIG. 19 in which the teeth of the timing gears are laid out in a coplanar depiction, similar to that of a cylindrical projection. The broken lines 440 in FIG. 19 indicate the position of the lowermost tooth 440 of drive gear 412. As shown in FIG. 22, due to the common alignment of timing gears 420–424 at their bottom positions, there is an increasing misalignment of the drive gear teeth as the top of the timing gears is approached.

Referring again to FIG. 20, the timing gears 420–424 have relatively small sized holes or apertures 450–454, respectively, located at the same radii from their respective centers of rotation. When the apertures 450–454 are aligned, they form a common passageway through all three timing gears, as indicated by the light beam 416 passing through the timing gears in a leftward direction. FIG. 21 shows the timing gears 420–424 in partial cross section, with the apertures 450–454 aligned. As indicated in FIG. 21, it is generally preferred that the apertures 450–454 have similar dimensions such that the common passageway resulting from their alignment has generally constant cross-sectional dimensions. As can be seen in FIGS. 20 and 22, the apertures and the timing gears have an approximate size of the width of one of the teeth of those timing gears.

In one embodiment of the invention, the gear configurations are selected so that alignment of the apertures will occur about once every nine hundred rotations of the motor shaft 194, so that such alignment will occur only once during travel of the door 12 through its full range of motion between its open and closed positions. With rotation of drive shaft 194 in either direction, the alignment indicated in FIGS. 18, 21 and 22 will be interrupted as the beam transmitting apertures of all three timing gears will no longer be aligned with one another. However, with an equal reverse rotation of rotor shaft 194, the alignment of the beam transmitting apertures will be restored in a precise, unchanging manner, unaffected by external conditions. The approximately 1:900 ratio identified above is given only as an example, and other ratios may be employed in other embodiments.

Referring now to FIG. 23, an emitter 460 is located to one side of the chopper wheel 418 and is positioned so as to direct a beam or signal through the teeth of the chopper wheel 418 A first receiver 462 is located between the chopper wheel 418 and timing gears, while a second receiver 464 is located beyond the timing gears. In the preferred embodiment, the emitter 460 and receivers 462 and 464 operate with optical beams or signals such as infrared beams or signals, although other types of devices transmitting beams in other wavelengths could also be used. The emitter may comprise a light-emitting diode (LED).

Figure 17:
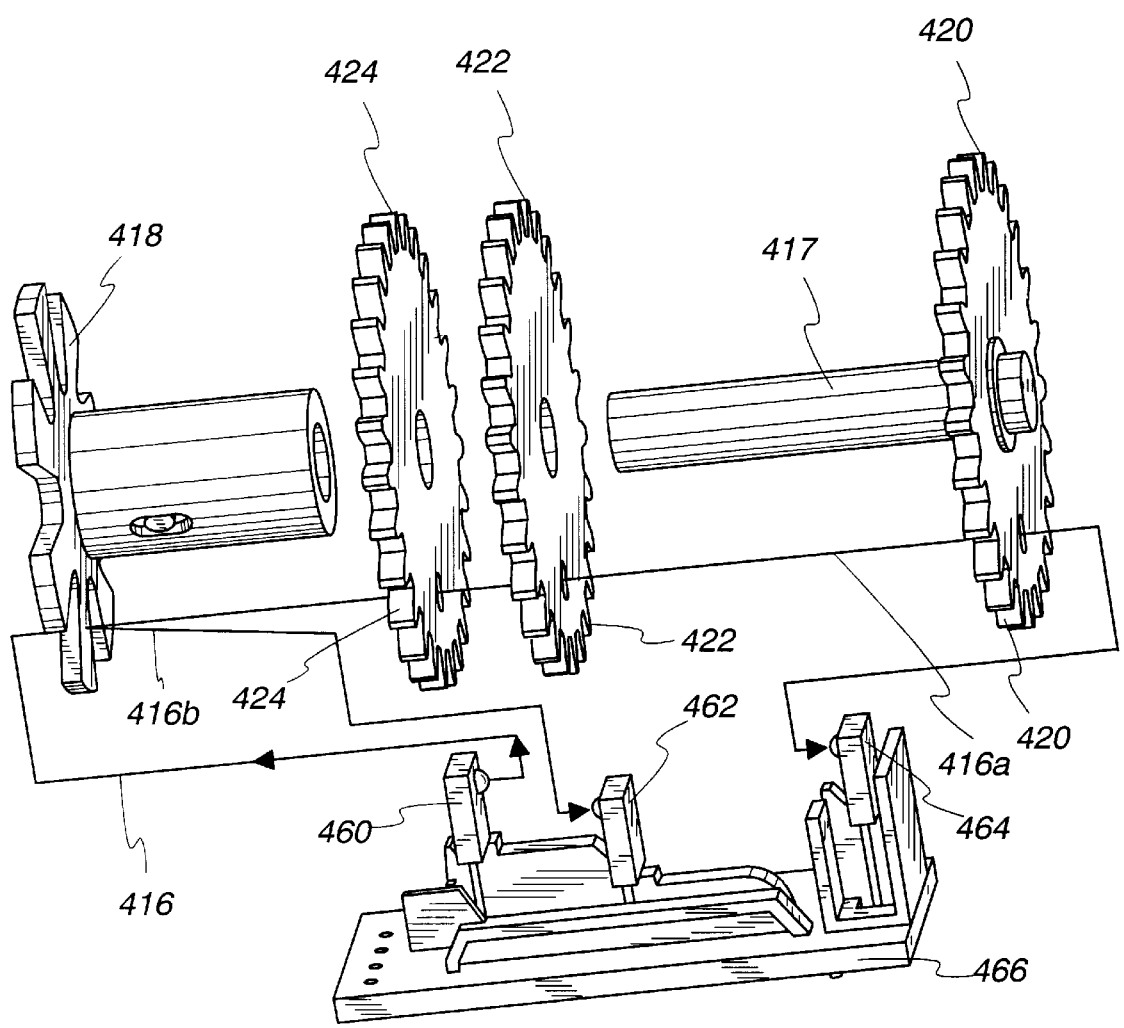
FIG. 17 is an exploded perspective view of a pass-point mechanism.

With reference to FIGS. 17 and 24, the emitter 460 and receivers 462, 464 are mounted on a common base 466, which is received within the lower portion of housing 410 and which maintains the emitter and receivers in desired alignment with the chopper wheel and timing gears, as described above.

As indicated schematically in FIG. 17, a light beam 416 passes between the teeth of the chopper wheel 418. A portion of the beam indicated by line 416a passes through the aligned passageways in the timing gears 420, 424 so as to be received by the receiver 464. A second portion of the energy from the emitter 460 indicated by line 416b is received by the first receiver 462 without passing through the timing gears.

Chopper wheel 418 operates in a known manner to divide the rotations of the shaft 417 into multiple portions so as to cause a series of flashes to be detected by the receiver 462. The number of teeth on the chopper wheel may be increased if desired in order to obtain a greater resolution of the angular displacement of shaft 417. In the preferred embodiment, the chopper wheel 418 is fixed to the shaft 417 for non-slip rotation therewith, in a manner similar to the mounting of the timing gear 420. Thus, both the timing gear 420 and the chopper wheel 418 are, in a rotational sense, locked together. Due to the interengagement of teeth 420a, 412a, rotation of the chopper wheel is directly related to rotation of the shaft 194 in a non-slip manner. Thus, by taking into account gear ratios in a known manner, rotation of the shaft 194 can be directly determined by counting the pulses sensed by the receiver 462. The pulses sensed by receiver 462 are also used to provide an RPM interrupt signal (described below). The RPM interrupt signal is used, among other things, to provide position information to a position detector (described below). The position detector provides information as to the position of the door.

Upon receipt of a signal passing through the timing gears 420–424, receiver 464 triggers a signal to appropriate circuitry that the pass-point is detected. In the preferred embodiment, the controller to which the emitter 460 and receivers 462, 464 are coupled counts pulses detected by each receiver. A pulse detected by receiver 464 indicates the detection of the pass-point and provides a known reference indication to the controller. The number of pulses detected by receiver 462 will indicate the amount of rotation of rotor output shaft 194 away from the pass-point condition, thereby measuring displacement of the door. The controller uses the information provided by receivers 462 and 464 to bring the door to a stop at a preset open or closed position, without automatic reversal of the door. The pass-point is independent of external physical components of the movable barrier system, and can therefore be used as a reliable objective basis for automatic control of the moving door Position of the door is preferably determined by relation to the pass-point. Preferably the pass-point is arbitrarily set at "0", position above the pass-point are arbitrarily set as negative values and position below the pass-point are set as positive values. When the door travels through the pass-point, the position of the door is set to "0." During travel of the door, the position of the door is incremented or decremented, depending on the direction of travel, with each detected RPM pulse.

In other embodiments, instead of employing a single emitter and a pair of receivers, the apparatus may employ a single receiver and a pair of emitters, with the emitters being rapidly switched on and off by the controller so that, at any particular time, one emitter is on and the other is off. The controller can then determine the source of each pulse sensed by the receiver. The emitter may comprise LED's or other light sources.

In addition to enabling limits of travel to be set and maintained with precision, additional functions can be performed with the information provided by the pass-point system. For example, the pulses detected by receiver 462 may be counted, and the number stored for each fully opened and fully closed position attained by garage door 12. Differences in the number of counts detected to attain a fully closed or fully opened door position can, with improved confidence, be correlated to door position. Criteria can be established for the maximum allowable deviation of pulses detected in receiver 462, subsequent to attaining the pass-point condition, needed to attain an open or closed door position. Upon excursion beyond the maximum allowable limit, corrective action can be taken.

Dual Pass-Point System

Referring now to FIG. 25, an operator system for movable barriers is employed for controlling the opening and closing of a conventional rolling shutter 1012. The rolling shutter 1012 is mounted on guide rails 1014 for movement between the closed position illustrated in FIG. 25 and an open or raised position. The wall 1018 defines an opening blocked or covered by rolling shutter 1012. As shown, guide rails 1014 are mounted to wall 1018 in a conventional manner.

A power drive unit or head, generally indicated at 1020, is mounted to the top of the frame 1010 in a conventional manner. In the two views shown in FIG. 25, the head unit 1020 is shown mounted on opposite sides of the top of frame 1010. As will be seen herein, a motor in head unit 1020 propels a sleeve 1042 to raise and lower rolling shutter 1012 via the coupling of sleeve 1042 to rolling shutter 1012

Control for the head unit 1020 may be as described above for garage door operator 20, i.e., using a push button control or a keypad mounted at another location on a wall. Additionally, head unit 1020 may also include a conventional radio receiver (not shown) for receiving radio signals from a remote control transmitter. If desired, the head unit 1020 may be mounted on either side of the frame 1010. As will be described below, mounting on either side of the frame does not entail special installation with respect to the direction of rotation of the motor for opening the shutters. When the unit 1020 is mounted on one side of the frame, motor rotation counterclockwise will open the rolling shutter. When the unit is mounted on the other side of the frame, motor rotation clockwise will open the rolling shutter. In this way, the user can install the unit 1020 in any convenient location, i.e. for size considerations or operational considerations, without having to perform any special adjustments with respect to the direction of rotation of the motor.

As shown in FIG. 26, head unit 1020, includes a tubular housing 1038 and end sections 1022 and 1034. Within the housing 1038 is the motor 1030 which includes an output shaft 1031 coupled at one end to end section 1034 and at the other end for driving gear assembly 1032. The output from gear assembly 1032 is provided to output ring 1040, which is fixedly attached to outer sleeve 1042. Rolling shutters are attached to outer sleeve 1042, so that when motor 1030 runs, outer sleeve 1042 rotates, causing rolling shutters to open or close (depending on direction of rotation of motor 1030).

Outer sleeve 1042 is also fixedly attached to ring 1036. Ring 1036 drives pass-point assembly 1024. Pass-point assembly 1024 is coupled to control board 1044. Control board 1044 contains the electronics for starting and controlling the motor 1030 (see FIGS. 39a–39c). Capacitor 1026 is used to start motor 1030 (described below). A brake 1028 is provided to slow motor 1030 when the rolling shutters are approaching a limit position.

Referring to FIG. 30, brake 1028 includes brake housing 1116 which couples with magnet housing 1102. Magnet housing 1102 encloses bobbin 1104 and core 1106. Core 1106 includes a recessed end with a hole for receiving spring 1109 and shaping ring 1108. Brake plate 1110 is attached to the other end of spring 1109. Friction surface 1112 is disposed within brake hub 1114 which is supported within housing 1116.

When current is applied to the motor 1030, the brake 1028 is in series with the motor 1030. With current applied, brake 1028 is energized and magnetically attracts brake plate 1110, pulling it away from friction surface 1112. With no current applied to the motor, spring 1109 holds the plate 1110 against the friction surface 1112.

Referring to FIGS. 27–38, pass-point assembly 1024 includes a shaft 1043. Pass-point gears 1029 and 1031 and RPM sensor 1025 are fixedly attached to the shaft 1043. Pass-point assembly 1024 is mounted or attached to the control board 1044 via supports 1061 and 1059. Support 1061 includes a groove which rotatably supports shaft 1043. Supports 1059 secure support 1061 to control board 1044. Control board 1044 is rigidly attached to end section 1022 and piece 1023. End section 1022 and piece 1023 are coupled together with ring 1036 disposed therebetween.

Ring 1036 includes geared teeth on the inner surface which are used to drive pinion gear assembly 1039. Pinion gear assembly 1039 includes pass-point gears 1039a and 1039b. Gear 1039a is directly driven by the geared teeth on the inner surface of ring 1036. Gear 1039b directly drives pass-point gears 1029 and 1031 of pass-point assembly 1024. Thus rotation of ring 1036 drives gears 1039a and 1039b, which drives pass-point gears 1029 and 1031 of pass-point assembly 1024. Pass-point gears 1029 and 1031 and RPM sensor 1025 are fixedly attached to shaft 1043, so that rotation of pass-point gears 1029 and 1031 drives shaft 1043, which drives RPM sensor 1025.

An optical interrupter module (not shown, but similar to that described above) provides an optical beam from an optical emitter to an optical detector. The pass-point assembly is positioned within the path of the optical beam. Preferably two optical beams are provided, one for the pass-point gears and one for the RPM sensor.

In the preferred embodiment, two LED's, D11 and D2 (see FIG. 39b), provide the optical beam. When a movement command is received, a controller, i.e., Microprocessor or microcontroller 500 provides an enable signal to drive the LEDs. In particular, microcontroller 500 provides an enable signal from pin P03 to the base of transistor Q5 (see FIG. 39b). Transistor Q5 drives LEDs D11 and D2, which provide the light signal for use in the RPM and pass-point optical interrupter modules. LED D11 provides an optical signal which is interrupted by pass-point gears 1029 and 1031. LED D2 provides a light signal which is interrupted by RPM sensor 1025.

RPM sensor 1025 is a generally circular wheel which includes a plurality of slits or openings 1027 spaced about the wheel. RPM sensor 1025 is positioned within the line of an optical beam from an optical interrupter (described above) which is alternately blocked by the solid portions of the wheel or passes through each slit 1027 for detection by an optical detector (not shown).

The optical detector generates an RPM signal, which comprises a series of pulses, each with a rising and a falling edge. The size and spacing of slits 1027 are known so that the duration between rising and/or falling edges can be used as a measure of the rotational speed of the motor 1030 The RPM signal is applied to the base of transistor Q3 which turns on and off transistor Q3, providing an RPM interrupt signal to pin P30 of microcontroller 500 (see FIG. 39a) Use of the RPM interrupt signal is described with reference to FIG. 43.

Pass-point gear 1029 includes a plurality of spurs or teeth 1041 and a single slit or opening 1037. Pass-point gear 1031 includes a plurality of spurs or teeth 1039 and two slits or openings 1033 and 1035 separated by an offset in degrees. Slits 1033, 1035 and 1037 are the same size (window). In this preferred embodiment, pass-point gear 1029 has 26 teeth 1041 and pass-point gear 1031 has 25 teeth 1039.

When the operator 1020 is mounted in on one side of the opening, slit 1033 and slit 1037 line up once during travel of the rolling shutter between its open and close limits. When the operator 1020 is mounted on the other side of the opening, slit 1035 and slit 1037 line up once during travel of the rolling shutter between its open and close limits. When the pass-point gears line up, a beam of light passing from the optical emitter to an optical detector is detected and the "pass-point" is found.

Figure 39A:
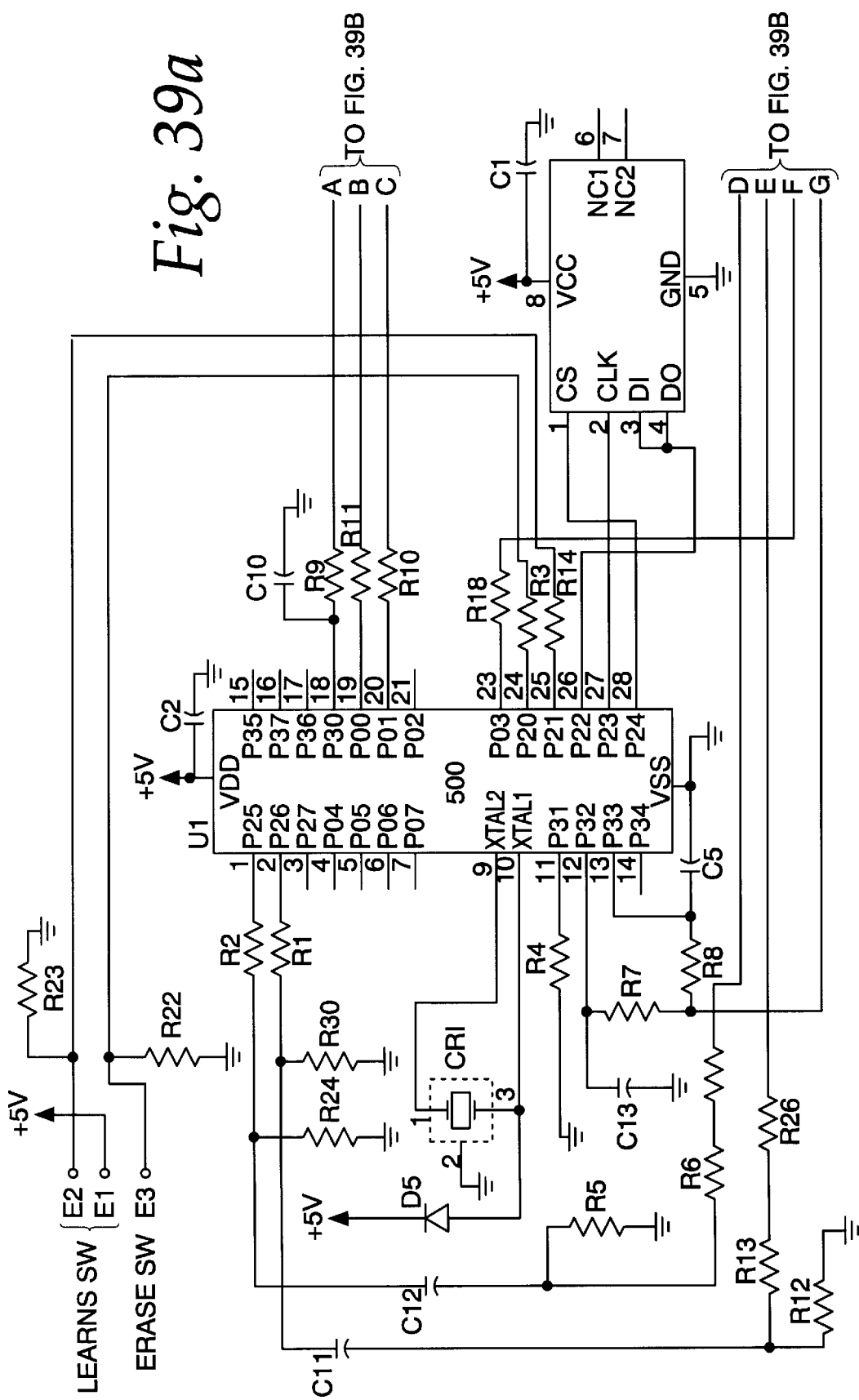
FIGS. 39a–39c are a circuit diagram of a controller for the tubular assembly of FIG. 26.
Figure 48:
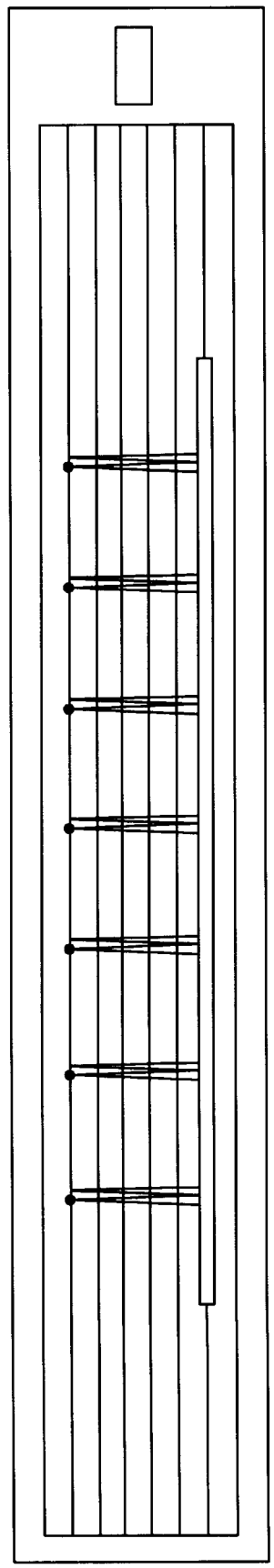
FIG. 48 is chart showing a sample timing for the pass-point system shown in FIGS. 27 and 28.

When the pass-point is found, a pass-point signal from the optical detector is applied to the base of transistor Q4, which turns on and off transistor Q4, providing a pass-point interrupt signal to pins P32 and P33 of microcontroller 500 (see FIG. 39a). Operation of the pass-point interrupt signal is described with reference to FIG. 42. FIG. 48 shows sample timing for the pass-point system with the peaks indicated by a solid circle corresponding to the pass-point in one direction and the peaks indicated by the vertical line corresponding to the pass-point when the operator is mounted in the other direction.

Figure 39B:
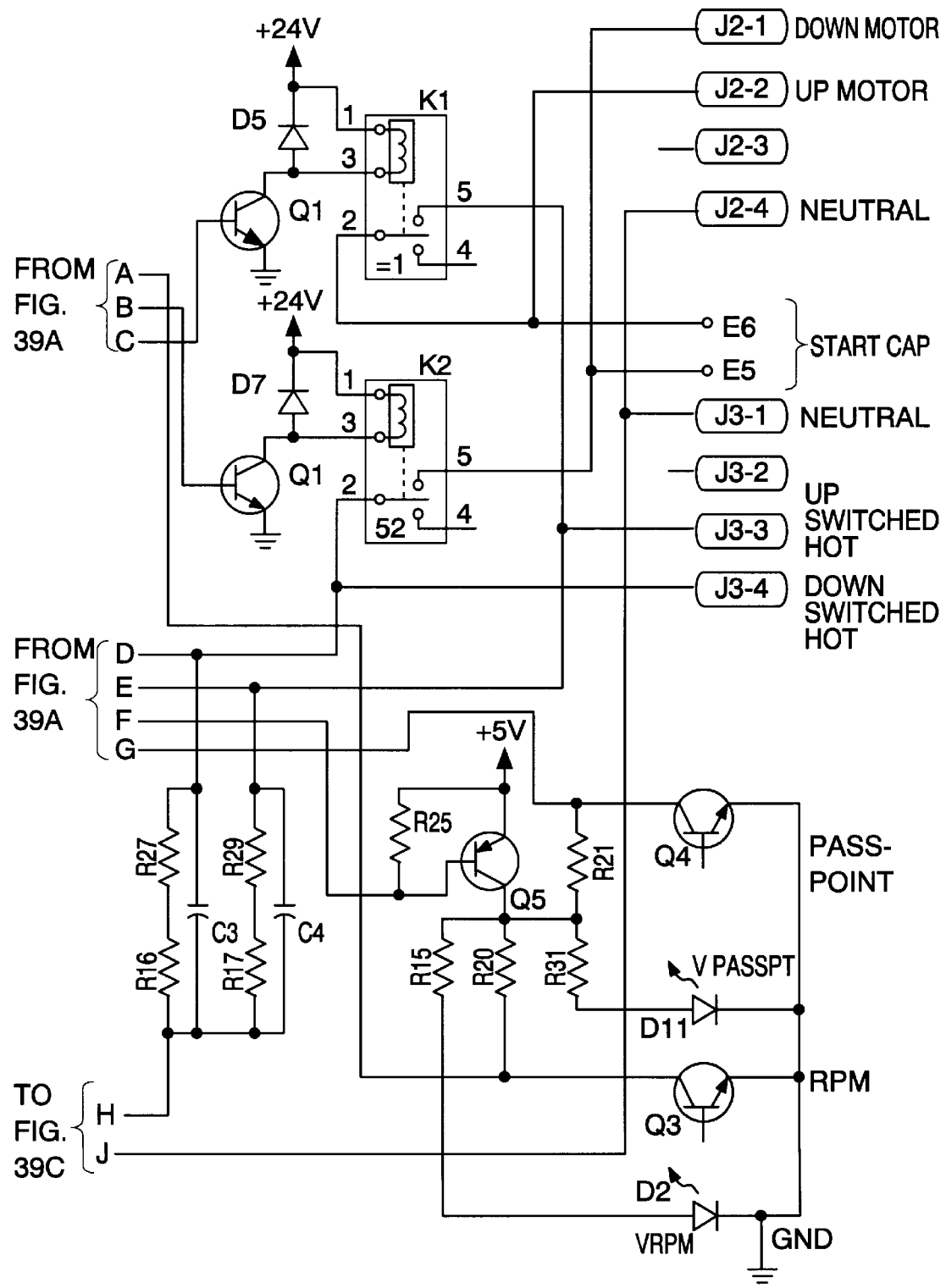
Figure 39C:
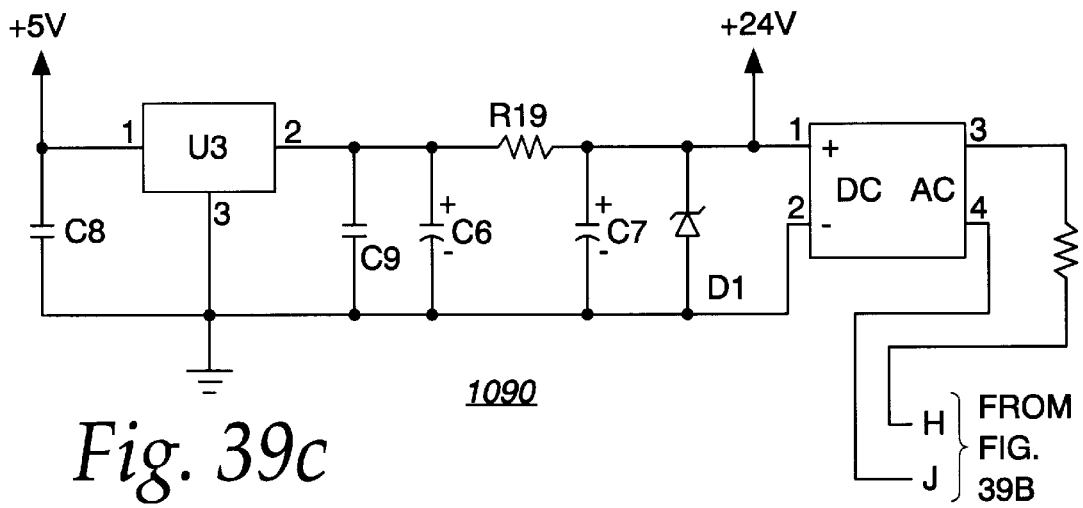

A schematic of the control circuit located on control board 1042 is shown in FIGS. 39a–39c. Microcontroller 500 operates the various software routines which operate the rolling shutter operator 1020. Microcontroller 500 may be a Z86733 microprocessor. In this particular embodiment, the rolling shutter is controlled only by a wall or unit mounted switch. However, the control circuit can be modified to include a receiver so that the rolling shutter can be commanded from a remote transmitter (as described above). Power supply circuit 1090 in FIG. 39c provides plus 5 volts to drive the logic circuits and plus 24 volts to drive the relays.

Upon receipt of a rolling shutter movement command signal from a wall mounted or other switch, the microcontroller 500 provides a signal to either relay K1 or relay K2 depending on the direction the shutter is being commanded to move. Relays K1 and K2 are used to control the direction of rotation of motor 1030 and to provide the start signal to starting capacitor 1026. Relay K1 is used to move the motor in the UP (or open) direction; relay K2 is used to move the motor in the DOWN (or close) direction.

In particular, when the microcontroller 500 has received an UP command, microcontroller 500 provides an enable signal from pin P01 to the base of transistor Q1. Transistor Q1 conducts causing relay K1 to close its internal switch S1 to set the direction of the motor 1030 rotating in the UP direction. When internal switch S1 of relay K1 is closed, voltage is provided to starting capacitor 1026 which starts motor 1030 rotating. A signal is also provided to microcontroller 500 at pin P26.

Similarly, when microcontroller 500 receives a DOWN command, it sends an enable signal from pin P00 to the base of transistor Q2 which causes transistor Q2 to conduct, causing relay K2 to close its internal switch S2 to set the direction of the motor 1030 rotating in the DOWN direction. When internal switch S2 is closed, voltage is applied to starting capacitor 1026 which starts motor 1030 rotating. Also, a signal is provided to microcontroller 500 at pin P25.

Microcontroller 500 reads from and writes data to an EEPROM 502 from pins P22, P23 and P24. EEPROM 502 may be a 125C0109. When the user selects LEARN SW, a learn enable signal is provided to microcontroller 500 at pin P21. When the user selects ERASE SW, an erase enable signal is provided to microcontroller 500 at pin P20. Details of the learn and erase routines are described below. UP and DOWN switches are connected from the externally switched power going into J21 and J22. These may also be applied to D, E or J3-4, J3-3 as labeled on FIG. 39B.

Figure 40:
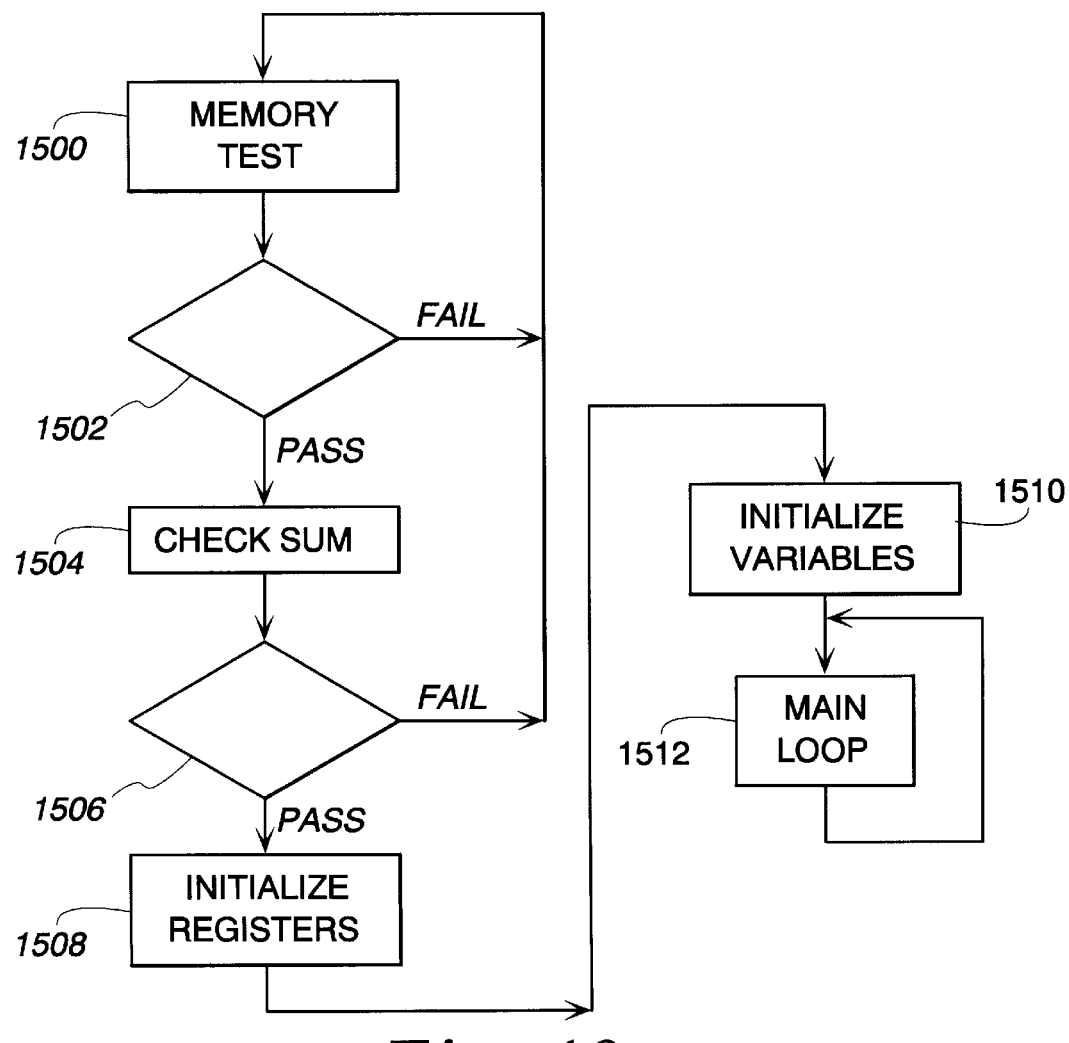
FIG. 40 is a flow chart of the overall software routine executed in the microcontroller shown in FIG. 39.

Operation of head unit 1020 is controlled by various software routines stored in memory of microcontroller 500. When the operator is first turned on, the microcontroller 500 executes an overall routine shown in FIG. 40. First, a memory test at block 1500 is executed. At block 1502, the microcontroller 500 checks if the memory test passes or fails. If it fails, the microcontroller 500 loops back to block 1500. If the memory test passes, the routine continues to block 1504 where a checksum routine is run. If the checksum fails at block 1506, the routine loops back to block 1500. If the checksum passes, the microcontroller 500 initializes all registers at block 1508 and all variables at block 1510. Then microcontroller 500 executes main loop 1512 continuously.

Referring to FIGS. 46a–46d, the main loop routine is executed beginning at block 1750. The routine checks the value in the UP_AND_DOWN flag. This flag indicates which of the UP and DOWN user input switches have been input. A value of 1 means the shutter has been commanded to move UP. A value of 2 means the shutter has been commanded to move DOWN. A value of 3 means both switches have been pressed. At block 1752, microcontroller 500 enables the optical interrupters (IR's) for the pass-point assembly. At block 1754 the routine checks if both the ERASE and the LEARN buttons have been pressed. If yes, the routine branches to the pass-point reset routine at block 1760. If not, the routine checks the value in the LEARNED flag. If the LEARNED flag is not equal to 2, the UP and DOWN limits must be learned, so the routine branches to the FIRST_TIME routine at block 1762.

If the LEARNED flag=2, the routine checks at block 1758 if the ERASE input is active (if the user wants to erase values stored in memory and has pressed the ERASE switch), ERASE_LEARN=1. If it is, the routine branches to block 1764 and checks the value of the position counter. If the position counter is less than zero, the DOWN limit is cleared at block 1766. If the position counter is greater than zero, the UP limit is cleared at block 1768. At both blocks 1766 and 1768, the ERASE_LEARN flag is cleared, the LEARNED flag is loaded with 1 and the values are written to the EEPROM 502.

At block 1770 ERASE_LEARN flag is loaded with 1. Then at block 1774 the routine loops while the ERASE_LEARN flag=1. If the ERASE_LEARN flag is not 1, the routine branches back to block 1752.

If the result of block 1758 is not 1, the routine checks if the LEARN input is active (if the user has selected the LEARN switch), ERASE_LEARN=2. If so, the routine checks if the rolling shutter is above the pass-point at block 1776. If above the pass-point, the routine sets the upper limit, writes the value to EEPROM 502 and clears the ERASE_LEARN flag at block 1782. At block 1786 the routine loads the ERASE_LEARN flag with 2. At block 1788 the routine loops while the ERASE_LEARN flag is 2. If not, the routine branches back to block 1752.

If the rolling shutter is below the pass-point, at block 1778, the routine sets the lower limit, clears the ERASE_LEARN flag, and writes the values to EEPROM 502. At block 1780 the routine loads the ERASE_LEARN flag with 2 and loops at block 1784 while it equals 2. If not, the routine branches back to block 1752.

If the ERASE_LEARN flag is not 2, at block 1790 the routine checks if both the UP and DOWN inputs have been pushed (UP_AND_DOWN=3). If yes, the routine branches to block 1750.

If the UP_AND_DOWN flag is not 3, the routine checks if the flag is 1, indicating the DOWN button has been pressed, at block 1792. If the DOWN button was pressed, the routine checks if the rolling shutter is at the UP limit at block 1798. If yes, the routine checks if the UP button has been released at block 1800 and loops until it has been released. Once released, the routine goes to sleep at block 1804. If not at the UP limit, the routine enables the UP relay and enables the optical interrupters at block 1806. At block 1808 the routine again checks for the UP limit. At block 1814 the routine checks for UP switch release. If not, the routine branches to block 1808. If released, the routine branches to block 1816. Once the UP switch is released, the routine turns off the UP relay and optical interrupters and writes the values to the EEPROM 502 at block 1810. Then at block 1812 the routine loops until the UP switch has been released. Once released the routine turns off the UP relay and optical interrupters, clears the UP_AND_DOWN flag, writes the values into the EEPROM 502 and goes to sleep at block 1816.

If the DOWN switch was not pressed, the routine checks if the UP switch was pressed (UP_AND_DOWN=2) at block 1794. If not, the routine jumps to CHECK_FOR_ERASE_LEARN at block 1796. If yes, the routine checks if the rolling shutter is at the DOWN limit at block 1802. If yes, the routine checks and loops until the UP button is released at block 1818, then goes to sleep at block 1820.

If not at the DOWN limit, the routine enables the DOWN relay and optical interrupters at block 1822. Then the routine checks for the DOWN limit at block 1824. If yes, the DOWN relay and optical interrupters are turned off and the values written to EEPROM 502 at block 1826. Then the routine loops until the DOWN switch has been released at block 1828. If the DOWN limit has not been reached the DOWN switch release is checked at block 1830, then the routine loops back to block 1824. Once released the routine turns off the DOWN relay and optical interrupters, clears the UP_AND_DOWN flag, writes the values to EEPROM 502 and goes into stop mode at block 1832.

Three asynchronous interrupt routines interrupt operation of the main loop: the TO (Timer 0, a hardware timer in the microcontroller) interrupt 1514, the RPM interrupt 1516 and the pass-point interrupt 1518.

Figure 42:
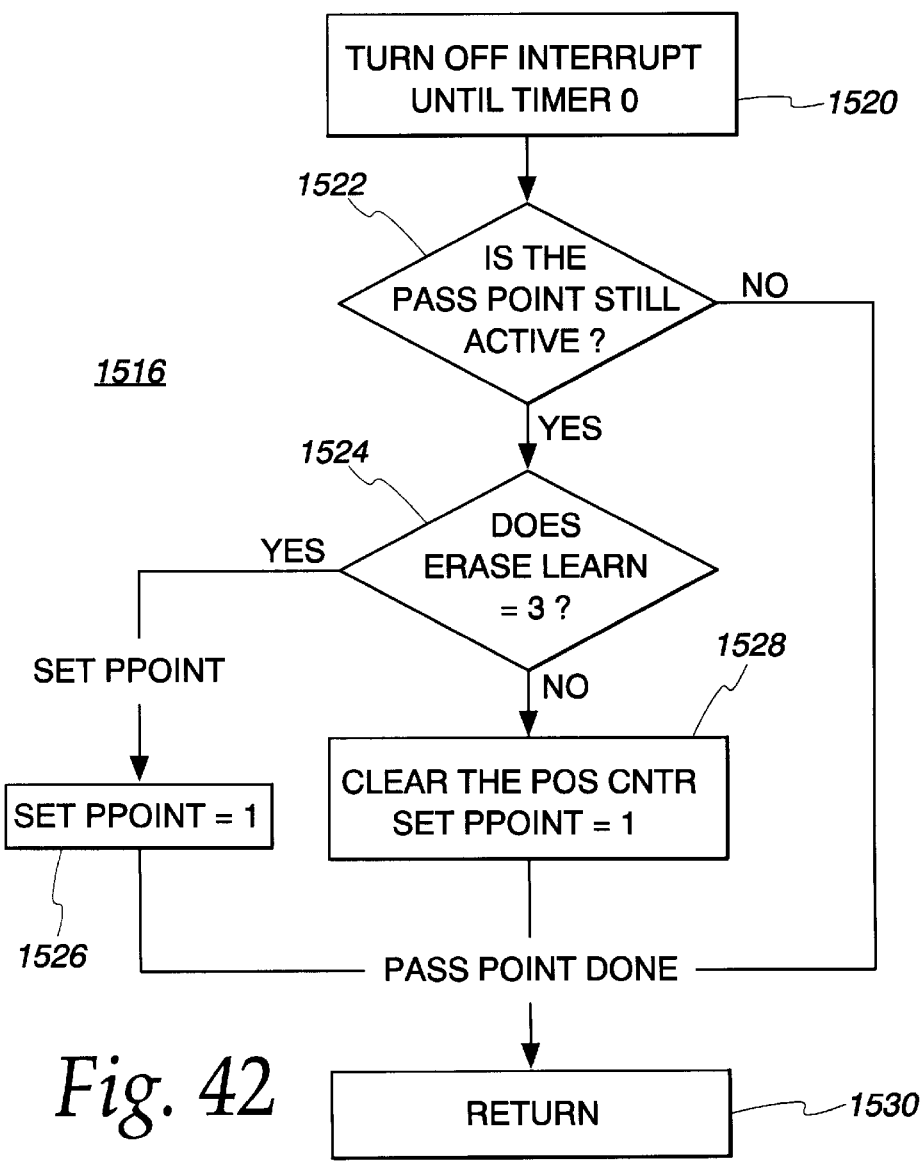
FIG. 42 is a flow chart of the pass-point interrupt routine executed in the microcontroller shown in FIG. 39.
Figure 41:
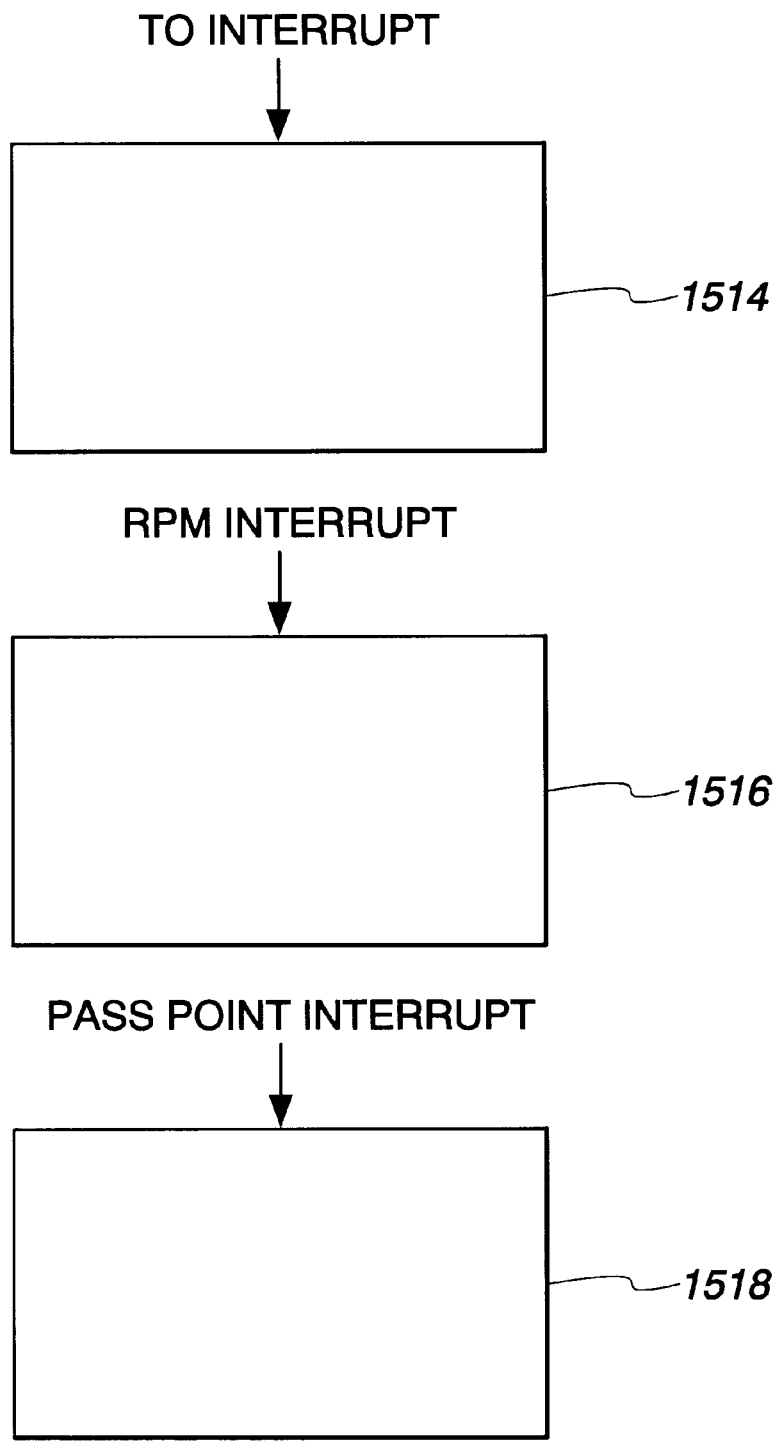
FIG. 41 is a flow chart of some of the interrupt routines executed in the microcontroller shown in FIG. 39.

Referring to FIG. 42, when the pass-point is reached, and a pass-point signal applied to pins P32 and P33 of microcontroller 500, pass-point interrupt routine 1518 is executed. At block 1520, the microcontroller turns off the pass-point interrupt until Timer 0. At block 1522, the microcontroller checks if the pass-point is still active. If not, the pass-point is done and the routine branches to block 1530 and returns to wherever the main loop was executing. If the pass-point is active, the routine checks at block 1524 if ERASE_LEARN=3. If not, the routine clears the position counter (sets it to zero) and sets the pass-point (PPOINT=1), at block 1528 and returns at block 1530. If ERASE_LEARN=3, the routine sets the pass-point (PPOINT=1) and returns at block 1530.

Figure 43:
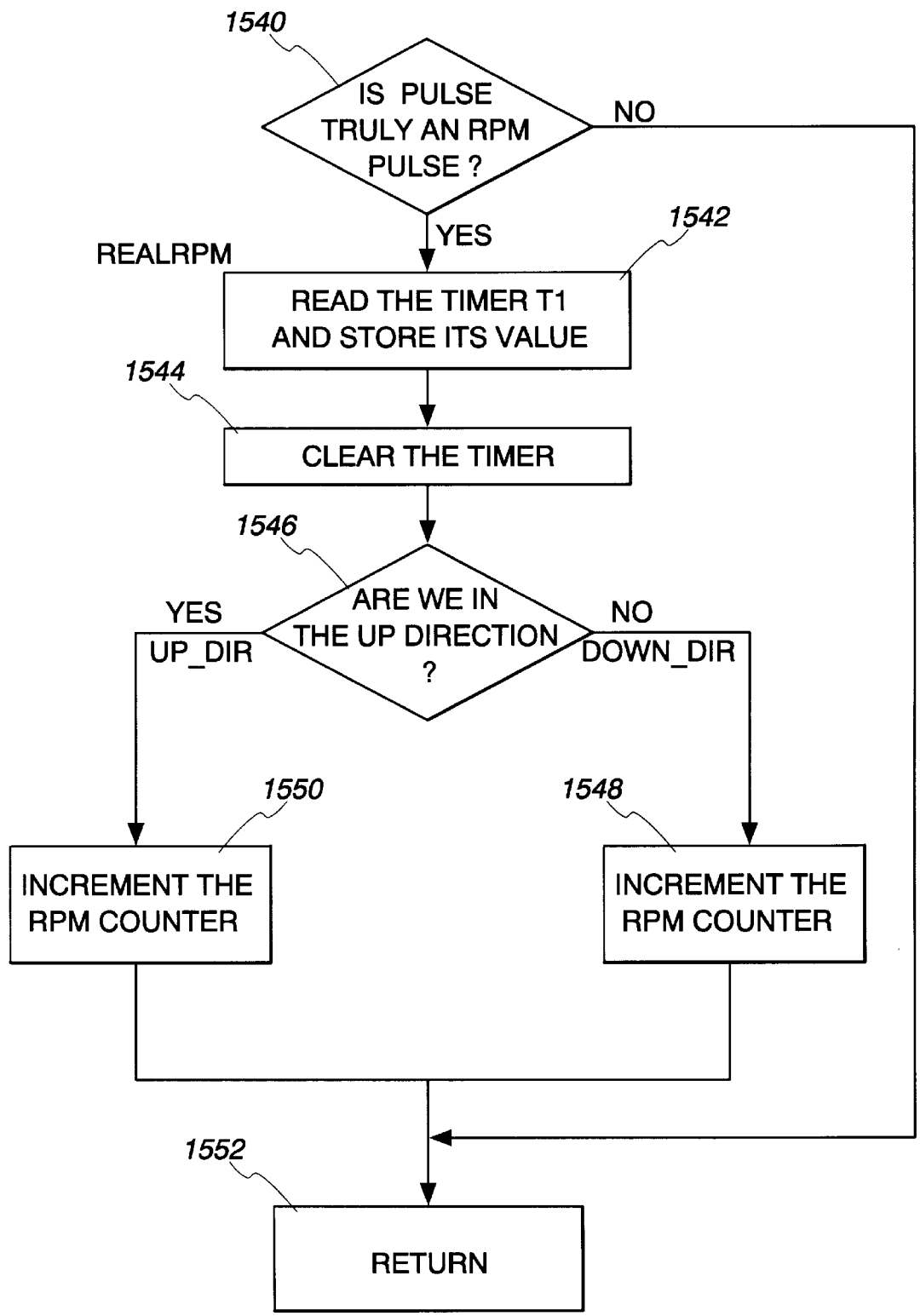
FIG. 43 is a flow chart of the RPM interrupt routine executed in the microcontroller shown in FIG. 39.
Figure 44A:
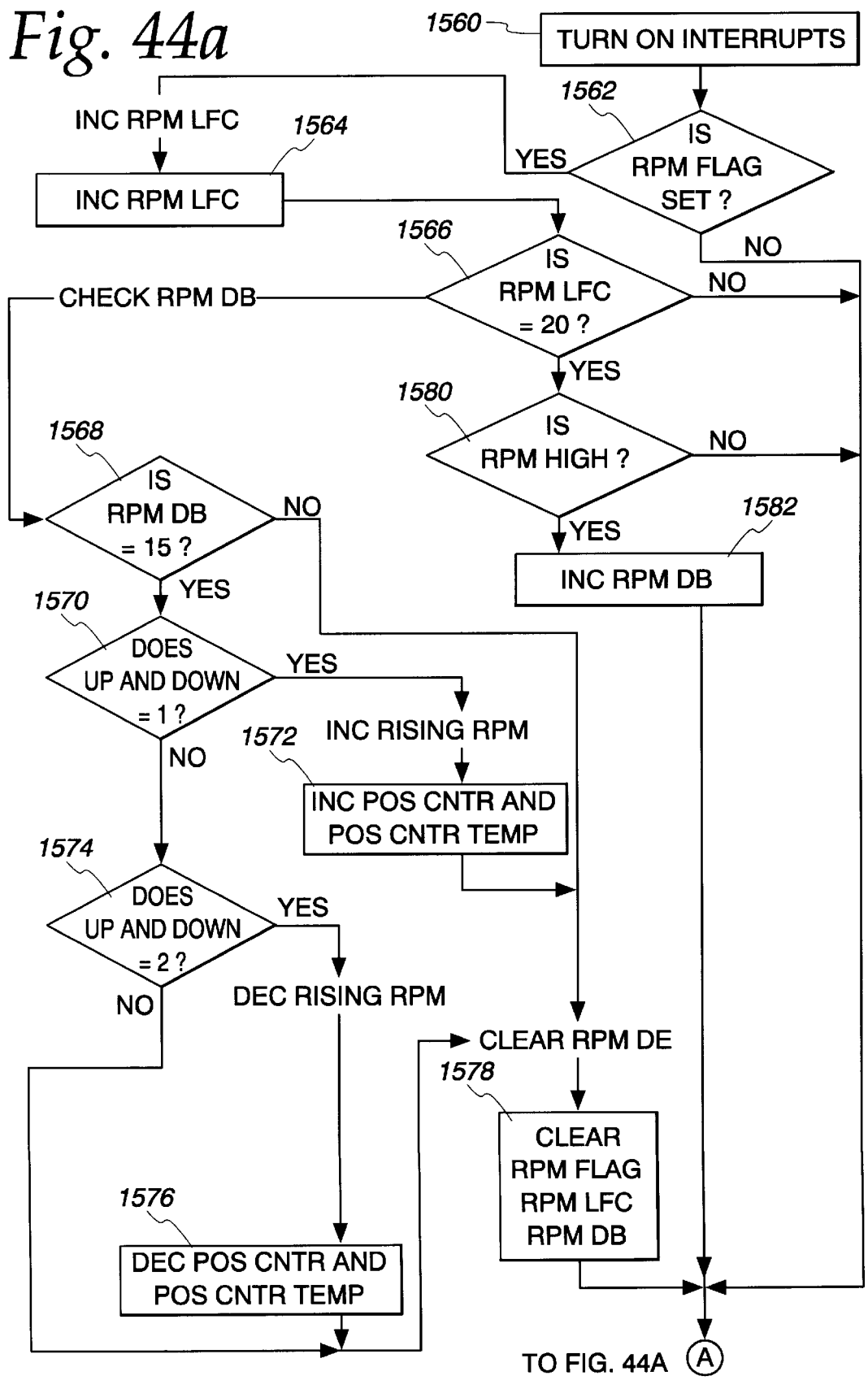
Figure 44B:
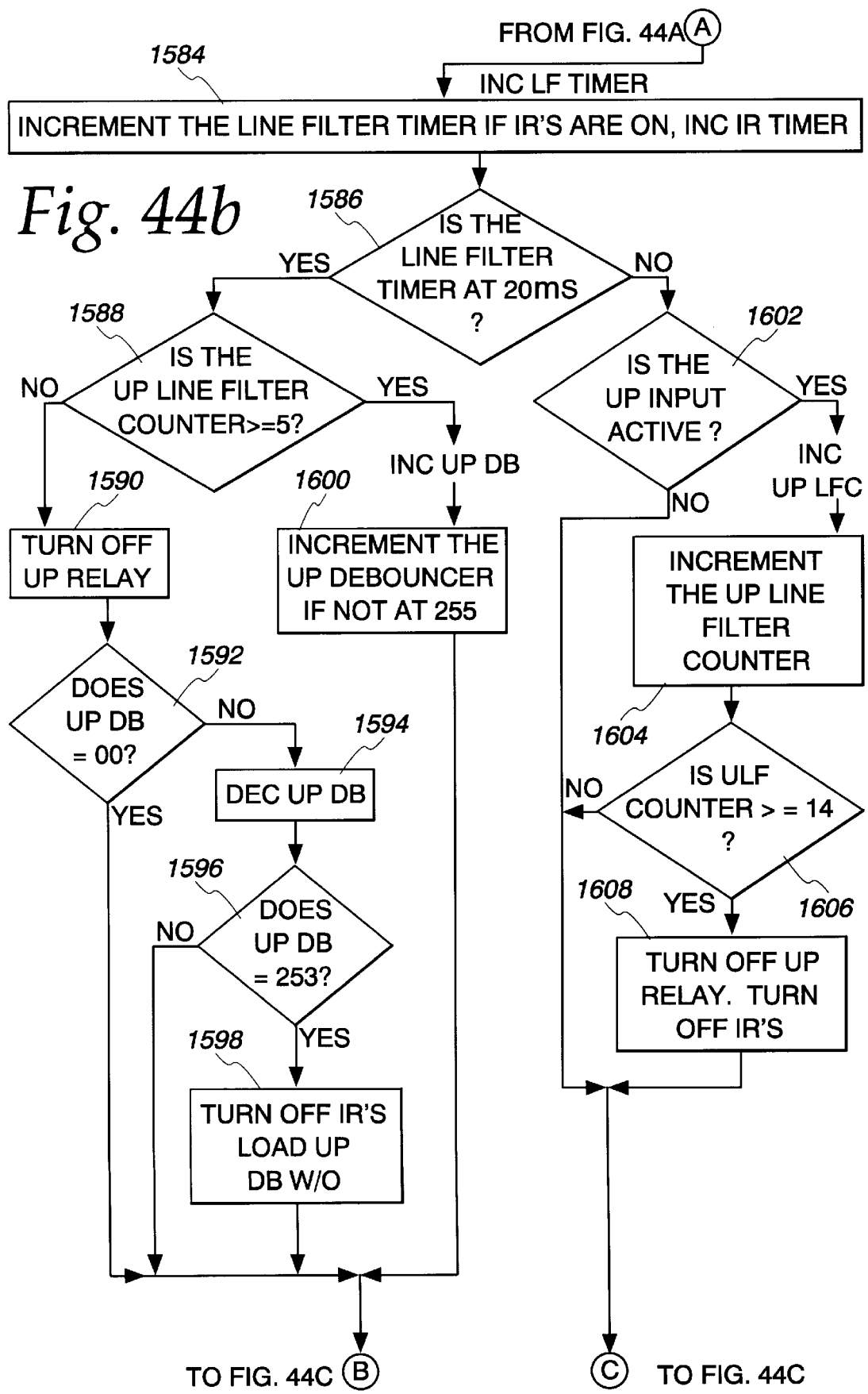
Figure 44D:
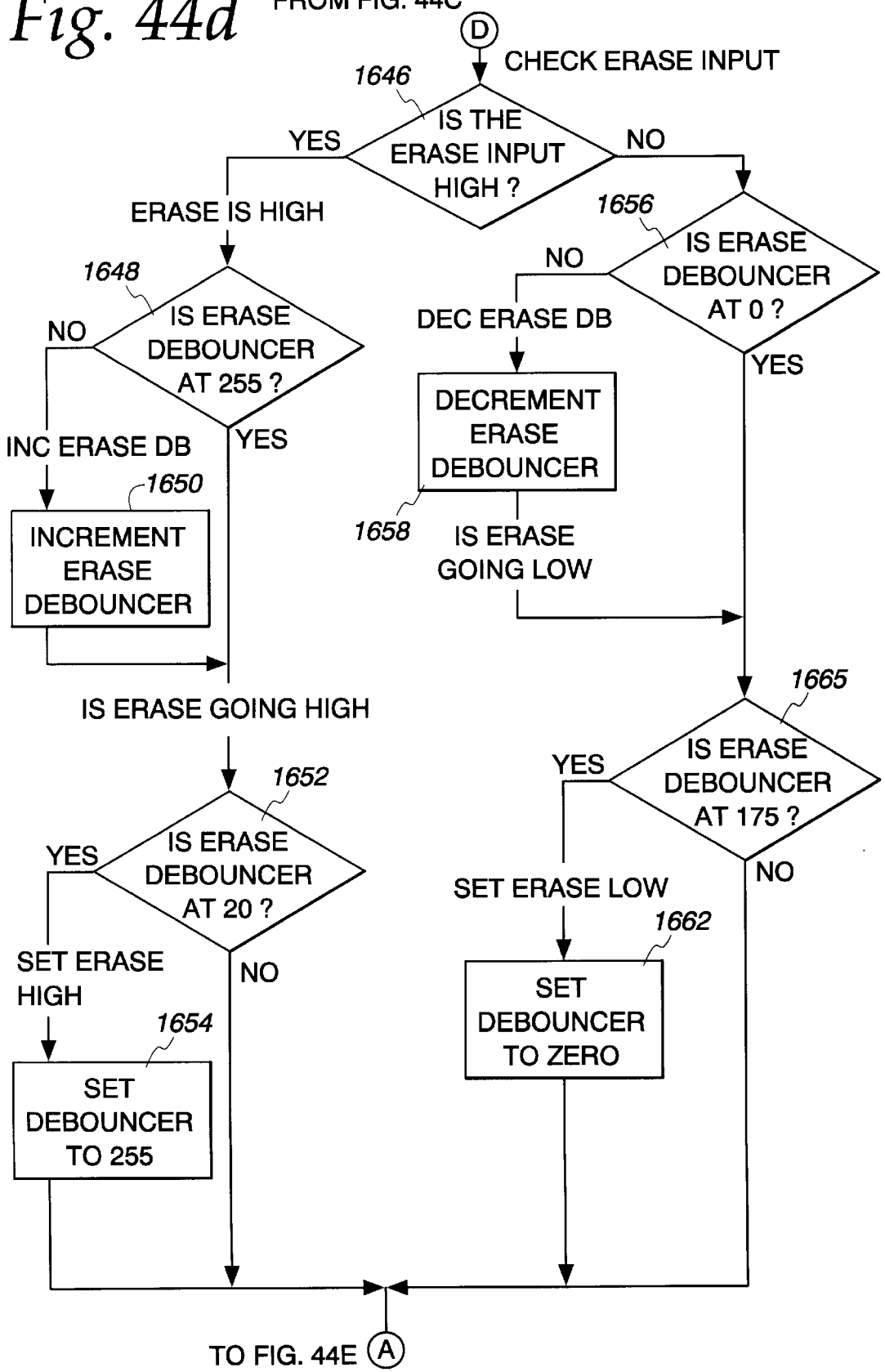
Figure 44E:
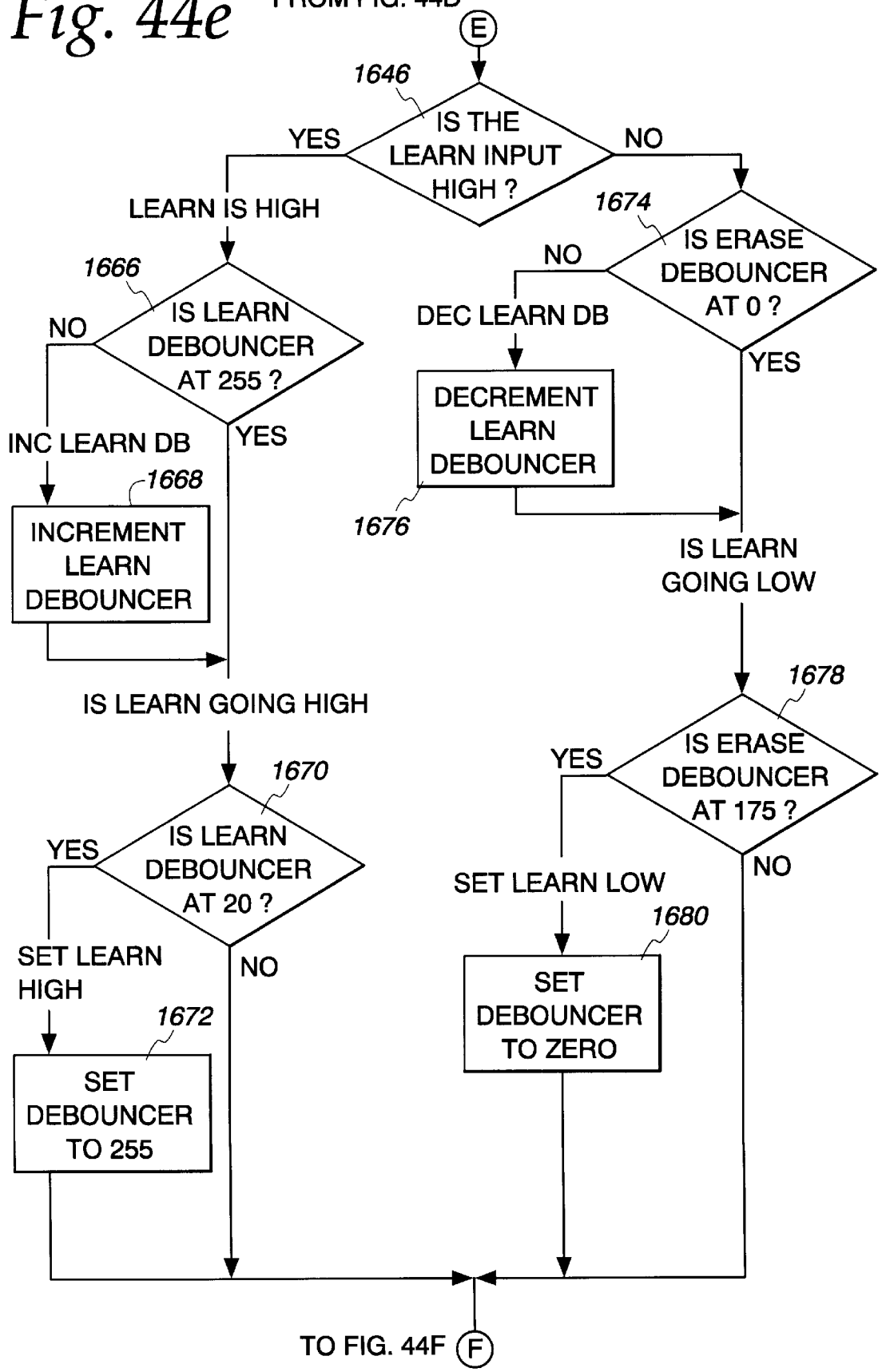
Figure 44F:
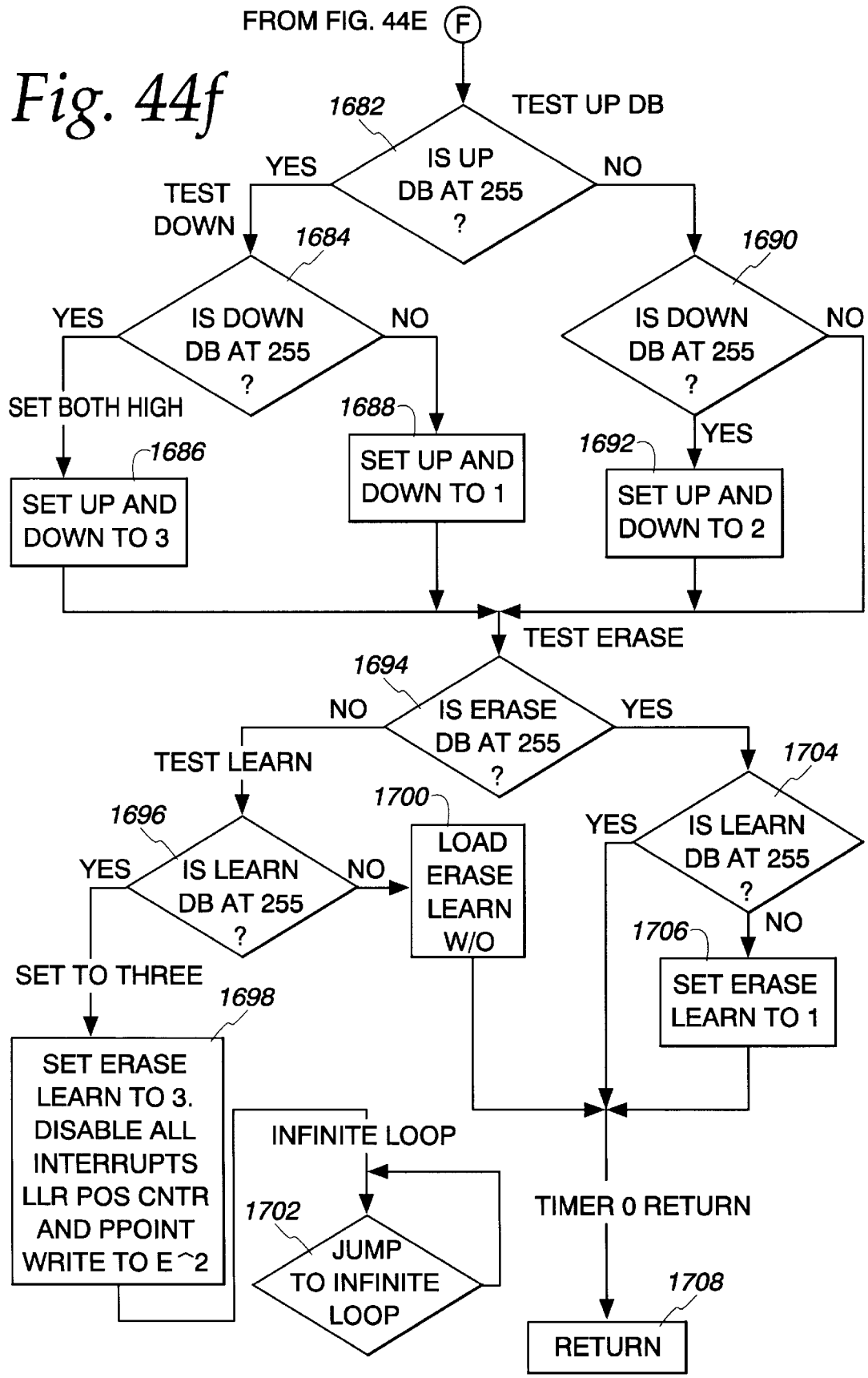

Referring to FIG. 43, when an RPM interrupt signal is applied to pin P30 of microcontroller 500, RPM interrupt routine 1516 is executed. At block 1540, microcontroller 500 checks if the pulse is truly an RPM pulse (and not noise on the line). If not, the routine returns at block 1552. If the RPM pulse is a true RPM pulse, the timer T1 is read and the value stored in EEPROM 502 at block 1542. Then the timer is cleared at block 1544. Next the routine checks for direction of travel: UP or DOWN at block 1546. If DOWN, the RPM counter is decremented at block 1548 and the routine returns at block 1552. If UP, the RPM counter is incremented at block 1550 and the routine returns at block 1552.

Figure 45A:
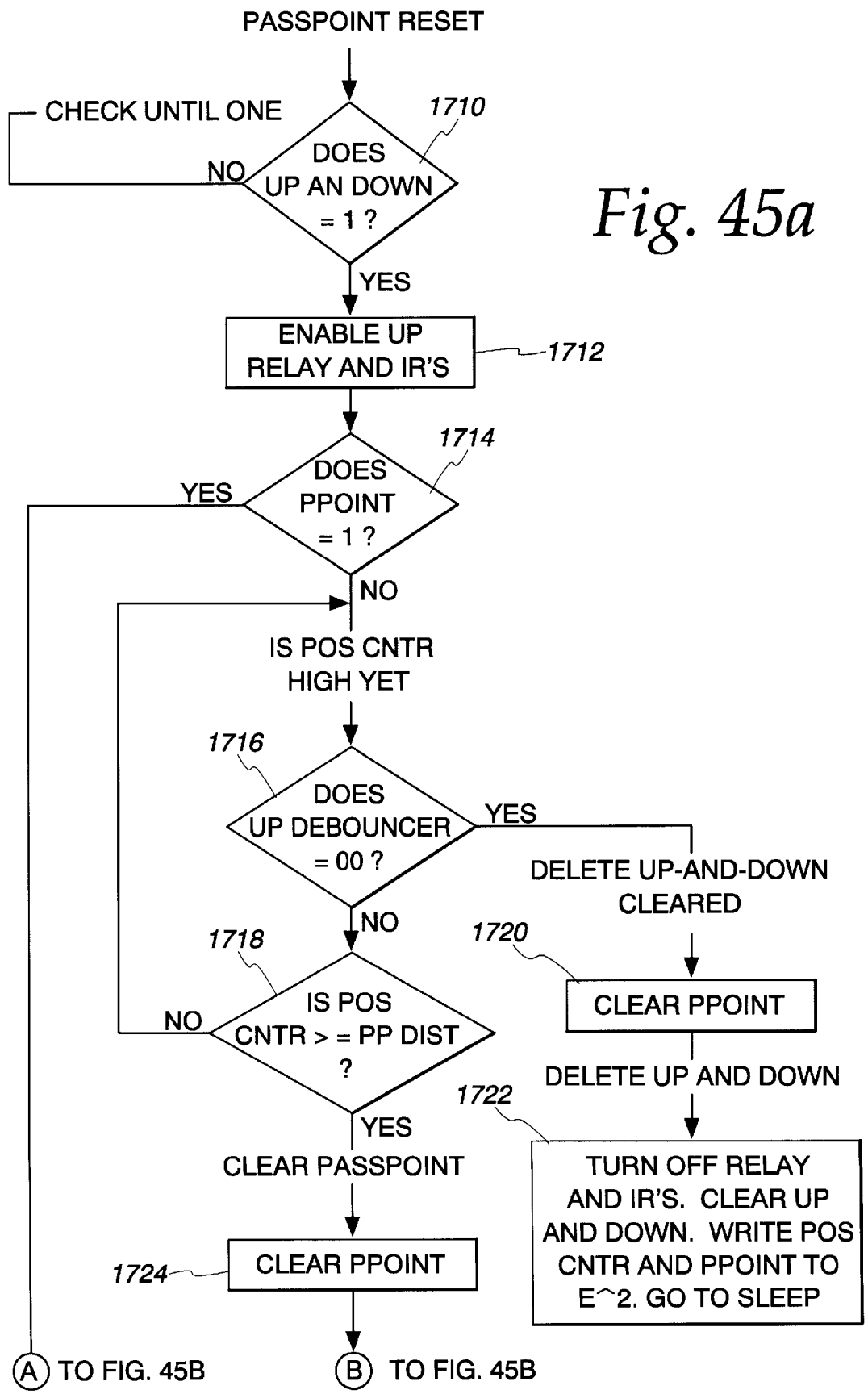
FIGS. 45a–45b is a flow chart of the pass-point reset routine executed in the microcontroller shown in FIG. 39.
Figure 45B:
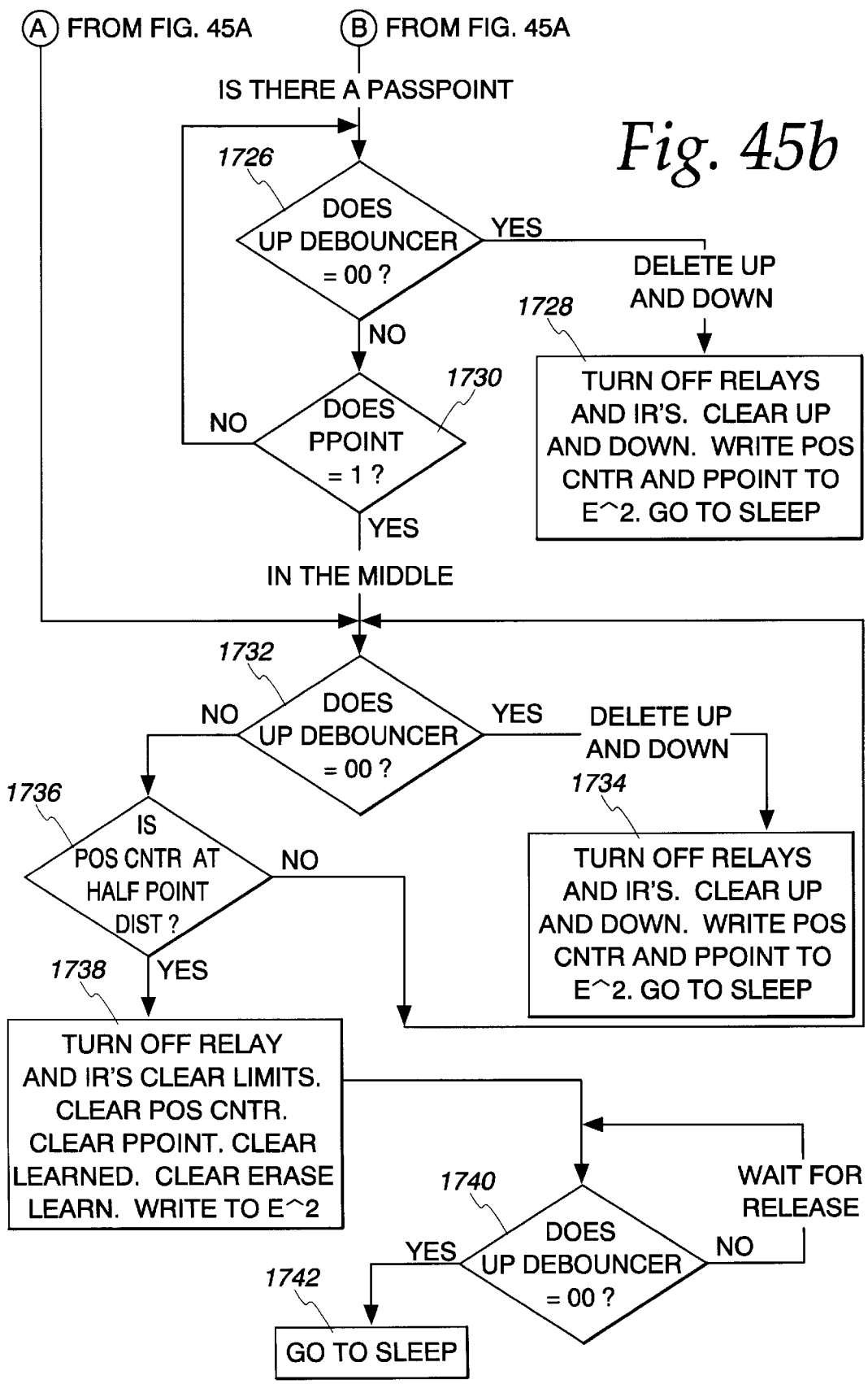
Figure 46A:
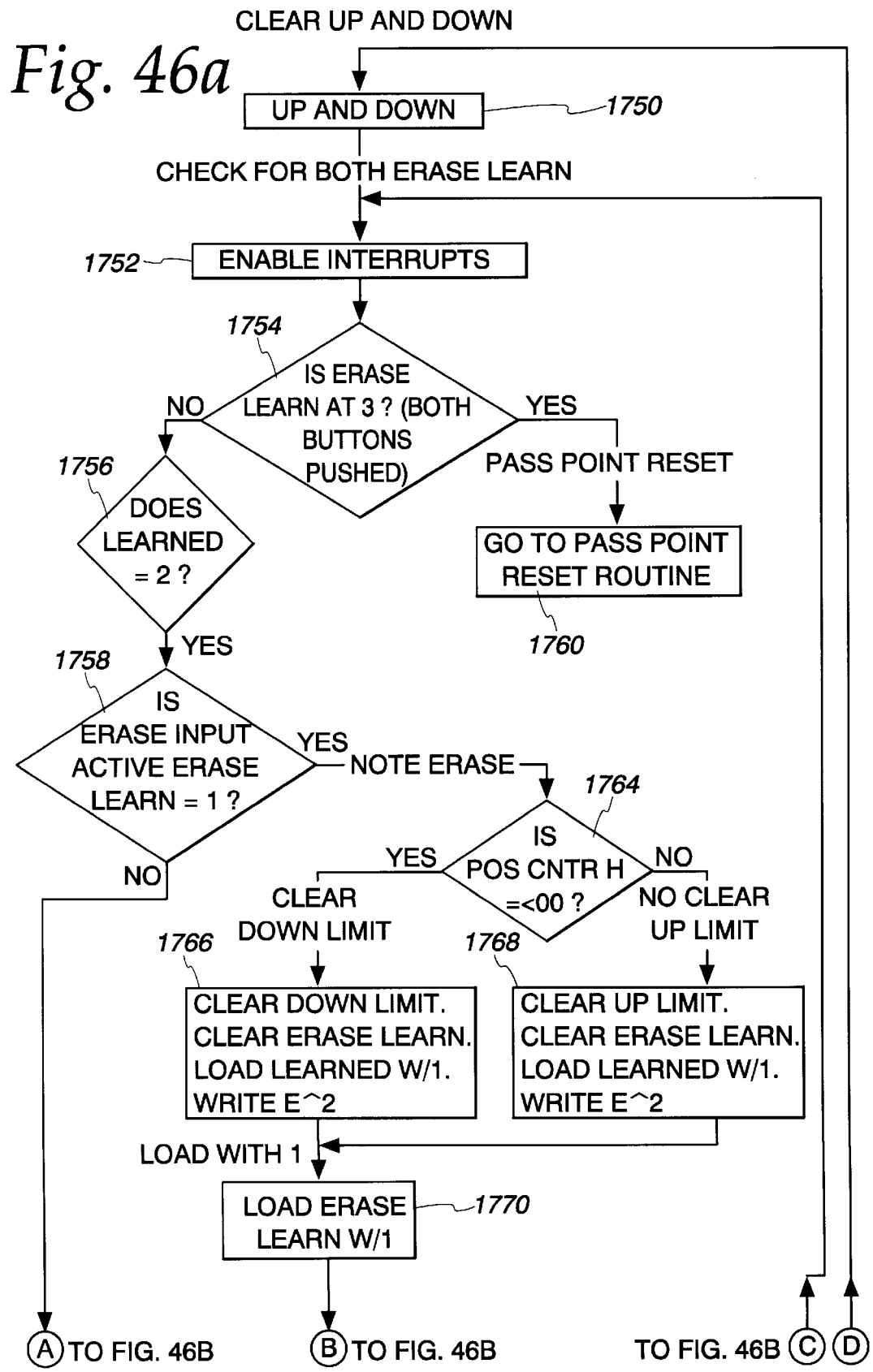
Figure 46C:
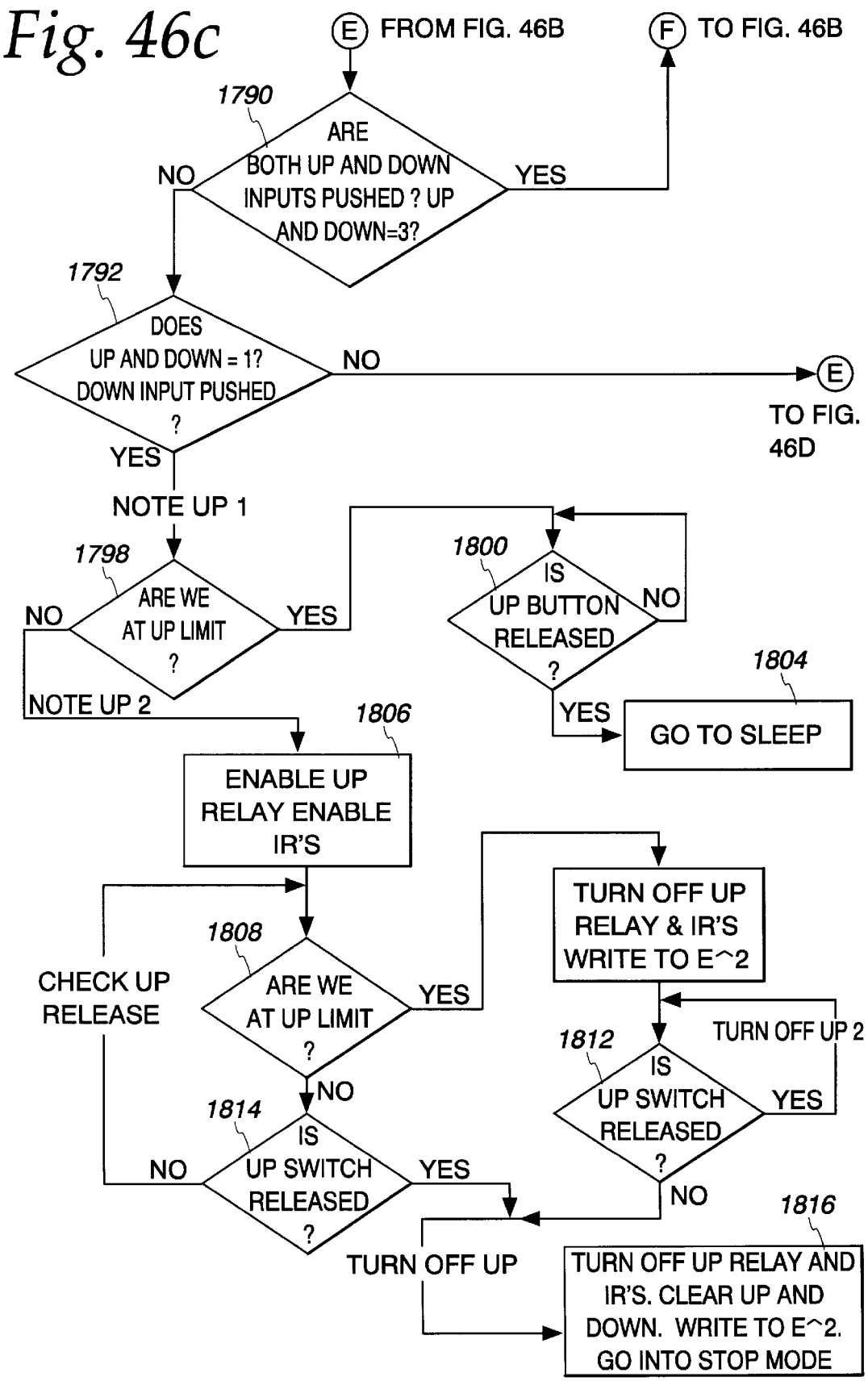
Figure 46D:
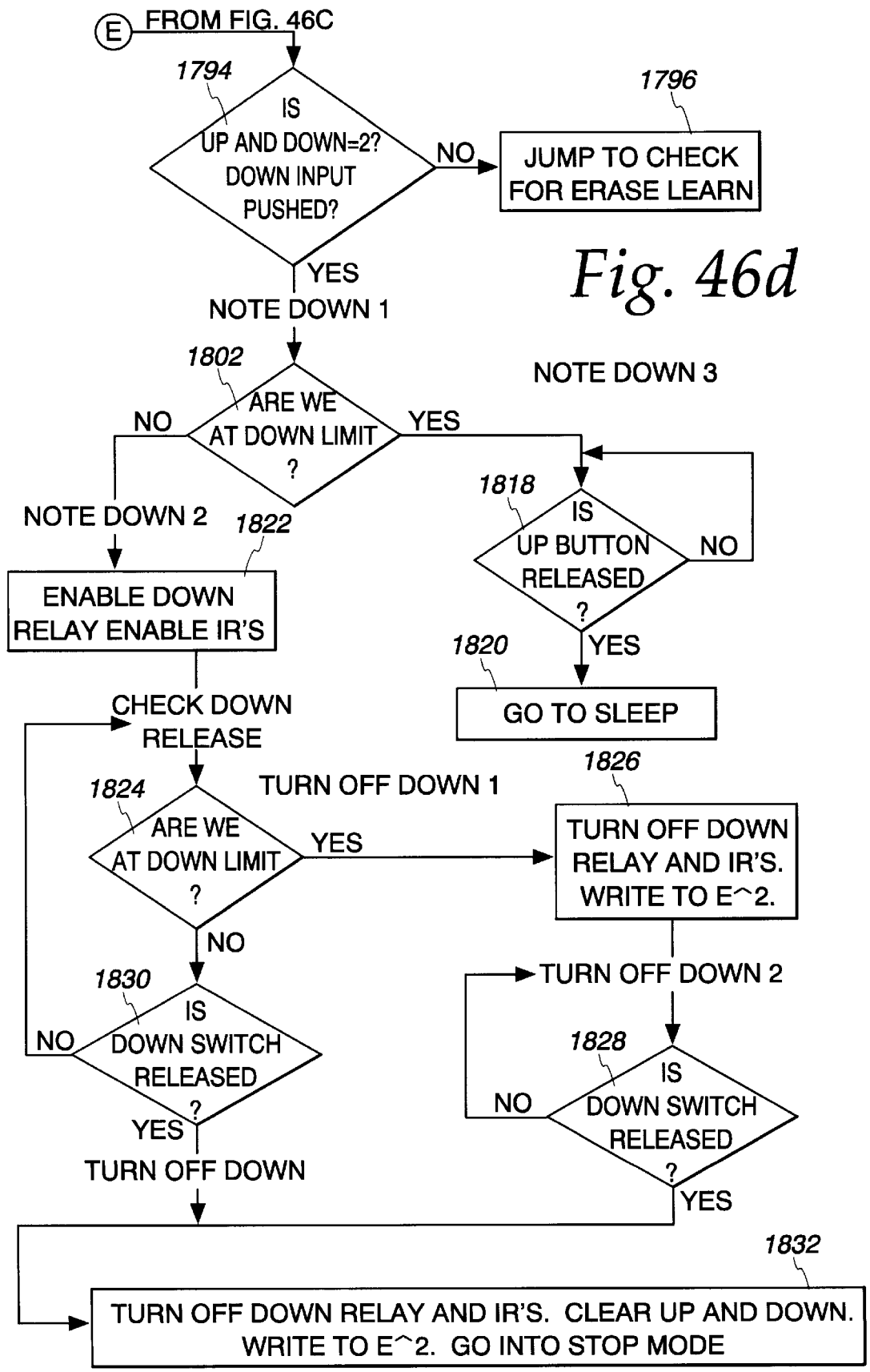

When the pass-point must be reset (such as, when initializing the pass-point at the factory before shipment or if the limits are ever lost or if a unit is installed improperly), the pass-point reset routine is executed. Referring to FIGS. 45a and 45b, in the pass-point reset routine at block 1710 the routine loops until the UP and DOWN values are both equal to 1 (which means both the UP and DOWN buttons on the wall switch are being pressed at the same time). When they are, the routine enables the relays and the optical interrupters at block 1712. At block 1714 the routine checks if a pass-point has been reached (PPOINT=1). If the pass-point has been reached, the routine branches to block 1532. If not, the routine checks if the position of the rolling shutter is high. At block 1716 the routine checks if the UP debouncer=0. If yes, the routine clears the pass-point at block 1720. Then at block 1722, the routine turns off the relays and optical interrupters, clears the UP and DOWN, writes the position of the position counter and the pass-point to EEPROM 502 and goes to sleep.

If the UP debouncer is not 0, the routine checks at block 1718 if the position counter is greater than or equal to the pass-point distance. If not, the routine loops back to block 1716. If it is, the pass-point is cleared at block 1724 and the routine checks for a pass-point at block 1726. If the UP debouncer=0, at block 1728 the routine turns off the relays and optical interrupters, clears the UP and DOWN, writes the position of the position counter and the pass-point to EEPROM 502 and goes to sleep. If the UP debouncer is not 0, the routine checks if the PPOINT=1 at block 1730. If not the routine loops back to block 1726. If it is, the routine continues to block 1732.

At block 1732, the routine checks if the rolling shutter is in the middle of the travel distance. If the UP debouncer=0, at block 1734, the routine turns off the relays and interrupts, clears the UP and DOWN, writes the position of the position counter and the pass-point to EEPROM 502 and goes to sleep. If not, the routine checks the position counter for the half way point at block 1736. If not, it loops back to block 1732. If it is, the routine turns off the relays and optical interrupters, clears the UP and DOWN, clears the limits, clears the position counter, clears the pass-point, clears LEARNED and ERASE_LEARN and writes the values to EEPROM 502 and goes to sleep. At block 1740 the routine waits for the UP debouncer to be released (=0). When it is, the routine goes to sleep at block 1742.

Referring to FIGS. 44a–44f, when the TO interrupt routine is called, at block 1560 optical interrupters are turned on. At block 1562 the routine checks if the RPM_FLAG has been set indicating an RPM interrupt signal has been received. If not, the routine branches to block 1584. If yes, the routine increments the RPM_LPC register at block 1564. Then the routine checks if the value of the RPM_LPC register=20. If not, the routine branches to block 1584. If yes, the routine checks if RPM is high. If not, the routine branches to block 1584. If high, the routine increments the RPM_DB register at block 1582.

At block 1568 the routine checks if RPM_DB=15. If not, the routine clears the RPM_FLAG, RPM_LFC and RPM_DB at block 1578. If yes, the routine checks if the UP_AND_DOWN flag=1 (shutter traveling UP). If not, the routine branches to block 1578. If yes, the position counter and the temporary position counter are both incremented at block 1572. If no, the routine checks if the UP_AND_DOWN flag=2 (shutter traveling DOWN). If yes, the routine decrements the position counter and the temporary position counter at block 1576.

At block 1584 the routine increments the line filter timer and if the optical interrupts are on, the IR_TIMER. At block 1586 the routine checks if the line filter timer is at 20 milliseconds. If not, the routine checks if the UP input (switch has been pressed) is active at block 1602. If the UP input is active, the routine increments the UP line filter counter at block 1604. At block 1606 the routine checks if the UP line filter counter is greater than or equal to 14. If yes, the UP relay is turned off and the optical interrupters are turned off at block 1608. If not, the routine branches to block 1628.

If the line filter timer is 20 ms, the routine checks if the UP line filter counter is greater than or equal to 5. If yes, the UP debouncer is incremented, if not at 255, at block 1600. If not, the Up relay is turned off at block 1590. Then the UP_DB register is checked for 0 at block 1592. If zero, the routine branches to block 1610. If not zero, the UP_DB register is decremented at block 1594. If the UP_DB=253, the optical interrupters are turned off and the UP_DB register is loaded with zero at block 1598.

At block 1628 the routine checks for DOWN input (pressing the DOWN switch). If none, the routine branches to block 1636. If yes, the DOWN line filter counter is incremented in block 1630. IF the DOWN line filter is greater than or equal to 14 in block 1632, the DOWN relay is turned off and the optical interrupters are turned off in block 1634.

At block 1610 the value in the DOWN line filter counter is checked if it is greater than or equal to 5. If yes, the DOWN debouncer is incremented if not equal to 255 at block 1624. Then the UP_AND_DOWN line filter counter and the line filter are cleared at block 1626. If less than 5, the UP_AND_DOWN line filter counter and the line filter are cleared at block 1612. Then the DOWN relay is turned off at block 1614. Then the DOWN_DB is checked for equal to 253 at block 1620. If equal the optical interrupters are turned off and the DOWN_DB is loaded with zero.

The UP debouncer is checked at block 1636. If the value is 8, the UP debouncer is set to 255 at block 1638. If not, the DOWN debouncer is checked at block 1640. If the value is 8, the DOWN debouncer is set to 255. Then the routine checks for ERASE input (switch pressed) at block 1646. If not high, the routine checks if the ERASE debouncer is zero at block 1656. If not, the ERASE debouncer is decremented at block 1658. If yes, the ERASE debouncer is checked for a value of 175 at block 1660. If yes, the debouncer is set to zero at block 1662. If no, the routine branches to block 1664.

If the ERASE input is high, the ERASE debouncer is checked for a value of 255 at block 1648. If not, the ERASE debouncer is decremented at block 1650. Then the ERASE debouncer is checked for a value of 20 at block 1652. If yes, the debouncer is set to 255 at block 1654.

At block 1664 the routine checks if the LEARN input is high. If not, the routine checks if the LEARN debouncer is zero at block 1674. If not, the LEARN debouncer is decremented at block 1676. If yes, the LEARN debouncer is checked for a value of 175. If yes, the LEARN debouncer is set to zero at block 1680. Then the routine branches to block 1682.

If the LEARN input is high, the routine checks for a LEARN debouncer value of 255 at block 1666. If not, the LEARN debouncer is decremented at block 1668. At block 1670 the LEARN debouncer is checked for a value of 20. If yes, the value is set to 255 at block 1672 and the routine continues to block 1682.

At block 1682 the routine checks for a value of 255 at the UP_DB register. If not, it checks for a value of 255 in the DOWN_DB register at block 1690. If equal, the UP_AND_DOWN flag is set to 2 indicating a DOWN command. If the UP_DB register is 255, the DOWN_DB register is checked for a value of 255. If not, the UP_AND_DOWN flag is set at 1 indicating an UP command at block 1688. If both are high, the UP_AND_DOWN flag is set at 3 in block 1686.

At block 1694 the routine checks for a value of 255 in the ERASE_DB register. If yes, the routine checks for a value of 255 in the LEARN_DB register at block 1704. If not the ERASE_LEARN flag is set to 1 at block 1706. If yes, the routine returns at block 1708.

If ERASE_DB is not 255, the routine checks for a value of LEARN_DB at block 1696. If not, the routine loads ERASE_LEARN with a zero at block 1700. If yes, the routine sets ERASE_LEARN to 3, disables all optical interrupters, clears the position counter and the pass-point flag and writes the value to EEPROM 502 at block 1698. Then the routine executes an infinite loop (the Main loop is entered again until power is released) at block 1702.

Automatic Learn Limits

Figure 47:
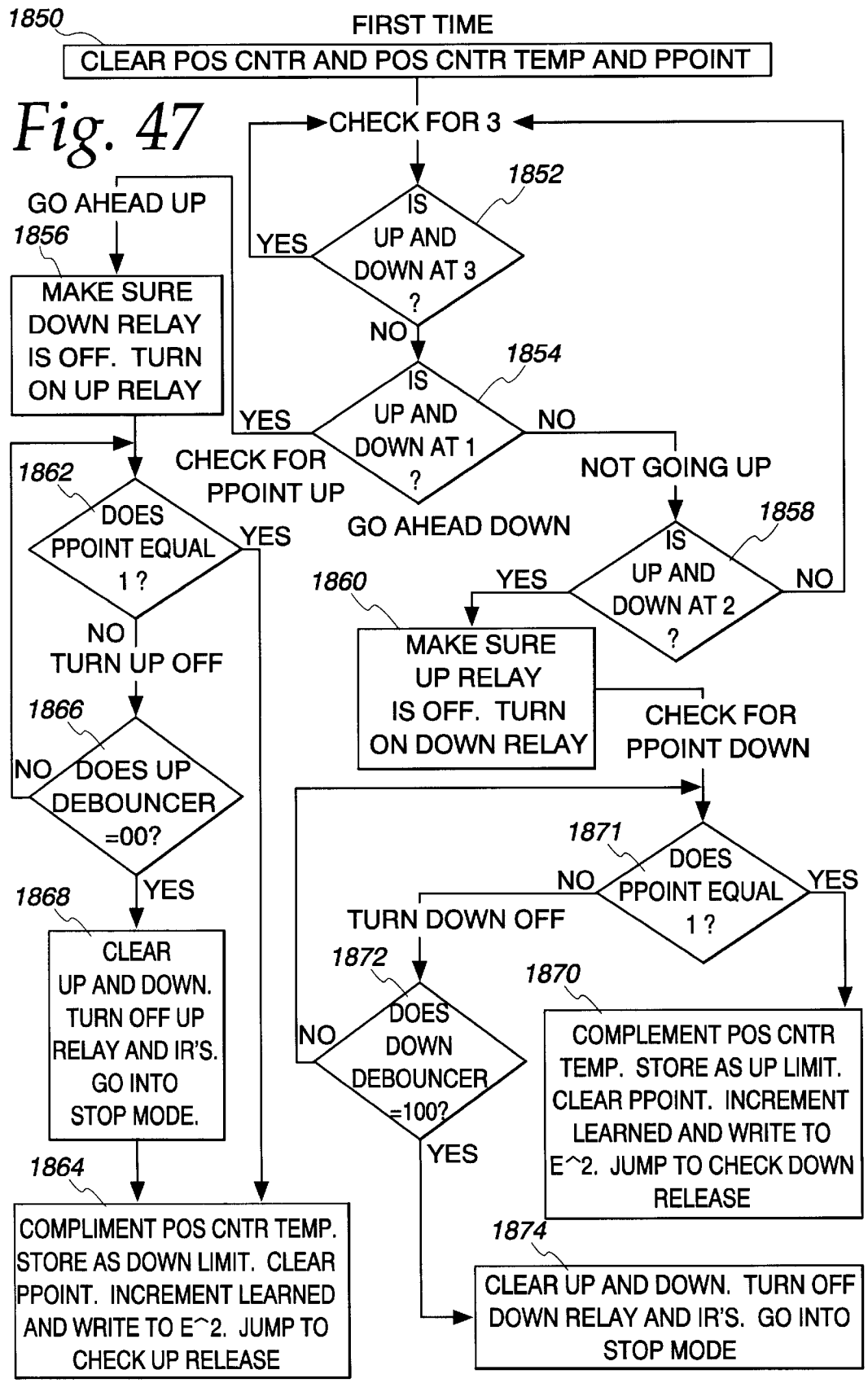
FIG. 47 is a flow chart of the automatic limit learn routine executed in the microcontroller shown in FIG. 39.

Referring to FIG. 47, when the unit is first installed, the FIRST_TIME routine is executed. This routine automatically measures the UP and DOWN limits of travel and stores the values in the EEPROM 302. When the operator is first installed, the installer selects whether to learn the UP or DOWN limit, by pressing the UP or DOWN switch. When the UP switch is pressed, the rolling shutter is moved in the UP direction until the pass-point is reached. When the pass-point is reached, the complement of the distance traveled from the starting position to the pass-point is stored as the value of the DOWN limit. When the DOWN switch is pressed, the rolling shutter is moved in the DOWN direction. When the pass-point is reached, the complement of the distance traveled from the starting point to the pass-point is stored as the UP limit.

At block 1850 the routine clears the position counter, the temporary position counter and the pass-point registers. Then at block 1852 the routine checks and loops until the UP_AND_DOWN flag has value of 3. If the flag is not 3, at block 1854 the routine checks if the flag is at 1. If the flag is 1, the rolling shutter is going UP and the routine branches to block 1856.

At block 1856 the routine makes sure the DOWN relay is off and turns on the UP relay. As the rolling shutter moves up, the routine checks for the pass-point traveling up at block 1862. If the pass-point has not been reached (PPOINT flag not equal to 1), the routine checks for the UP debouncer=0 at block 1866 (checks if the rolling shutter has reached an up stop). If the UP debouncer is not equal to 0, the routine loops back to block 1862. If the UP debouncer=0, then at block 1868, the routine clears the UP_AND_DOWN flag, turns off the UP relay and the optical interrupters and goes into the stop mode. When the pass-point is reached at block 1862, then at block 1864 the routine complements the temporary position counter register and stores that value as the DOWN limit, clears the pass-point flag, increments the LEARNED register and writes all values to EEPROM 502. Then the routine jumps to CHECK UP RELEASE (loops until power is released).

If the UP_AND_DOWN flag is not 1, the rolling shutter is not going UP. At block 1858 the routine checks if the UP_AND_DOWN flag is 2, indicating the shutter is going DOWN. If not, the routine branches back to block 1852. If the UP_AND_DOWN flag is 2, the rolling shutter is going DOWN. At block 1869 the routine makes sure the UP relay is off and the DOWN relay is turned on. Then the routine checks for the pass-point traveling DOWN at block 1871. If the pass-point flag is not 1, the routine checks if the DOWN debouncer=0 at block 1872 (checks if the rolling shutter has reached a down stop). If it is not, the routine loops back to block 1871. If the DOWN debouncer=0, at block 1874 the routine clears the UP_AND_DOWN flag, turns off the DOWN relay and the optical interrupters and goes into stop mode. When the pass-point is reached at block 1871, the routine branches to block 1870. At block 1870 the routine complements the value of the temporary position counter and stores the value as the UP limit, clears the pass-point flag, increments the LEARNED flag and writes the values to EEPROM 502. Then the routine jumps to CHECK DOWN RELEASE (loops until power has been released).

Exhibit A and Exhibit B attached hereto include a source listing of a series of routines used to operate a movable barrier operator in accordance with the present invention.

Integrated Rail Drive Assembly

Turning now to FIGS. 2 and 3, integrated drive rail 22 has a generally I-shaped cross section, preferably formed by the combination of two T-shaped rail members 44, 46 having overlying web portions 44*a*, 46*a*, rigidly joined together by a series of fasteners, preferably bolt fasteners, passing through aligned apertures formed in the webs 44*a*, 46*a*. As can be seen in FIG. 2, the overall construction of integrated drive rail 22 provides longitudinal recesses or cavities 52, 54 on either side of the webs 44*a*, 46*a*. A linear flexible drive member, such as a conventional chain 60 shown in FIG. 6, passes through aligned openings 58 formed in the webs 44*a*, 46*a* so as to wrap around a sprocket member 62, with portions of the chain running adjacent the recesses 52, 54. Preferably, and as shown in FIG. 3, both ends of integrated drive rail 22 are of similar construction, with the sprockets 62 preferably being dimensioned slightly larger than the width of flanges 44, 46 so that the straight path portions of drive chain 60 lie lust outside the recesses 52, 54. If desired, a guard, such as guard 159 shown in FIG. 8, can be installed at one or both ends of the integrated drive rail assembly 90.

Figure 2B:
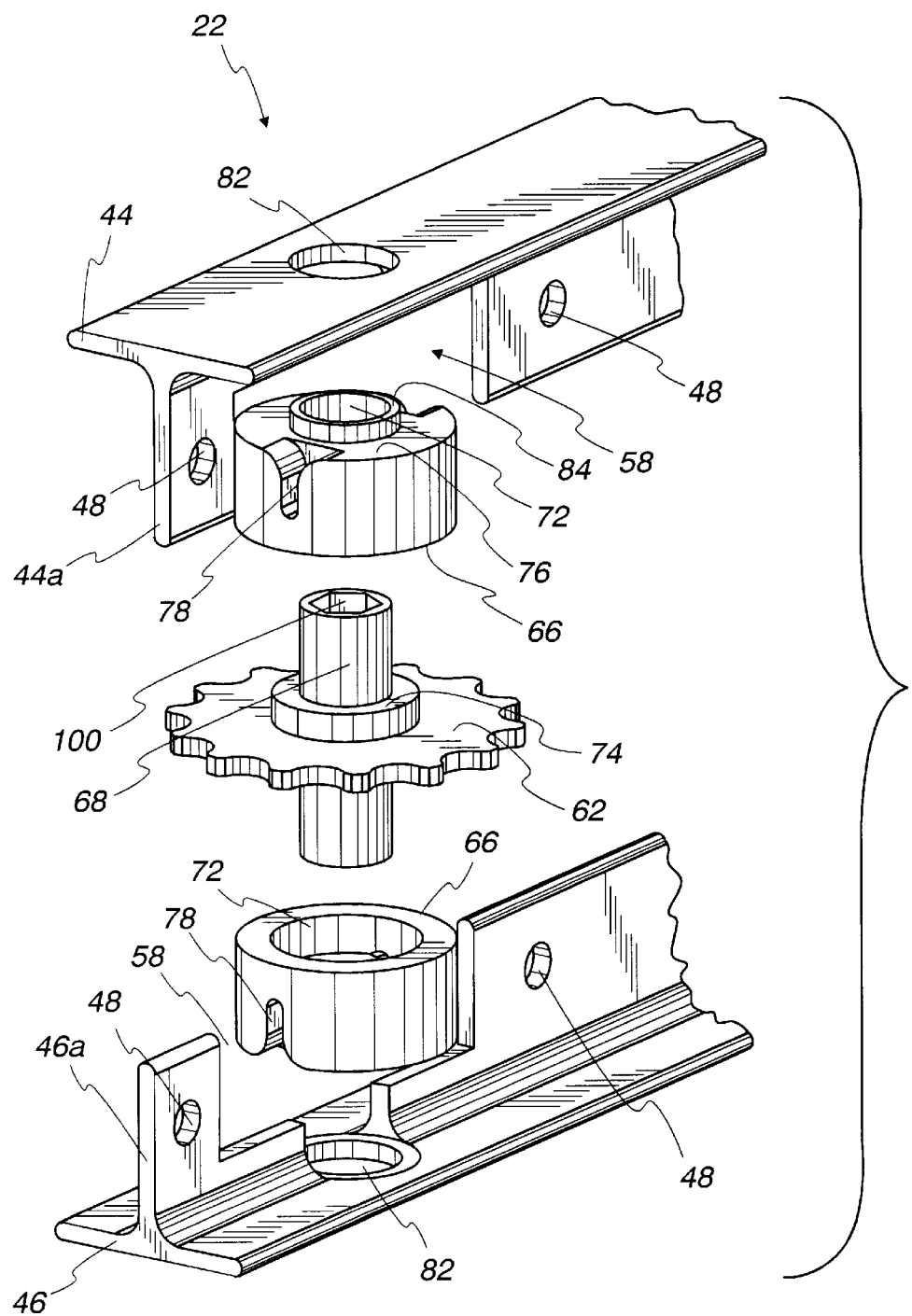
FIG. 2b is a fragmentary exploded view thereof.

Referring now to FIG. 2*b*, sprocket 62 is rotatably mounted and held captive within the integrated drive rail 22 by bushing-like mounting members 66 which are received in the openings 58 formed in the webs of each T-rail portion. A rotary support shaft 68 extends through the central axis of sprocket 62 and is affixed thereto by suitable means. The shaft 68 is received in central bores 72 formed in mounting member 66. In the preferred embodiment, discs 74 are affixed to shaft 68 and received in enlarged portions of bore 72 to provide improved stabilization and alignment of shaft 68 as the shaft is rotated within mounting member 66. As can be seen in FIG. 2*b*, the end faces 76 of mounting member 66 define recesses 78 which receive portions of the rail web members to prevent the mounting members from turning within openings 58. The rail members 44, 46 define openings 82 for receiving collar-like end portions 84 of mounting members 66. End portions 84 provide added alignment and bearing surfaces for the outer surfaces of shaft 68 and protect the shaft against contact with the internal walls of holes 82, so as to eliminate the need for machining those walls.

In overhead door installations, the integrated drive rail may be slightly longer than the height of the garage door. When the garage door is open, the integrated drive rail extends along the open door and it is desirable to provide extra length for the integrated drive rail to allow a drive chassis connected to the integrated drive rail to be spaced from the opened garage door. It has been found generally desirable heretofore, for convenience in shipping and packaging, to ship the drive rail in several sections which are fitted together at the installation site. However, in some embodiments of the invention, e.g., in operators for commercial, rather than residential uses, an integrated, pre-assembled, full length rail may be employed with a pre-assembled and pre-adjusted chain/rail assembly of the type illustrated in FIGS. 3 and 6, for example.

In FIG. 3, an integrated rail drive assembly is generally indicated at 90. The integrated rail drive assembly includes a single continuous integrated drive rail 22 of full length required for a given installation. For example, when employed in the arrangement shown in FIG. 1, a single-piece integrated drive rail 22 extends from the garage wall 18 above the door to the power drive unit. The shaft 68, sprockets 62 and their related components, along with chain 60 and conventional trolley 94, are mounted to the drive rail, with the chain 60 (or other type of linear drive element) pre-tensioned and adjusted at the manufacturer's premises, before shipping to an installation site. Accordingly, the integrated rail drive assembly 90 may be purchased and delivered as a complete unit to an installation site, providing substantial savings in installation time and cost.

In the arrangement shown in FIG. 3, an optional end cap or mounting bracket 96 has been provided for mounting a first end 90a of the integrated drive rail assembly 90 to the garage wall 18 shown in FIG. 1. However, virtually any conventional arrangement for mounting the integrated drive rail to the garage wall can be employed. The opposite end 90b is bolted or otherwise attached to the power drive unit 20. As can be observed in FIG. 2b, shaft 68 is provided with a non-cylindrical, preferably a generally hexagonal cross-sectional configuration. As will be seen below, a slip fit connection of the non-cylindrical central bore 100 with the drive shaft of the power drive unit is possible and results in substantial savings in the time required for installation and set-up.

As can be seen in FIG. 3, the chain 60 is formed in a closed loop, being supported by sprockets 62 located at each end of the drive rail. One end 90b of the drive rail assembly is engaged with power drive unit 20, as described above. As mentioned above, an auxiliary drive unit 40 can be engaged with the opposite end of the drive rail assembly (that is, with reference to FIGS. 1 and 3, the auxiliary power drive 40 can be coupled with the central bore 100 of sprocket 62 adjacent end 90a of integrated rail drive assembly 90). The optional power drive unit 40 can comprise, for example, a battery operated motor for operation under power outage conditions or a spring assist.

Referring now to FIG. 4, there is shown an embodiment adapted for application where it is inconvenient to ship the drive rail as a single full length component, e.g., for retail sale to consumers who may wish to transport the operator in the trunk of an automobile in kit form, for subsequent assembly on site. In FIG. 4, the drive rail is divided in three sections, 102, 104 and 106. Each section 102, 104 and 106 may be made in the manner illustrated in FIG. 2b, i.e. comprising of a joinder of interfitting rails of T-shaped cross section. Conventional means such as joining plates 108 or other connectors may be provided for assembling the rail sections in end-to-end fashion with bolt fasteners or the like (not shown) passing through aligned holes 110 formed in the adjoining plates and rail sections. Alternatively, each of the sections may comprise an integral, unitary rail of I-shaped cross section. If desired, rails of different cross section can be substituted for the arrangement shown in FIGS. 2–4.

After assembly of the rail sections 102, 104 and 106, the trolley 94 illustrated in FIG. 3 (or another trolley) and a linear flexible drive member, such as the chain 60 shown in FIG. 3, is mounted to drive the trolley back and forth along the length of the joined rail sections. The chain is wrapped about the sprockets 62 with the ends of the chain being connected to the trolley. If desired, cables, belts or other flexible linear drive elements can be combined with or employed in place of chain 60.

Referring now to FIGS. 5a and 5b, one end of an alternative integrated drive rail is indicated at 111. Integrated drive rail 111 includes a hollow tubular body 112, which may be of a generally square or other rectangular cross-sectional shape. Body 112 includes slots 114 and holes 116 as can be seen in FIG. 5b. Sprocket 62, disc 74 and shaft 68 are as described above in FIG. 2b. In place of the cylindrical mounting member 66 described above, elongated bushings or mounting members 120 dimensioned for telescopic insertion within the hollow interior of body 112 are provided.

Mounting members 120 include stepped recessed portions 122 for receiving the disc member 74 and holes 124 for receiving the ends of shaft 68. A recess 126 is provided for added clearance for a chain which is later wrapped around sprocket 62 during assembly at an installation site. Raised land portions 128 are dimensioned to engage one another when the mounting members and sprockets are inserted in the hollow interior of body 112 and tightened. In the preferred embodiment, holes 130 extending to the land portions 128 and hole 132 in body 112 are provided to receive a threaded fastener 134. Fastener 134 draws the mounting members 120 together and provides an interference fit within holes 130, 132 to prevent shifting of the housing members and sprocket once installed within hollow body member 112. A nut fastener (not shown) can be mated to fastener 134 or, as will be seen below, fastener 134 can be screwed into a threaded bore in a power drive unit coupled to the integrated drive rail.

Turning now to FIG. 6, an integrated rail drive assembly is generally indicated at 140 and includes integrated drive rail 111 having a full length dimension so as to extend between wall 18 and power drive unit 20 shown in FIG. 1. The sprocket arrangement shown in FIG. 5b is provided at each end of tubular body 112 and chain 60 is wrapped about sprockets 62 and secured to a trolley 142. Trolley 142 has a hollow cross section for receiving tubular body 112 so as to slide therealong in captive engagement therewith. In the preferred embodiment, the chain 60 is installed, pre-tensioned and adjusted by the manufacturer, prior to shipping to an installation site. Upon arrival at the installation site, a conventional mounting arrangement, such as a socket dimensioned to receive the free end 140a of assembly 140, and with outlying ears to receive screw fasteners for joining to garage wall 18 shown in FIG. 1, is employed to mount the rail to the garage wall. The remaining free end 140b is adapted for fitting to power drive unit 20 as will be explained with reference to FIG. 8.

Turning now to FIG. 7, tubular body 112 may, if required, be divided into a number of smaller size segments, such as the segments 112a–112c shown in FIG. 7. Socket portions 146 provide telescopic interfitting connection of the sections 112a–112c and holes 148 formed in the sections receive screw fasteners to further secure the body sections together.

By having the drive rail assembly completely self-unitized, the linear drive element can be driven from a variety of different positions. If desired, the drive motor can be mounted transverse to the drive rail assembly, thereby providing advantages where space requirements dictate an arrangement of this type. Also, the drive motor could be directly mounted to the rail rather than to the chassis.

In the past, many overhead door openers have employed an arrangement in which the drive sprocket or pulley is cantilevered at the end of a drive shaft extending from the chassis of the drive unit or head, resulting in significant bending moments on the drive shaft and chassis in reaction to tension in the flexible linear drive member. The integrated rail arrangement described above addresses this problem by reducing or substantially eliminating transverse loads on the drive shaft. The transverse loads are borne by bushings or bearings on the drive rail which support the sprocket engaged by the drive shaft against transverse displacement. Tension in the flexible linear drive member is resolved in the integrated rail structure, rather than resulting in bending moments on the chassis.

Another advantage associated with the integrated rail is that it may enable a lower profile to be provided. In the past, it has been found advantageous to position the drive sprocket near the back end of the drive unit, i.e., near the end opposite the door, to enable the rail, or a bracket for engaging the rail, to be positioned along the top wall of the drive unit, in order to help the drive unit withstand the bending moments resulting from tension in the chain, belt, and/or cable. With the integrated rail, however, the drive sprocket may be positioned near the front of the drive unit, and an opening may be provided in the drive unit behind the drive sprocket to allow the motor to protrude upward through the top wall of the drive unit, thereby enabling the overall height of the drive unit to be reduced. The resulting low-profile configuration would facilitate installation in garages having limited head room.

Figure 8:
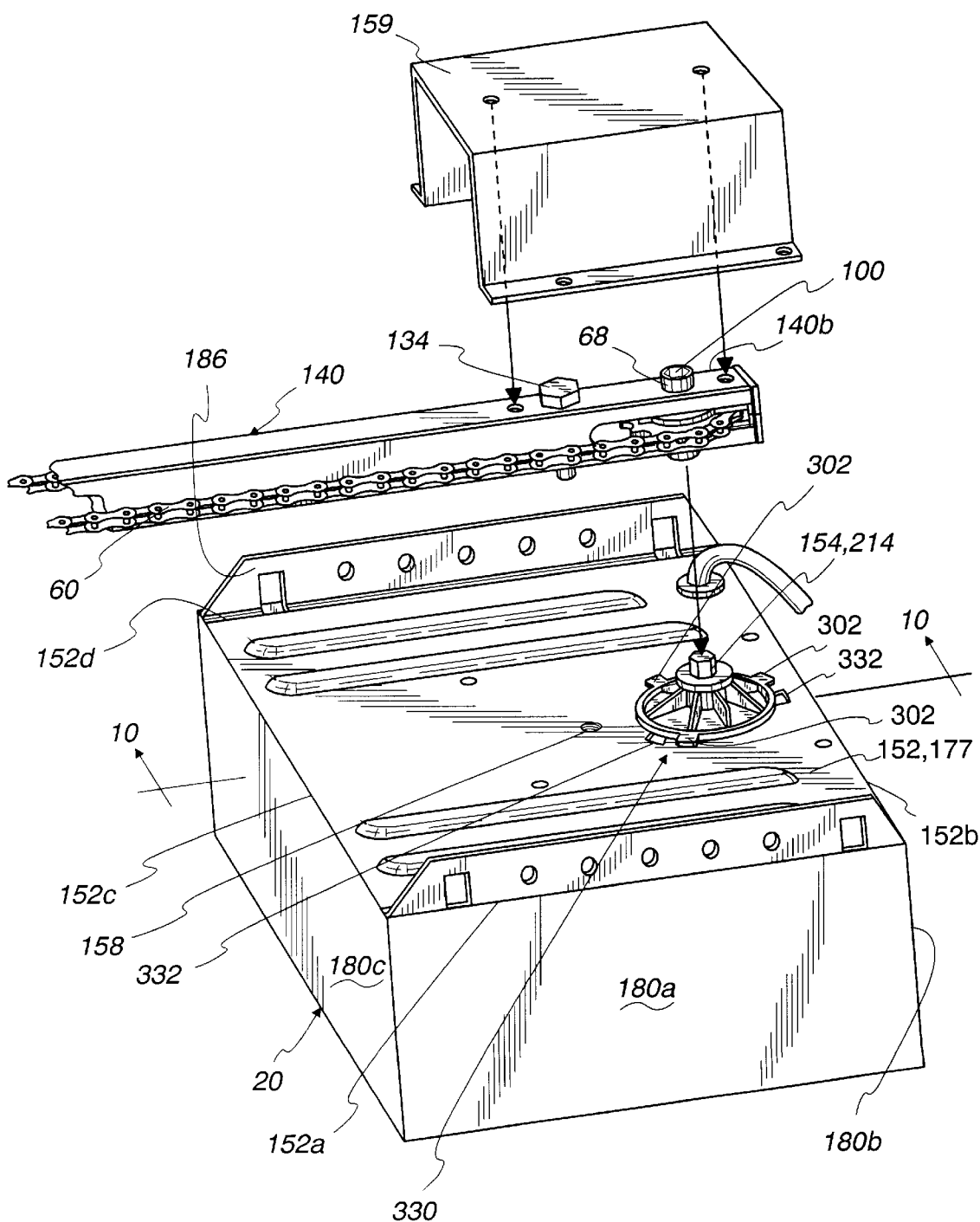
FIG. 8 is a fragmentary perspective view of a rail drive assembly and power drive unit in accordance with an embodiment of the invention.

Turning now to FIG. 8, the free end 140b of rail drive assembly 140 is positioned over power drive unit 20. As will be seen herein, the power drive unit 20 includes a chassis plate 152 on which components are mounted for rotating drive shaft 154. In the preferred embodiment, shaft 154 has a generally hexagonal cross-section head 214 dimensioned for insertion within the hexagonal-shaped central bore 100 of sprocket shaft 68 to provide a slip fit connection of shafts 68, 154. To secure the integrated rail drive assembly 140 to power drive unit 20 a threaded aperture 158 is formed in chassis plate 152 to receive the threaded free end of fastener 134. If desired, a guard 159 can be secured to rail 140 and/or to chassis plate 152.

In the embodiment shown in FIG. 8, the bearing structure protrudes upward from the upper surface of the chassis around the upwardly extending shaft 154 so that the rail will be spaced above the chassis. Accordingly, appropriate spacers may be provided around the threaded fastener 134 and/or at other locations between the rail and the top wall of the chassis, in the embodiment of FIG. 8. In other embodiments, the bearing support structure may be eliminated or positioned below the top wall of the chassis so that the rail may be in direct contact with the top wall of the chassis, rather than being spaced therefrom.

In any of these embodiments, the same power head can be employed without modification, to accommodate different types of linear drive elements, such as chain drive, belt drive, and combinations of chain/cable or belt/cable.

Integrated Housing

Turning now to FIG. 9, the power drive unit includes a housing assembly generally indicated at 170. Housing assembly 170 includes a one-piece molded plastic housing generally indicated at 172 which is secured by bolt fasteners 174 to the inside surface 176 of chassis plate 152. With additional reference to FIGS. 1 and 8, drive unit 20 includes a cover 180 having side faces 180a–180d (as can be seen in FIGS. 1 and 8). Chassis plate 152 has edges 152a–152d corresponding to the side walls 180a–180d of cover 180, as can be seen, for example, in FIG. 8. Chassis plate 152 includes a pair of opposed edge walls 184, 186 located at edges 152a, 152d, as can be seen in FIG. 8, which shows the exterior face 177 of chassis plate 152. FIG. 9 shows the interior face 176 of chassis plate 152, normally enclosed by cover 180. Edges 152a, 152b and a fourth edge 152d are visible in FIG. 9.

As will be seen herein, the one-piece integrated plastic housing 172 provides improved mounting and global alignment for a number of components, including the electric drive motor generally indicated at 190 and transmission components which deliver power to drive shaft 154. To maintain precise air gap dimensions between the stator and rotor windings of the drive motor, external alignment of the motor components is provided by integrated plastic housing 172. More particularly, the integrated housing 172 provides mounting for a stator component 192 and motor shaft 194 which is an extension of rotor 196. As can be seen in FIG. 9, motor 190 includes a single end bell housing 202 which is joined by a plurality (preferably six) threaded fasteners 204 to integrated housing 172. A worm gear or worm 208 carried on shaft 194 drives a gear or worm wheel 210 mounted on drive shaft 154.

In addition, the same integrated plastic housing also serves as a constraint for the power transmission components delivering motor output power to the linear drive element. For example, integrated housing 172 includes a yoke-like wall member 222 carrying a collar portion 224 for receiving the free end of motor shaft 194. A bearing, such as a sleeve bearing, is preferably carried within the collar 224 to provide a low friction bearing support for the free end of motor shaft 194. The opposite end of motor shaft 194 is supported by a bearing (not shown) located within end bell 202.

Turning now to FIGS. 12–16, at the opposite end of housing 172 from wall 222, a large recess or pocket 230 (see FIGS. 12 and 13) is provided for receiving the upper portion of stator 192 in a snug interference fit. Pocket 230 is defined by locating walls which contact faces of stator 192, orienting the stator in three dimensional space in alignment with torque-transmitting members powered by the motor. The locating surfaces of pocket 230 include ribs 256 and 257 on rear surfaces of triangular walls 234 for engaging the front of the stator, side walls 236 including horizontal ribs 238 which interfit with grooves 501 (FIG. 9) in the stator to provide a tongue-in-groove arrangement, and a top wall 240, spanning the distance between side walls 236 to engage the top of the stator.

Figure 11:
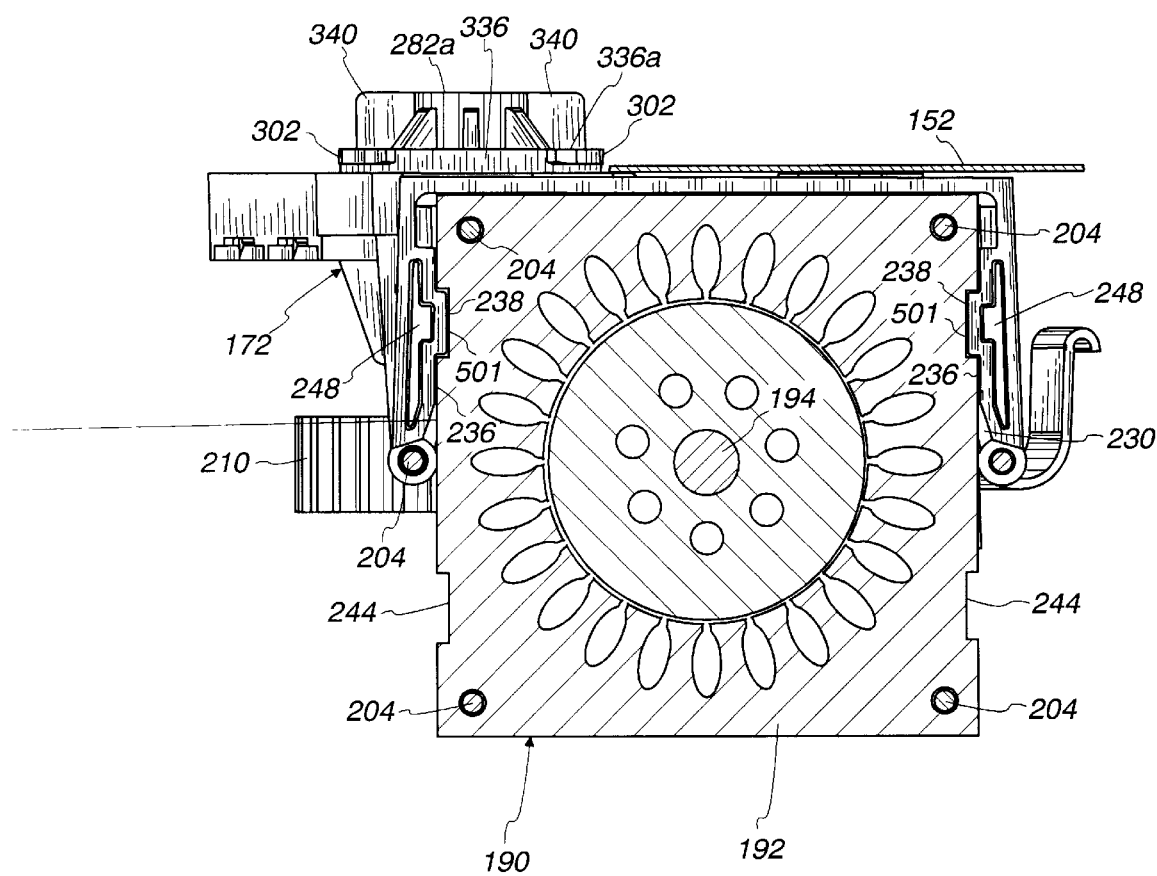
FIG. 11 is a cross-sectional view taken along line 11—11 of FIG. 9.
Figure 14:
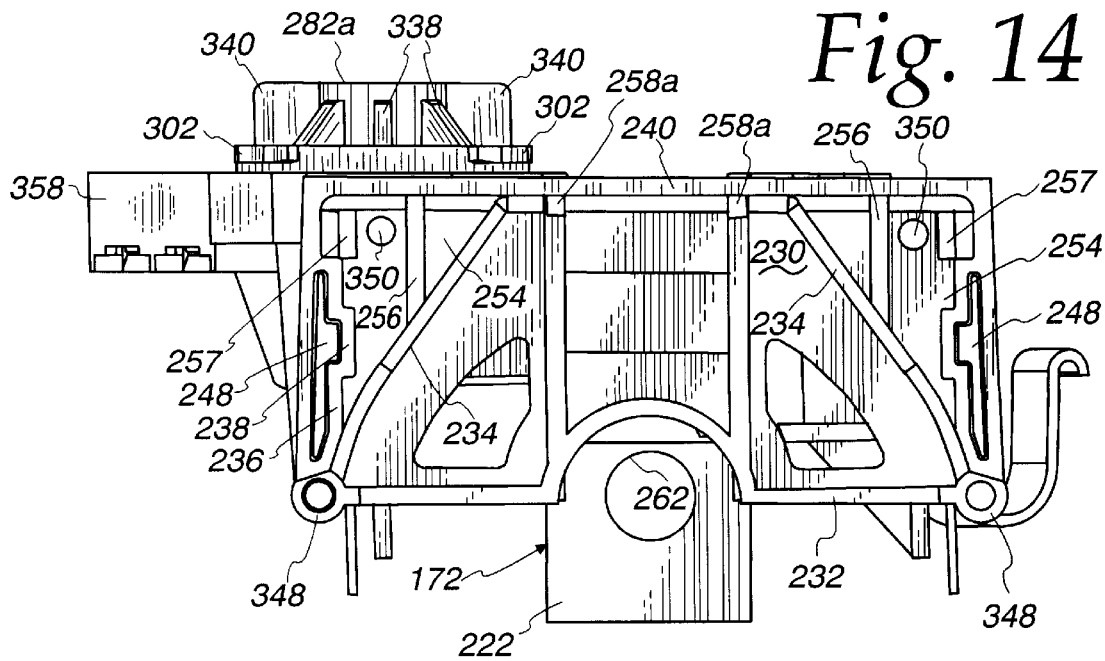
FIG. 14 is a rear elevational view of the integrated housing.
Figure 15:
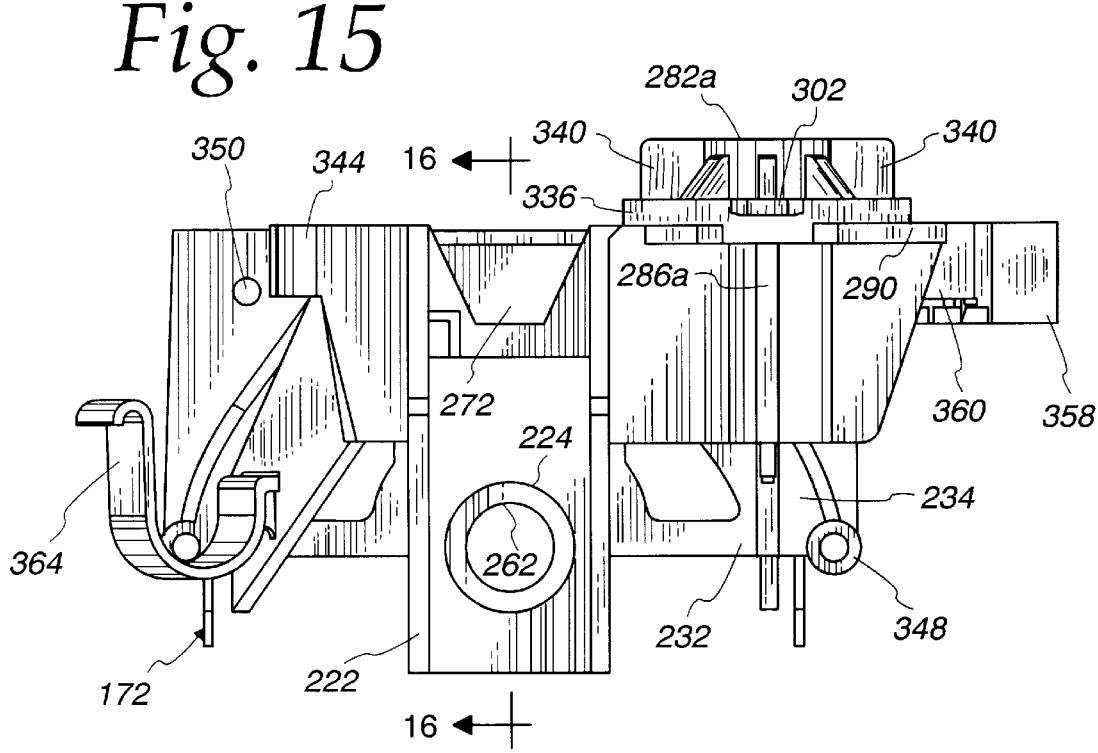
FIG. 15 is a front elevational view of the integrated housing.

As can be seen in FIG. 11, the horizontal ribs 238 protrude inward from the side walls 236 and fit within complementary recesses formed in the stator 192 to function as locators, providing precise positioning of the stator relative to the housing. In the preferred embodiment, the stator 192 is manufactured so as to be mated in one of two positions, with the integrated plastic housing 172. Accordingly, there is provided an extra pair of the complementary-shaped grooves or recesses 244 which are visible in the upper portion of FIG. 11. As can be seen in FIG. 14, the side walls 236 and ribs 238 are molded as an integral unit, with the ribs 238 having hollow interior cavities 248.

Referring again to FIG. 13, ribs 258 are provided on top wall 240 so as to present end faces 258a (see FIG. 14) which also contact the forward face of the stator, cooperating with ribs 256 to accurately orient the stator with respect to the integral housing 172.

Referring additionally to FIG. 9, the forward face of stator 192 is schematically drawn for purposes of illustration. In FIG. 9, the forward face of the stator is terminated approximately flush with the forward face of the rotor 196. However, the triangular walls 234 cooperate with the forward wall 232 to form a pocket to provide clearance for any motor windings which might protrude from stator 192 in a forward direction, beyond the generally flat face of the stator. The surfaces of triangular walls 234 and the rear surface of forward wall 232 are dimensioned so as to be spaced from the stator to avoid interfering with the alignment of the stator, as described above. As noted above, with the absence of a second end bell directly attached or otherwise coupled to stator 192, the integrated housing 172 is relied upon to provide alignment between the stator and rotor components of the motor.

Figure 16:
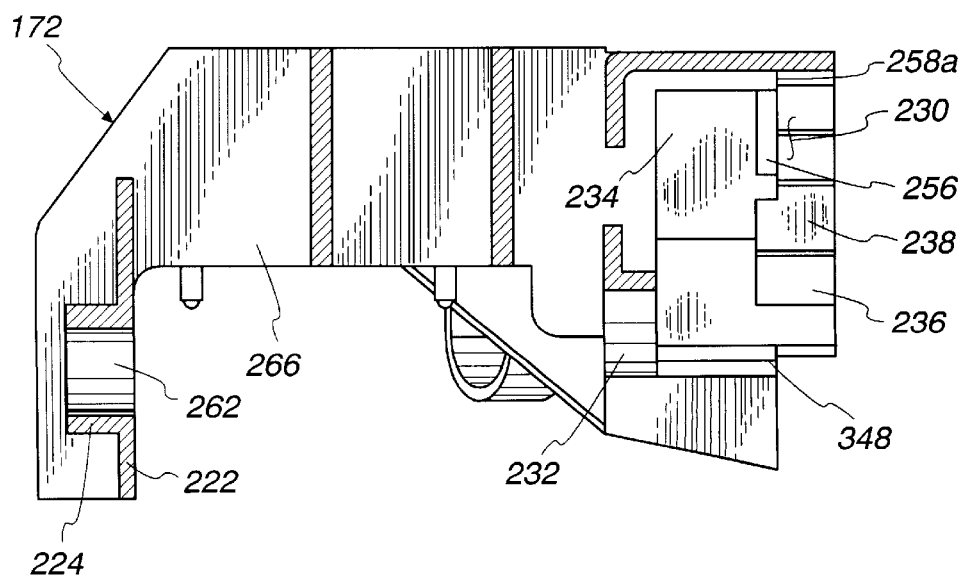
FIG. 16 is a cross-sectional view taken along the line 16—16 of FIG. 15.

With reference to FIGS. 9 and 12–14, collar 224 defines an inner bore 262 which receives the free end of motor shaft 194. With reference to FIG. 14, the same integrated housing 172 defines inner bore 262 as well as locating ribs 256, 258 and cooperating surfaces (i.e., side walls 236, key portions 238 and floor 240) which accurately position the motor stator. Preferably, the alignment of stator and rotor components provided by integrated housing 172 is sufficient to maintain an air gap 266 (see FIG. 9) between rotor and stator components having a maximum gap size of about 10 mils. Referring to FIG. 16, longitudinal wall portions 266 extend from forward wall 232 to collar portion 224. As can be seen, for example, in FIG. 13, walls 266 are intersected by walls 270, 272 and 274 and cooperate therewith to form a rigid structure which is open at the bottom.

Referring to FIG. 9, the integrated housing 172 provides a precise alignment between worm gear 208 and gear 210 so as to maintain an efficient coupling between these components of the power train within close tolerances. As can be seen, for example, in FIGS. 9 and 10, gear 210 has a substantial thickness, which may be, e.g., between about one-third and one-fourth the diameter of the spur gear. Thus, the engagement between the worm gear 208 and gear 210 spans a substantial portion of the outer surface of the spur gear. The alignment between the spur gear and worm gear must be maintained with a sufficient precision to prevent unduly high friction losses, chattering and the like, during operation of a massive overhead door or the like where power levels of, e.g., one-half horsepower or one-third horsepower are being transmitted by the operator. Thus, the integrated housing 172 is relied upon to provide precise positioning of the motor shaft and the transmission shaft 154.

Figure 12:
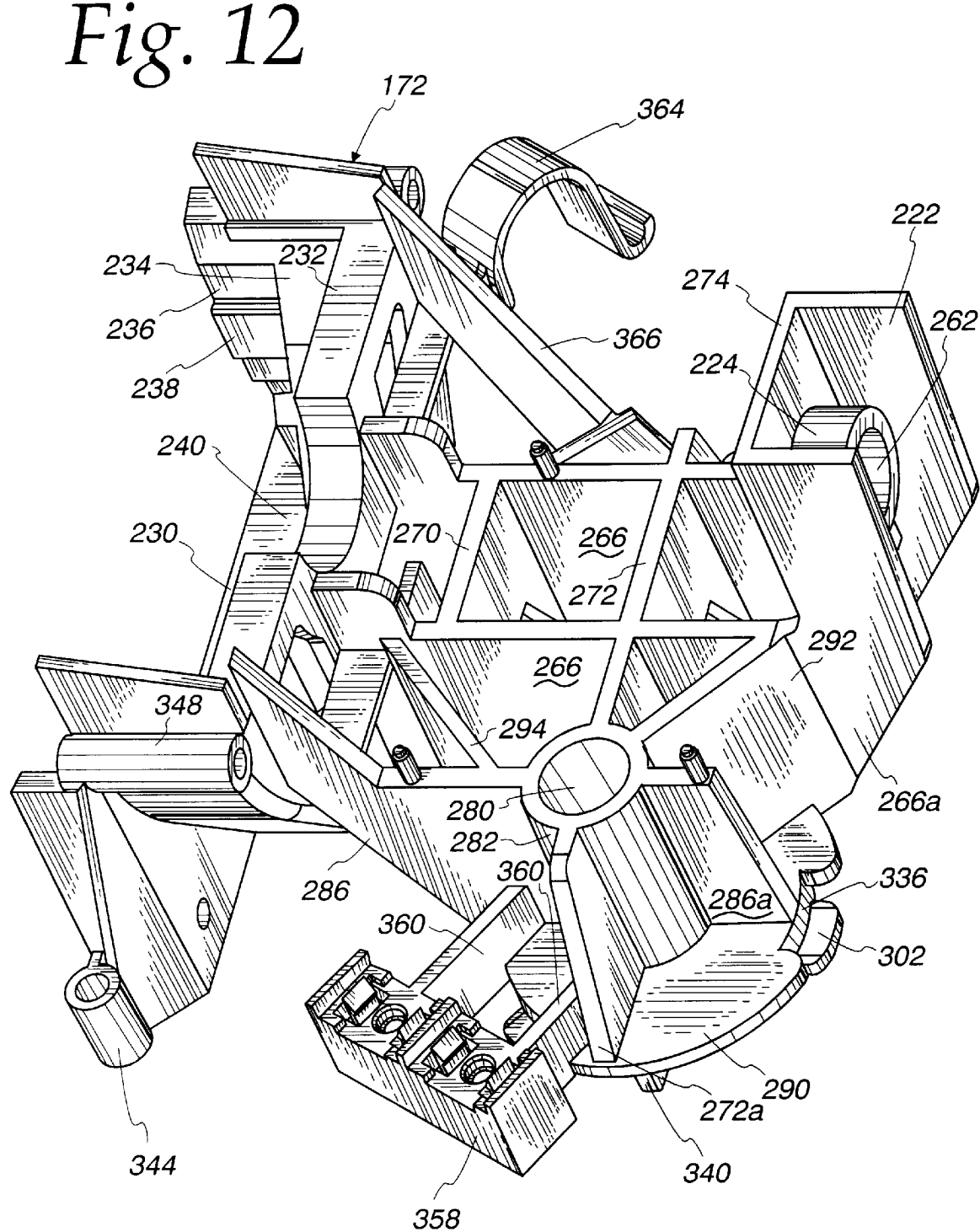
FIG. 12 is a perspective view of an integrated housing shown in FIG. 9.
Figure 13:
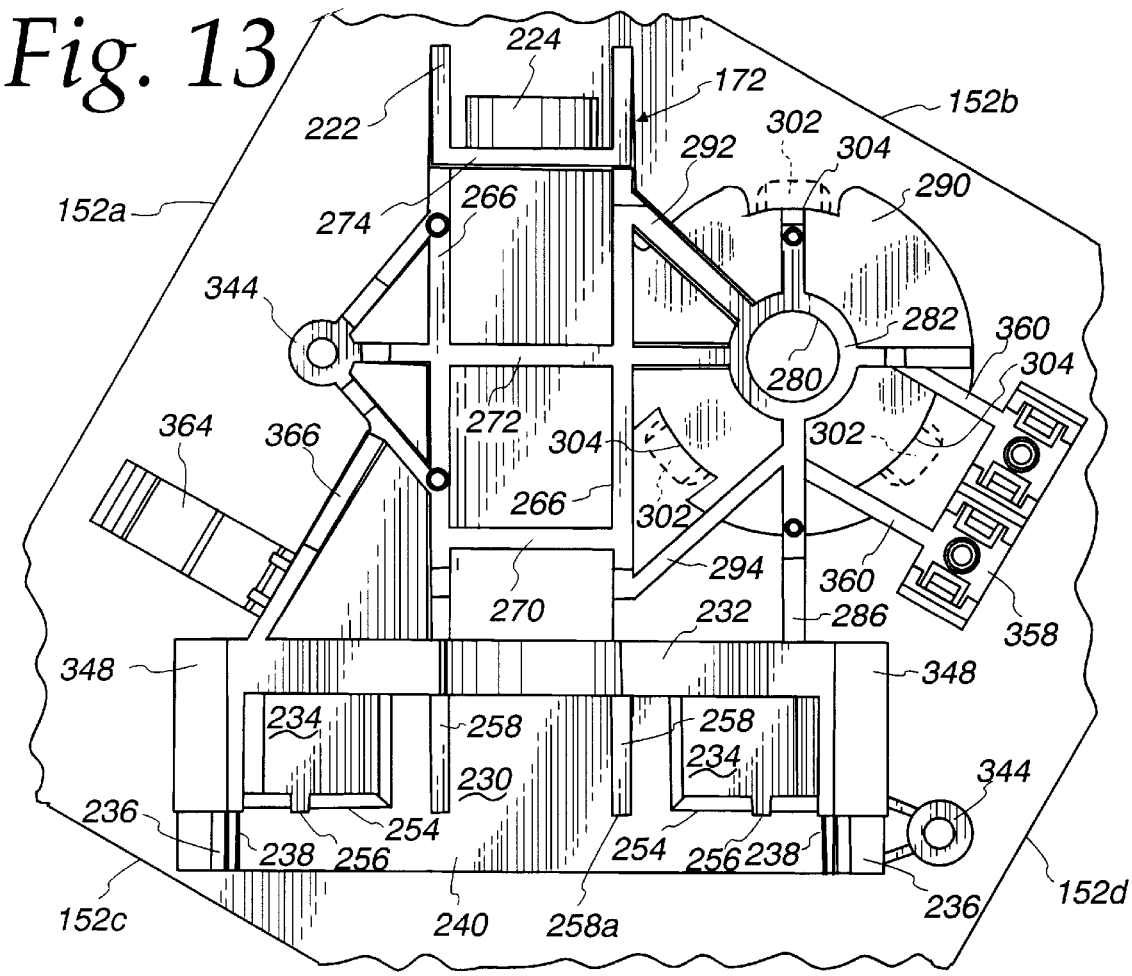
FIG. 13 is a fragmentary bottom view showing the integrated housing mounted in the power drive unit.

To this end, transmission shaft 154 is received in the internal bore 280 of cylindrical wall 282. In the preferred embodiment, a sleeve bearing (not shown) is received in internal bore 280 for low friction support of spur gear shaft 278. Referring to FIG. 12, cylindrical wall 282 is supported by longitudinal, generally vertical walls 286 and 286a, and transverse, generally vertical walls 272 and 272a. A generally disc-shaped longitudinal wall 290 surrounds the upper end of wall 282. With reference to FIGS. 12 and 13, a generally vertical diagonal wall 292 extends between cylindrical wall 282 and a forward wall portion 266a beyond which a lower forward wall portion 222 extends. A second diagonal wall 294 provides further strength and rigidity to the structure.

Referring particularly to FIGS. 8–10, an arrangement for bayonet mounting of the integrated plastic housing to sheet metal chassis plate 152 is provided above wall 290. A series of tabs 302 extend in outward directions over slots 304 formed in wall 290. As shown in FIG. 8, the bayonet mounting structure generally indicated at 330, extends upward through a generally circular opening in chassis plate 152. Tabs 302 are inserted upward through slots 332 in chassis plate 152, and the housing is then rotated so that tabs 302 travel away from the slots 332. As shown in FIG. 10, this results in the chassis plate 152 being trapped between disc portion 290 and the tabs 302.

A generally cylindrical collar 336 extends above disc portion 290 and, as shown in FIGS. 9 and 11, for example, the tabs 302 extend outward from the top edge of collar 336. The collar 336 has an outer cylindrical surface for a close fit with the generally circular opening in the chassis plate. To add strength and rigidity to the bayonet mounting structure, generally triangular gussets 338 beneath adjoin disc portion 290 and cylindrical wall 282, and, as shown in FIG. 14, for example, additional reinforcing walls 340 aligned with transverse wall 272 extend to the top edge 282a of cylindrical wall 282. In this manner, the transmission shaft 278 received in the central bore 280 of cylindrical wall 282 is firmly supported along its length.

To secure the housing in position, suspended from the chassis plate 152 by the bayonet mounting arrangement, fasteners such as screws may extend through one or more cylindrical bores on the housing and through corresponding holes in the chassis plate 152.

In the embodiment shown in FIGS. 9–16, lugs 344 having hollow bores for receiving threaded fasteners, are used to secure the integrated housing 172 to the chassis plate 152. Two mounting lugs are employed, one located adjacent the stator, and the second located diagonally opposite the first.

Referring to FIGS. 9 and 14, a pair of mounting lugs 348 are provided at the lower corners of forward wall 232, and apertures 350 are located near the upper corners of forward wall 232 to secure the rear end bell 202 and the stator to the plastic housing using threaded fasteners 204.

As shown in FIG. 9, a recess is provided forward of the laminations of stator 192 to accommodate motor windings extending rearwardly of the stator laminations. In the preferred embodiment, electrical leads (not shown) extend from these windings to electrical contacts (not shown) mounted in terminal block 358. Referring to FIGS. 12 and 13, the terminal block 358 is supported on arms 360 which extend from walls 272, 286 A generally U-shaped clip 364 may be provided for mounting a capacitor.

As can be seen from the above, the integrated plastic housing provides a global, or complete, close tolerance mounting for all of the manor drive system components, eliminating the need for iterative adjustments of pairs of drive system components, thereby reducing assembly time. Various features described above regarding the preferred construction of the integrated plastic housing help contribute to the precise alignment between stator, rotor, and transmission output shaft needed to function together as an effective reliable system.

As will be appreciated from studying the description and appended drawings, the present invention may be directed to operator systems for movable barriers of many types, such as fences, gates, overhead garage doors, and the like.

While there have been illustrated and described particular embodiments of the invention, it will be appreciated that numerous changes and modifications will occur to those skilled in the art, and it is intended in the appended claims to cover all those changes and modifications which fall within the true spirit and scope of the invention.

What is claimed is:

1. A movable barrier operator, comprising:

a motor;

a transmission connected to the motor to be driven thereby and to the movable barrier to be moved;

a pass-point assembly for detecting barrier displacements with respect to an intermediate reference point; and a controller for controlling such displacements within a predetermined range of motion;

wherein the pass-point assembly comprises:

at least one light emitter and at least one light receiver in communication with the controller, and an interrupter mechanism including a first indicator and a second indicator, driven by the motor and in proximity thereto, for selectively interrupting transmission of light from the at least one light emitter to the at least one light receiver to provide a signal to the controller when the barrier passes a reference point corresponding to one of the first and second indicators;

wherein, when the operator is mounted to move the barrier open in a first direction, the reference point corresponds to the first indicator; and wherein, when the operator is mounted to move the barrier open in a second direction, the reference point corresponds to the second indicator.

2. The movable barrier operator of claim 1 wherein the pass-point assembly comprises an RPM sensor for providing information to the controller concerning barrier displacements relative to the reference point.

3. The movable barrier operator of claim 1 wherein the pass-point assembly comprises a first light emitter, and a first light receiver;

wherein the interrupter mechanism selectively interrupts emissions received by the first light receiver from the first light emitter, the first selective interruptions corresponding to passage of the reference point.

4. The movable barrier operator of claim 3 wherein the motor includes an output shaft and the interrupter mechanism includes a first spur gear and a second spur gear mounted side-by-side on a common shaft, the spur gears being drivingly connected to the motor shaft.

5. The movable barrier operator of claim 4 further comprising a common pinion driven by the motor shaft and engaging each gear of the first and second spur gears.

6. The movable barrier operator of claim 5 wherein the first and second spur gears each have a different number of gear teeth meshing with the common pinion so as to rotate at different speeds about the common shaft as the common pinion is rotated.

7. The movable barrier operator of claim 6 wherein the first spur gear has a first aperture and the second spur gear has first and second apertures spaced apart from one another, wherein when the operator is mounted to move the barrier open in a first direction, the first aperture of the first spur gear is positioned to be aligned with the first aperture of the second spur gear in a predetermined fashion, with light emissions received by the at least one light receiver passing through the aligned apertures and wherein when the operator is mounted to move the barrier open in a second direction, the first aperture of the first spur gear is positioned to be aligned with the second aperture of the second spur gear in a predetermined fashion, with light emissions received by the at least one light receiver passing through the aligned apertures.

8. The movable barrier operator of claim 2 wherein the motor includes an output shaft and the RPM sensor detects a rotational speed of the motor.

9. The movable barrier operator of claim 8 further comprising a second optical emitter for transmitting a second optical beam to a second optical detector; and wherein the RPM sensor comprises a circular disk having a plurality of openings therein for interrupting the second optical beam.

10. A movable barrier operator comprising:
a motor;
a transmission connected to the motor to be driven thereby and for connection to the movable barrier to be moved;
a pass-point assembly for detecting barrier displacements with respect to an intermediate reference point; and
a controller for controlling such displacements within a predetermined range of motion; and
a routine for automatically determining open and close limits of the movable barrier relative to the intermediate reference point;
wherein in response to an open command, the routine causes the barrier to move in a first direction toward the intermediate reference point, measures the distance traveled to the reference point, and stores the complement of the distance traveled in the first direction as the close limit; and
wherein in response to a close command, the routine causes the barrier to move in a second direction toward the intermediate reference point, measures the distance traveled to the reference point, and stores the complement of the distance traveled in the second direction as the open limit.

11. The movable barrier operator of claim 10 wherein the pass-point assembly comprises:
at least one light emitter and at least one light receiver in communication with the controller, and
an interrupter mechanism including a first indicator and a second indicator, driven by the motor and in proximity thereto, for selectively interrupting transmission of light from the at least one light emitter to the at least one light receiver to provide a signal to the controller when the barrier passes a reference point corresponding to one of the first and second indicators;
wherein, when the operator is mounted to move the barrier open in a first direction, the reference point corresponds to the first indicator; and
wherein, when the operator is mounted to move the barrier open in a second direction, the reference point corresponds to the second indicator.

12. The movable barrier operator of claim 10 wherein the pass-point assembly comprises an RPM sensor for providing information to the controller concerning barrier displacements relative to the reference point.

13. The movable barrier operator of claim 10 wherein the pass-point assembly comprises a first light emitter, and a first light receiver;
wherein the interrupter mechanism selectively interrupts emissions received by the first light receiver from the first light emitter, the first selective interruptions corresponding to passage of the reference point.

14. The movable barrier operator of claim 13 wherein the motor includes an output shaft and the interrupter mechanism includes a first spur gear and a second spur gear mounted side-by-side on a common shaft, the spur gears being drivingly connected to the motor shaft.

15. The movable barrier operator of claim 14 further comprising a common pinion driven by the motor shaft and engaging each gear of the first and second spur gears.

16. The movable barrier operator of claim 15 wherein the first and second spur gears each have a different number of gear teeth meshing with the common pinion so as to rotate at different speeds about the common shaft as the common pinion is rotated.

17. The movable barrier operator of claim 16 wherein the first spur gear has a first aperture and the second spur gear has first and second apertures spaced apart from one another,
wherein when the operator is mounted to move the barrier open in a first direction, the first aperture of the first spur gear is positioned to be aligned with the first aperture of the second spur gear in a predetermined fashion, with light emissions received by the at least one light receiver passing through the aligned apertures and
wherein when the operator is mounted to move the barrier open in a second direction, the first aperture of the first spur gear is positioned to be aligned with the second aperture of the second spur gear in a predetermined fashion, with light emissions received by the at least one light receiver passing through the aligned apertures.

18. The movable barrier operator of claim 12 wherein the motor includes an output shaft and the RPM sensor detects a rotational speed of the motor.

19. The movable barrier operator of claim 18 further comprising a second optical emitter for transmitting a second optical beam to a second optical detector; and wherein the RPM sensor comprises a circular disk having a plurality of openings therein for interrupting the second optical beam.

20. A method for automatically learning the open and close limits of travel comprising the steps of:

receiving a command to cause the movable barrier to move in a first direction to a first position;

moving the barrier in the first direction toward an intermediate reference point;

measuring the distance traveled to the reference point;

storing the complement of the distance traveled in the first direction as a first limit;

receiving a command to cause the movable barrier to move in a second direction to a second position;

moving the barrier in the second direction toward the intermediate reference point;

measuring the distance traveled to the reference point; and storing the complement of the distance traveled in the second direction as a second limit.

* * * * *